US009092753B1

(12) United States Patent
Fanelli

(10) Patent No.: US 9,092,753 B1
(45) Date of Patent: Jul. 28, 2015

(54) METHODS AND SYSTEMS FOR INVENTORYING PERSONAL PROPERTY AND BUSINESS EQUIPMENT

(71) Applicant: Daniel Fanelli, Windermere, FL (US)

(72) Inventor: Daniel Fanelli, Windermere, FL (US)

(73) Assignee: Protectovision, LLC, Windermere, FL (US)

( * ) Notice: Subject to any disclaimer, the term of this patent is extended or adjusted under 35 U.S.C. 154(b) by 0 days.

(21) Appl. No.: 13/890,803

(22) Filed: May 9, 2013

Related U.S. Application Data

(63) Continuation-in-part of application No. 13/277,861, filed on Oct. 20, 2011, now Pat. No. 8,615,450.

(51) Int. Cl.
*G06Q 10/00* (2012.01)
*G06Q 10/08* (2012.01)

(52) U.S. Cl.
CPC .................................. *G06Q 10/087* (2013.01)

(58) Field of Classification Search
CPC .................................................. G06Q 10/087
USPC .......................................................... 705/28
See application file for complete search history.

(56) References Cited

U.S. PATENT DOCUMENTS

| | | | |
|---|---|---|---|
| 6,028,603 A | 2/2000 | Wang | |
| 6,732,162 B1 | 5/2004 | Wood | |
| 6,904,410 B1 | 6/2005 | Weiss | |
| 7,586,631 B2 | 9/2009 | Omori | |
| 7,827,498 B2 | 11/2010 | Moore | |
| 7,899,823 B1 | 3/2011 | Trandal | |
| 7,899,887 B2 | 3/2011 | Conn | |
| 8,306,875 B2 * | 11/2012 | Schneur | 705/27.1 |
| 8,498,960 B2 * | 7/2013 | Pacella | 707/609 |
| 2001/0032151 A1 | 10/2001 | Paul | |
| 2002/0065825 A1 * | 5/2002 | Kassan et al. | 707/9 |
| 2002/0107761 A1 | 8/2002 | Kark | |
| 2005/0278204 A1 | 12/2005 | Weinberg | |
| 2006/0031090 A1 | 2/2006 | Tarr | |

(Continued)

OTHER PUBLICATIONS

To protect possessions, Americans need to know their 'stuff' new iPhone(R) application from National Association of Insurance Commissioners makes it easy to create a home inventory. Mar. 10, 2011. PR Newswire.*

(Continued)

*Primary Examiner* — Scott Zare
(74) *Attorney, Agent, or Firm* — Brian S. Steinberger; Phyllis K. Wood; Law Offices of Brian S. Steinberger, P.A.

(57) ABSTRACT

Methods and systems for documenting an inventory of items by accessing an inventory algorithm for creating an inventory list, adding multiple items to the inventory list, adding details about one or more of the items in the inventory list, identifying one or more real properties containing items in the inventory list, and linking one or more images and documents with one or more of the items in the inventory list. The user can schedule a future event reminder to automatically receive an email message corresponding to the scheduled event. The inventory can be created by providing a user with an access code to access the inventory list corresponding to the user, providing a Reseller with access to the inventory algorithm for setting up a new user account and the user authorizing an Authorized Inventory Professional with access to the inventory algorithm for creating the inventory list for the client user.

11 Claims, 63 Drawing Sheets

(56) References Cited

U.S. PATENT DOCUMENTS

| | | |
|---|---|---|
| 2006/0075442 A1 | 4/2006 | Meadow |
| 2007/0100713 A1 | 5/2007 | Del Favero |
| 2007/0143123 A1 | 6/2007 | Goldberg |
| 2007/0143155 A1 | 6/2007 | Whitsett |
| 2007/0174130 A1 | 7/2007 | Seeley |
| 2008/0010171 A1 | 1/2008 | Ghanna |
| 2008/0033847 A1 | 2/2008 | McIntosh |
| 2008/0307512 A1 | 12/2008 | Tandon |
| 2009/0138560 A1 | 5/2009 | Stahl |
| 2009/0234678 A1 | 9/2009 | Arenas |
| 2010/0050107 A1 | 2/2010 | McIntyre |
| 2010/0179857 A1 | 7/2010 | Artinger |
| 2010/0274728 A1 | 10/2010 | Kugelman |
| 2011/0015954 A1 | 1/2011 | Ward |
| 2011/0022500 A1 | 1/2011 | Scheinfeld |
| 2011/0055751 A1 | 3/2011 | Morrison |
| 2013/0198027 A1* | 8/2013 | Anthonyson et al. ........ 705/26.4 |
| 2013/0246345 A1* | 9/2013 | Eisler et al. .................. 707/608 |

OTHER PUBLICATIONS

Protect what's left after spring cleaning: Allstate offers tips for creating a home inventory. Mar. 22, 2011. PR Newswire.*

* cited by examiner

Home and Business Inventory

Inventory | Item Details | Properties | Estate Planning | Settings | My Account | Refer a Friend | Reports | Help | Admin | Reseller Logged in as: Dan Pandii
Logout

← 300

Add New Property

Inventory items are associated to properties like a primary residence, office building, vacation home, etc... When you signup for ProtectoVision you receive 1 property to associate inventory items to. You can add additional properties for $19.95 a year, which will be prorated between now and your renewal date of 4/13/2020. The total amount due for each additional property you add today will be $17.91. Click the 'Add New Property' button to add an additional property or select a property below that is already associated to your account.

| | PropName | Address | City | State | ZIP | |
|---|---|---|---|---|---|---|
| Select | Naples Vaca Condo | 22222222222222222 | Naple | FL | 32811 | Delete |
| Select | Test Property | 123 Test St | Orlando | FL | 32911 | Delete |
| Select | Windermere House | 1111111111111111 | Windermere | FL | 34785 | Delete |

Fig. 1g

Home and Business Inventory

| Inventory | Item Details | Properties | Estate Planning | Settings | My Account | Refer a Friend | Reports | Help | Admin | Reseller |

Logged in as: Dan Panell
Logout

← 400

[Save Changes]

Use the memo field below to enter the insurance policy information, attorney information, will information, safe deposit box information, funeral/burial information, etc...

Own 2 plots purchased 1984 in:

Holly Hill Memorial Park
Garden of Love
Middleburg FL 32068
904 282-9936
alsobymymemorial.com This information does not substitute for a legal Will. Don't forget to give your Attorney, Estate Executor, or most responsible relative a temporary user name and password to have "read only" access to your account. To do this, go to the "Settings" tab, and then the sub-tab called "3rd Party Logins" to setup their user name and password, so that whomever you designate can comply with your intentions.

| | | |
|---|---|---|
| ☐ Refridgerator | ☐ Rifle | ☐ Rug |
| ☐ Shaver, Electric | ☐ Shoe Shine, Electric | ☐ Silverware |
| ☐ Sofa | ☐ Stainless Dinnerware | ☐ Stereo Amplifier |
| ☐ Stereo Speakers | ☐ Stereo System | ☐ Storage Chest |
| ☐ Stove Oven Range | ☐ Surround Sound System | ☐ Table and Chairs Set |
| ☐ Table, Coffee | ☐ Table, Drafting | ☐ Table, Sofa |
| ☐ Table, TV | ☐ Tax Records | ☐ Telephone |
| ☐ Telephone #2 | ☐ Telephone, Portable | ☐ Tool Box |
| ☐ Tools | ☐ Toothbrush, Electric | ☐ Trash Compactor |
| ☐ Treadmill | ☐ TV | ☐ TV Console |
| ☐ Vacuum Cleaner | ☐ Vase | ☐ Video Recorder, VCR |
| ☐ Walkman | ☐ Washer (Clothes) | ☐ Watch |
| ☐ Water Purifier,Fauct | ☐ Water Softener | ☐ Watr Purifier,Rev Os |
| ☐ Weight Set | | |

[Add Items to Inventory] ← 147

Inventory  Properties  Estate Planning  Settings  My Account  Refer a Friend  Reports  Reminders  Help  Admin  Reseller Save Changes Use the tabs and fields below to edit specific details regarding inventory item: Special Widget Device

✓ Indicates content has been previously entered into the respective tab

| Notes / Audio | Video | Documents | Warranty | Maintenance / Repairs | Item Reminders |

280

| | |
|---|---|
| Item Name | Special Widget Device |
| Property | Business Property 2 ✓ |
| Category | Electronic ✓ |
| Location | Personal Items Box ✓ |
| Brand | |
| Model # | ✓ |
| Serial # | ✓ |
| Inventory ID # | |
| Condition | |
| Purchase Date | |

No images found for this item

Image 1 of 0

Add Image    Delete Image    Set as Default Image

Note: click the 'Set as Default Image' button to set a specific image as the default image.
The default image will always appear first and will be shown in reports.

Fig. 10

Inventory   Item Details   Properties   Estate Planning   Settings   My Account   Refer a Friend   Reports   Create Reminder   Help   Admin   Reseller Create Reminder Use this screen to view, add, edit reminders. If you'd like to receive an email reminder on the due date check the 'Email Reminder' field and an email will be sent to your email address of record. If you would like to email a reminder to another person add their email address to the Email Cc field. When creating a reminder, bold fields are required.

| Description | Due Date | Inventory Item | Priority | Email Reminder |
|---|---|---|---|---|
| Blah Test 2 | 3/22/2012 | Macbook Pro Laptop | Low | |
| Blah | 3/22/2012 | phone1 | Low | ☑ |
| Test Description | 4/23/2013 | Chain | Low | ☑ |
| Test Description | 5/23/2013 | Chain | Low | ☑ |
| Test Description | 6/23/2013 | Chain | Low | ☑ |
| Test Description | 7/23/2013 | Chain | Low | ☑ |

Fig. 1r

Create Reminder

Use this screen to view, add, edit reminders. If you'd like to receive an email reminder on the due date check the 'Email Reminder' field and an email will be sent to your email address of record. If you would like to email a reminder to another person add their email address to the Email Cc field. When creating a reminder, bold fields are required.

| Description | Due Date | Inventory Item | Priority | Email Reminder |
|---|---|---|---|---|
| Blah Test 2 | 3/22/2012 | Macbook Pro Laptop | Low | ☑ |
| Blah | 3/22/2012 | phone1 | Low | ☑ |
| Test Description | 4/23/2013 | Chain | Low | ☑ |
| Test Description | 5/23/2013 | Chain | Low | ☑ |
| Test Description | 6/23/2013 | Chain | Low | ☑ |
| Test Description | 7/23/2013 | Chain | Low | ☐ |
| Annual Recalibration Certification for Special Widget Device | 4/27/2014 | Special Widget Device | High | ☐ |
| Annual Recalibration Certification for Special Widget Device | 4/27/2015 | Special Widget Device | High | ☐ |
| Annual Recalibration Certification for Special Widget Device | 4/27/2016 | Special Widget Device | High | ☐ |
| Annual Recalibration Certification for Special Widget Device | 4/27/2017 | Special Widget Device | High | ☐ |

Inventory  Item Details  Properties  Estate Planning  [Contacts]  My Account  Refer a Friend  Reports  Reminders  Help  Admin  Reseller Save Changes General  Categories  Locations  Doc Types  Beneficiaries  3rd Party Logins  Permissions  Batch Images  Batch Documents Authorized Inventory Professional Login History 3rd Party Login activity is recorded here each time a 3rd Party (who you create a login for) logs into your account.

| 3rd Party Login | 3rd Party Company | IP Address | Date/Time | |
|---|---|---|---|---|
| September 22 Test | Test | 64.49.243.174 | 9/22/20 | 6:35 AM |
| Clint Fanelli | Protectorvision | 64.49.243.174 | 4/4/201 | 15 AM |
| Clint Fanelli | Protectorvision | 64.49.243.174 | 4/4/201 | 09 AM |
| Joe Test | USAA Test | 64.49.243.174 | 12/29/2 | 4:37 PM |
| Joe Test | USAA Test | 64.49.243.174 | 12/29/2 | 4:09 PM |
| Joe Test | USAA Test | 64.49.243.174 | 12/29/2 | 3:07 PM |
| Joe Test | USAA Test | 64.49.243.174 | 12/29/2 | 2:50 PM |

Step 1. Upload the photos that are to be entered into the inventory.
Step 2. Put a check in the box of the image(s) you want to relocate to their respective inventory "item".
Step 3. Click in the rectangle box next to "Assign" and the dropdown menu of items appears.

Step 4. Begin typing the item for the photo you are trying to match. In this example "bron" has been typed.

Step 5. Select the correct item on the dropdown menu and the item text appears in the rectangular box.
Step 6. Click on "Assign" and the photo is entered in the selected item in the inventory.

METHODS AND SYSTEMS FOR INVENTORYING PERSONAL PROPERTY AND BUSINESS EQUIPMENT

This application is a continuation-in-part of U.S. patent Ser. No. 13/277,861 filed on Oct. 20, 2011.

FIELD OF THE INVENTION

This invention relates to inventory tracking and, in particular, to methods, systems and devices for methods and systems for inventorying personal property and business equipment singularly or in combination with backend business development system for multiple subgroups to utilize the business method for sale, distribution and inventory completion and inventory data storage.

BACKGROUND AND PRIOR ART

U.S. Patent Application No. 2007/0143123 issued to Goldberg et al. discloses a system, method and service for recording household assets that includes a step of identifying a residential property, items contained within the residential property and the items can be categorized. Entries for each of the categorized items can be recorded within a household asset tracking database. Digital images of the residential property can be obtained, where the digital images are images taken of actual items of the residential property. The digital images can be linked to the entries for the items which are shown in the digital pictures. The linked images and entries can be stored in a data storage remotely located from the residential property. An authorized user can be provided with searchable access to the entries and linked images of data store.

U.S. Patent Application No. 2010/0179837 issued to Artinger teaches process steps implemented in a system via logon page, the webpage includes an "inventory link" to a spreadsheet which contains item description, inventory list and photo. In a webpage, the insured has scanned or made a digital copy of important documents, the insured selects "Virtual Vault" link to be directed to the upload/download web page. At the upload/download web page, the insured selects each scanned document for uploading to the database. A claim item box includes item description of the insured item and an "MER" (market evaluation report) button which links to "MER" webpage.

U.S. Patent Application No. 2009/0138560 issued to Stahl discloses a server host for an automated inventory recording program and has its own domain. In the context of an inventory system, and enables an information object, such as a photograph, to be captured remotely and transmitted over a communications network to a proxy email address where it is automatically processed into an inventory record on the desired inventory list without the user needing to have any further interaction with the inventory system than the transmission of the object. Additionally, the step that utilizes email as the transportation method includes filtering to restrict data submission thereby preventing or greatly mitigating false record entries.

U.S. Patent Application No. 2008/0033847 issued to McIntosh teaches an asset inventory system that is intended to focus on real estate and to inventory personal property, i.e., yachts and aircraft owned by user of system. After photographic inventory is assembled, it is then reduced to a computer readable Compact Disc or CD, and may also be listed on an internet website for remote access or reduced to other forms that retain the information in a safe and accessible form.

U.S. Patent Application No. 2007/0174130 issued to Seeley teaches systems and methods for remote access to a computerized inventory, which includes images of items stored in a storage unit that is assigned to a customer, so that the customer may view the images of the stored items. The remote access may further allow the customer to select particular items, according to the images, and send instructions to a storage facility representative, concerning those selected items.

U.S. Patent Application No. 2007/0100713 issued to Del Favero et al. teaches methods and systems for isolating and capturing an image of an inventory item from an image that contains multiple items and/or extraneous space. The user interface allows the user to import an image into an application, identify one or more regions of the image as corresponding to separate inventory items, and create inventory records corresponding to those items or update existing inventory records to include the images of those items.

U.S. Pat. No. 7,899,823 issued to Trandal et al. abstract describes inventory management using digital imaging, wireless communications, and voice and data networks that simplify the data capture, organization, and secure storage of a personal property owner's list of belongings. In addition, embodiments are described facilitating the insurance claims process, reducing the cost to the insurance industry of claims management.

U.S. Pat. No. 6,732,162 issued to Wood et al. is directed to a broad-based solution for acquisition, processing and distribution of media objects including pictures (images), movies, videos, graphics, sound clips, etc via the Internet or the like.

U.S. Patent Application No. 2008/0010171 issued to Ghanma teaches a method for distributing inventory information in a communication system wherein a service provider's core database communicates with resellers to enable the resellers to select a portion of the inventory information and compile the selected inventory information in an automatically updateable pull frame which is communicated to be displayed on a web page operated by the reseller.

U.S. Patent Application No. 20100274728 issued to Kugelman abstract shows video verification of some/all aspects of remote business transaction, client sends plurality of items to recipient. Upon reception of these items, recipient creates inventory of the items, including video verification of the inventory.

U.S. Patent Application No. 2010/0050107 issued to McIntyre et al., shows instructing presentation of digital image record (which may include video), on a display; instructing presentation of tab on the display, the tab appearing near or emanating from the displayed digital image record, wherein the tab is an access point configured to allow user access category of information related to content contained within. A user accesses account with image collection that contains digital image records and acts as an access point that is configured to allow the user to access a category of information.

U.S. Patent Application No. 2011/0055751 and 2011/0022500 issued to issued to Morrison et al. and Scheinfeld et al., respectively, teach online catalogs that include video playlist for a product/service with identifiers which includes product service information such as name, description, and pictures.

Related published patent applications include U.S. Patent Application No. 2011/0015954 issued to Ward discloses a software program that allows uploading more than one photograph along with description; U.S. Patent Application No. 2008/0307512 issued to Tandon discloses a batch upload method; U.S. Patent Application No. 2007/0143155 issued to Whitsett et al. shows inventory system comprising travel products; U.S. Patent Application No. 2006/0075442 issued to Meadow describes video taken which can be delivered to internet website where other can view; U.S. Patent Application No. 2006/0031090 issued to Tarr et al. describes method for providing images to a customer includes receiving a request for an image from a customer; and U.S. Patent Application No. 2002/0107761 issued to Kark et al. teaches plurality of hierarchically related product/service catalogs are maintained so as to maintain commonality with regard to information contained in the catalogs and to permit customization at each layer.

Related patents include U.S. Pat. No. 7,899,887 issued to Conn et al. construction of the multimedia albums which comprise digital content, such as photos and video clips, provided by multiple digital content contributors, taken from each contributor's unique perspective; U.S. Pat. No. 7,827,498 issued to Moore et al. describes method and system for client and server applications working together over modes of digital data transmission to collect, store, select, present, distribute and manage information for digital images, including photographs, pictures, videos, movies and other forms of digital media; U.S. Pat. No. 6,904,410 issued to Weiss et al. shows management of collectibles; and U.S. Pat. No. 6,028,603 issued to Wang et al. shows uploading a photo album and shows adding and deleting feature.

Other prior art includes U.S. Patent Application No. 2009/0234678 issued to Arenas; U.S. Patent Application No. 2001/0032151 issued to Paul et al.; and U.S. Pat. No. 7,586,631 issued to Omori.

SUMMARY OF THE INVENTION

A primary objective of the present invention is to provide methods and systems to complete an inventory of the personal property for any individual, family, business, government or military entity, or other user. The user can inventory more than one property, each identified with a postal address, with separate rooms and areas known as locations within each of the properties, and can categorize the items in the inventory list.

A secondary objective of the present invention is to provide methods and systems inventory software that is stored and maintained on the provider's inventory secure computer system or a professional provider's service, with inventory storage space leased by the user, and therefore the software never has to be downloaded or updated by the user. An alternate embodiment could have the inventory program stored and uploaded onto a computer from a disk or downloaded onto the computer from the Internet.

A third objective of the present invention is to provide methods and systems for inventory software capable of securely storing plural digital inventory photos, videos, documents, item details, warranty records, maintenance records, and a content indicator for each of these so the user can quickly know if they have stored any information in the respective category, for each individual, family and business client for stored files that are accessible from anywhere in the world where the internet is available; as well as the ability to produce a printable record of the information.

A fourth objective of the present invention is to provide methods and systems for inventory software wherein digital pictures can be uploaded in groups of more than one picture at a time, called a "batch upload" that are stored on the "Batch Image Uploader" page or tab. One or more pictures can then be selected from the stack of pictures on the 'Batch Image Uploader" page. This page also displays the list of items, and the location for each item, that has been entered into the inventory. The selected uploaded pictures can then be sent directly to and stored with their respective item on the "Item Details" page.

A fifth objective of the present invention is to provide methods and systems for inventory software that allows the client to import and store one or more video file(s) of various video formats in the video tab area under each "Item Details" page. Some formats have the video player pre-installed on the provider's website and automatically play as they are downloaded from the provider's website. These video formats therefore "stream" or load and play automatically. Videos can be of items, overall rooms, or anything the user wants to store. Some video formats do not "stream," and instead play with the use of an installed video player on each specific computer. In this case, the video player is not on the provider's website, and instead the video file needs to be downloaded from the provider's website to be played on the computer the client is using.

A sixth objective of the present invention is to provide methods and systems for inventory software that allows inventory items to each have a beneficiary specified for estate planning, as well as an Estate Planning tab, for more detailed descriptions of the estate, property and intentions. An unlimited number of beneficiaries can be entered into the Beneficiaries List by the user, and each respective item can be linked to one or more beneficiaries. The beneficiaries can each be sorted separately, and the list of inventory items for each beneficiary can be printed and taken to their estate attorney to be added to their Last Will and Testament. The list can include the cost for each item entered in the inventory, the current value for each item entered in the inventory as estimated by the client or their other source hired appraiser, the monetary total for each of these columns of all items on the list, and the relationship of the beneficiary to the client. The program has no item purchase price auto-insertion or estimated valuation auto-insertion capability at this time, but these enhancements are in development to use the software for insurance claims estimating for items throughout the inventory.

A seventh objective of the present invention is to provide methods and systems for inventory software wherein digital documents can be uploaded in groups of more than one document at a time, called a "batch upload" that are stored on the "Batch Documents" uploader tab page until the user assigns the documents to their respective Item Detail tab's Document sub-tab.

An eighth objective of the present invention is to provide methods and systems for an inventory algorithm that allows the user to add multiple items all at one time to an inventory list when the items being added are selected from a pre-programmed list of items. Items in the inventory list can also be certified to have been verified by an Authorized Inventory Professional to exist at the property.

A ninth objective of the present invention is to provide a backend business development system for multiple subgroups to utilize the program and business method for sale, distribution and inventory completion, and inventory data storage. This may also include accounting integration for accounts receivable, inventory control, and expense accounting. This business process can be franchised, or used on a fee or commission basis.

A tenth objective of the present invention is to provide methods and systems for inventory software wherein information from digital surveillance cameras can be integrated into the system so that the user could remotely view and have the option to store video information from cameras that have been integrated into the inventory system.

A first embodiment provides an inventory system that includes a server for executing a set of instructions, an inventory algorithm as a set of instructions stored in memory coupled with the server. The inventory algorithm includes an inventory screen for adding plural items to an inventory list, the inventory screen allowing the user to add an individual item to the inventory list or to add multiple items selected from a list of pre-programmed inventory item list, an item detail screen for entering details about each one of the plural items including a physical property where the inventory item is found, and a reminder screen to allow the user to set up a reminder of a future event to automatically send an email reminder of the event to the user.

The inventory detail screen includes an item name field, a property field to identify one or more physical property addresses corresponding to the user, a location field to identify a location within the property where the item is found as in a room or area, and one or more item detail fields selected from a list including category, brand, model number, serial number, condition, purchase price, purchase date, and replacement cost. The detail screen can further include a selectable list of categories, the items in the pre-programmed inventory item list linked with one or more of the categories in the category list and a remember filed to select one or more of the property, location and category field to pre-populate for entering a next inventory item.

The inventory system can also include a document upload function to allow the user to upload one or more documents into the inventory system and link the one or more uploaded documents with an item in the inventory list, and an image upload function to allow the user to upload one or more images into the inventory system and link the one or more uploaded image with an item in the inventory list.

The reminder screen includes a reminder description field to identify the reminder and a date field to enter a date for the automatic email reminder. The reminder screen can also include a priority filed for the user to assign a priority to the reminder and a repeat times field to select a number of times for automatically sending the email reminder. The reminder screen allows the user to link the reminder with an item in the inventory list as well as to enter a reminder for anything even if it is not linked to an inventory item.

The inventory system also includes an administration access into the inventory system from the Admin tab to add or modify entries on pre-programmed lists located on the Items sub-tab, Locations sub-tab, and Categories sub-tab used in order to build an inventory. The items entered on the Items sub-tab are for use on the "Add Multiple Inventory Items" page pallet in the All Items list section of the page and the "Quick Picks" section of the page, and to link one or more items in the pre-programmed item lists with one or more categories to automatically display a Quick Pick list of items linked with a selected location and a selected category. This embodiment can utilize a location being selected, and then the preprogrammed Quick Pick list automatically display the items normally found in the respective room and area of that location type, with the "All Items" list also displayed below the "Quick Pick" list or other location as needed. The category can be optionally selected or left unassigned, and may have a dropdown menu to select the item's respective category. In another embodiment, instead of having items pre-populate the Quick Picks list based on "Location", the "Category" could be used, and when the category is selected all the preselected items in that category would be displayed. In this case the "Location" can be optionally selected or left unassigned, and may have a dropdown menu to select the respective item's location A second embodiment provides an inventory algorithm stored on a server accessible by a user to complete an inventory that includes an inventory screen for adding plural items to an inventory list including a selectable "Add Item" option to allow the user to add an individual item to the inventory list, a selectable "Add Multiple Inventory Items" option to allow the user to add multiple items selected from a pre-programmed inventory item list by clicking on the item's box and adding a group of items all at once, and an item detail screen for entering details about each one of the plural items including a physical property and a location within the physical property where the inventory item is found.

The item detail screen can include a selectable list of locations, the pre-programmed inventory item list filtered to include the pre-programmed inventory items linked with the selected location and displayed from the Quick Pick Items list. The item detail screen can include a selectable list of categories, the items in the pre-programmed inventory item list linked with one or more of the categories in the category list; and one or more fields selected from a group consisting of descriptive notes, audio, video, documents, warranty information and maintenance records to associate with an item in the inventory list.

The algorithm further includes a document upload function to allow the user to upload one or more documents into the inventory system and link the one or more uploaded documents with one or more items in the inventory list, and an image upload function to allow the user to upload one or more images into the inventory system and link the one or more uploaded image with one or more items in the inventory list.

The algorithm further includes a reminder screen that includes a reminder description field to identify the reminder and a date field to enter a date for the automatic email reminder to be sent to allow the user to schedule reminders. The reminder screen can include one or more fields selected from a group consisting of a priority filed for the user to assign a priority to the reminder, a repeat frequency field to schedule repeat reminders, a repeat times field to select a number of times for automatically sending the email reminder and an email cc field to schedule the reminder to be sent to a third party.

A third embodiment provides a method for completing an inventory that includes the steps of accessing an inventory system stored on a server, adding plural items to an inventory list, the inventory screen allowing the user to add an individual item to the inventory list or to add multiple items selected from a list of pre-programmed inventory item list, the adding plural items includes the step of selecting Add New item to add each individual item into the inventory, and selecting Add Multiple Inventory Items to enter multiple inventory items from a set of preprogrammed items.

The add multiple items can further include entering details about the plural items including one or more physical property where the inventory item is found, the physical property separately identifiable by a different postal address corresponding to one of a residential property postal address and a business property postal address. The selecting add multiple items step can include the steps of selecting one or more items details selecting from a group consisting of property address, room location within the property, and category; selecting multiple items from a preprogrammed Quick Pick list of items corresponding to the room location and category or from the All Items list; entering one or more item details selected from a group consisting of date added, purchase price, replacement cost, condition, brand, model number, serial number, inventory number and scan code, and beneficiary, uploading a document and an image into the inventory system, and linking the document and the image to one or more items in the inventory list.

A fourth embodiment provides a method for completing an inventory that provides the user with a great deal of flexibility to customize the inventory to suit their needs by having the capability to add unlimited properties, custom room locations, custom categories, any beneficiaries, and third parties, with the ability to customize pages depictions to suit the needs of the user; and includes performing additional steps for a more complete and accurate inventory, as well as to be able to certify an independent person other than the owner verified the items entered into the inventory. Specifically, in addition to taking individual pictures of items, this method also includes a procedure for an "item" being entered into the inventory list for each room/area that is called "Overview X", for example: "Overview Family Room". Pictures stored in this item's "Item Detail" tab for this room would normally include pictures taken from the 4 corners of the room that are wide-angle shots. Other wide angle pictures are taken as needed based on the room or area's size and shape. An overview video may also be taken of the room and stored in the video tab. These pictures and videos can be done in either order and uploaded on the client's property or off the client's property. An overview selection is available for listed rooms on the Add Multiple Item Palette for quick overview room entry into the inventory. These overviews substantiate the fact that the item was actually at the property and location at the time of the inventory. An unlimited number of outside pictures may be taken of each individual property listed in the inventory and stored in the Properties tab. FIG. 1g. Upon completion of the inventory service, although everything is stored and accessible on the secure website, the client may also be provided copies of the pictures and videos on CD's and DVD's.

A fifth embodiment provides a method of integrating this inventory program, its algorithms, and inventory system with voice recognition software to verbally populate any text fields or portions of the inventory and tabs and sub-tabs throughout the inventory system. Further objects and advantages of this invention will be apparent from the following detailed description of preferred embodiments, which are illustrated schematically in the accompanying drawings.

BRIEF DESCRIPTION OF THE FIGURES

FIG. 1c shows an example of a screen shot of the Video sub-tab of the Item Details tab to associate video with an inventory item.

FIG. 1d shows an example of a screen shot of the sub-tab of the Item Details tab linking documents with an inventory item.

FIG. 1e shows an example of a screen shot of the Maintenance/Repairs sub-tab of the Item Details tab for item details for maintenance and/or repair records for a specific inventory item.

FIG. 1f shows an example of a screen shot for listing real properties, the contents of which are generally inventoried.

FIG. 1g shows an example of a screen shot of a list of independent properties included in the client's account that can be inventoried. When the property is selected unlimited images and descriptive information can be stored and viewed.

FIG. 1h shows an example of a screen shot for an Estate Planning tab.

FIG. 1i shows an example of an Inventory 100 tab screen shot that a new client sees before any items are entered. It shows the "Add New Items" button and the "Add Multiple Items" button.

FIG. 1j shows an example of a screen shot for when the Add New Item button is selected and the item entry memory tool with "Remember" buttons is displayed.

FIG. 1L-2 shows an example of the bottom portion of the Add Multiple Inventory Items palette, and includes the location of the "Add to Inventory" button.

FIG. 1m shows an example of an Inventory tab screen shot with the Add New Item button selected to enter an item into the inventory displaying the "Remember" boxes, the "Save and Add More Items button, the "Save and Add Details" button, and the "Cancel" button.

FIG. 1o is an Item Detail tab screen shot that displays all the sub-tabs, and specifically, the Item Reminder sub-tab is used to initiate an item reminder to automatically send an email message to the user.

FIG. 1r shows an example of the Reminders tab screen shot showing a list of scheduled reminders.

FIG. 1s is a screen shot of the Reminders tab screen with a new reminder added to the reminder list from FIG. 1q.

FIG. 1t is a screen shot of the Reminders tab screen with the Create Reminder window opened to enter a new reminder.

FIG. 2d shows an example of a screen shot under the Settings tab, more specifically, the Beneficiaries sub-tab.

FIG. 2f shows an example of a screen shot under the Settings tab, then 3$^{rd}$ Party Login History 570 tab, with sub-tab Third Party Login History tab.

FIG. 2g shows another example of a screen shot under the Settings tab for 3$^{rd}$ Party Login History tab, with sub-tab Authorized Inventory Professional Login.

FIG. 3 shows an example of the screen the user sees on the Items Detail page after an item has been selected from the list of inventory items displayed under the Inventory tab.

FIG. 5b shows steps for a Batch Image upload and illustrates the search feature when typing the item to match the photo. A Batch Document upload mirrors the same steps.

FIG. 6 shows an example of a screen shot for warranty information for each of the inventory items.

FIG. 12 shows an example of an administration screen for reseller commission, more specifically, any unpaid commissions.

FIG. 20a shows a screen shot of the Users sub-tab below a Reseller tab for a person qualified as an Authorized Inventory Professional, and will show the "Login As" button on an Authorized Inventory Professional's User sub-tab that appears when permission has been granted for an inventory by the respective client.

FIG. 20d is a screen shot of the Users sub-tab below a Reseller tab for a person qualified only as a Reseller.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1A:
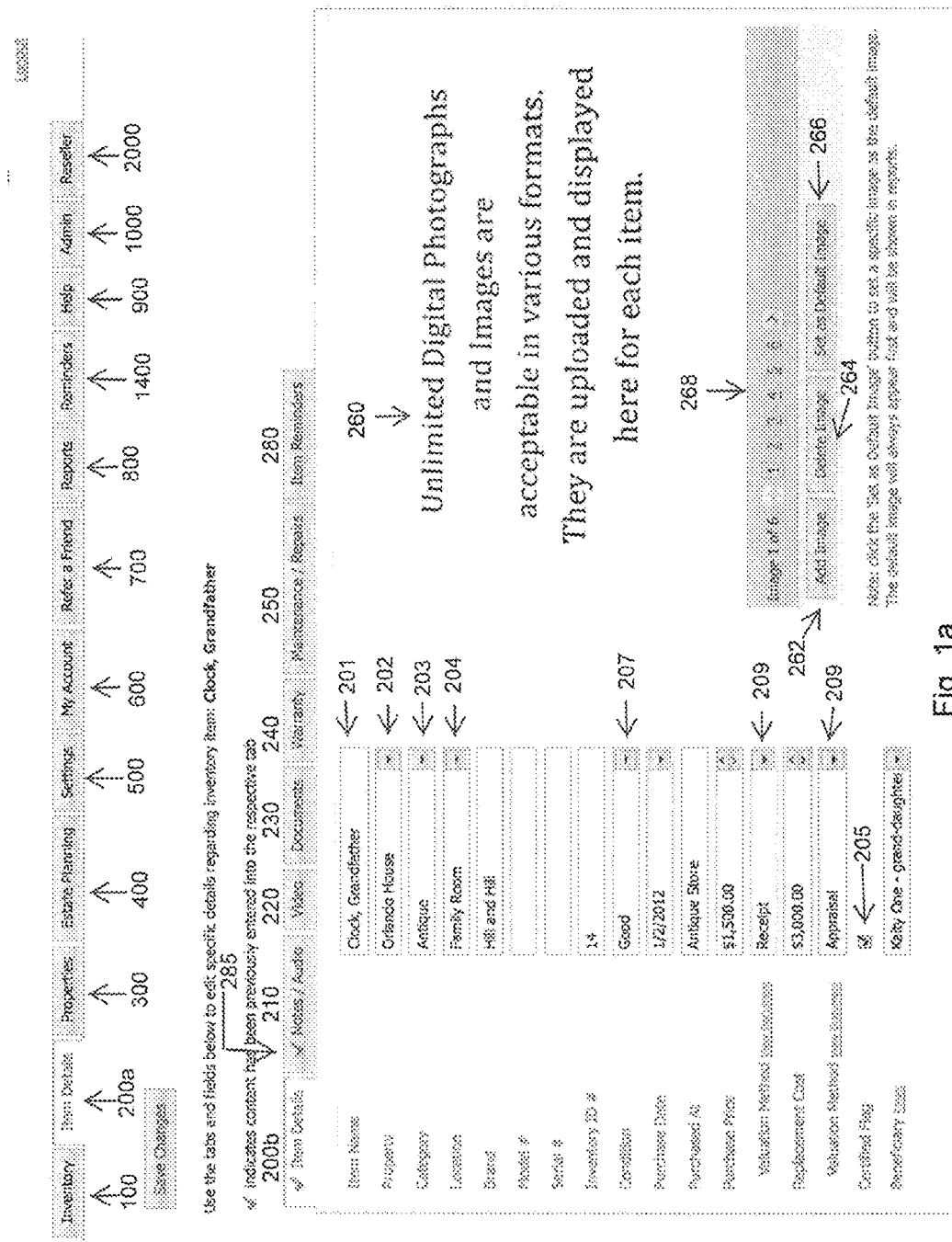
FIG. 1a shows an example of a display screen after a user has logged into an account, selects an item from the inventory list on the Inventory tab, which then takes them to the Item Detail tab for the respective item.

The following is a list of reference numerals used in the description and the drawings to identify components:
100 inventory tabs
105 columns box
107 column chooser
130 add new item button
135 add multiple invntry items palette
140 item name field
141 property field
142 add multiple items button
143 location field
144 category field 145 quick pick items
146 all items list
147 add items to inventory button
150 remember property box
151 remember category box
152 remember location box
160 save & add more items button
170 save and add details button
175 cancel button
200a item details main tab
200b item details tab
201 item name filed
202 property field
203 category field
204 location field
205 certified box
207 condition field
209 valuation method icon
210 notes/audio tab
212 note
214 add new audio file icon
215 note/audio name field
216 note/audio file name field
217 note/audio file size
218 save changes
220 video tab
224 add new video icon
225 video file descriptive name
227 video file size
228 save video changes
230 documents tab
234 add new document icon
235 document name field
236 document type field
237 document file name field
238 document file size field
240 warranty tab
250 maintenance/repair tab
260 image options
262 add image icon
264 delete image icon
266 set default image icon
268 image selection
270 create reminder
272 reminder description
274 reminder due date
276 repeat frequency
277 repeat times
279 email cc
280 Item Reminders
282 remind me box
285 checkmark content indicator
300 Properties tab
400 Estate planning tab
500 Settings tab
510 allow access box
520 category settings tab
530 location settings tab
540 document type settings
550 beneficiaries settings tab
560 3rd party login setting tab
570 3rd party login history tab
572 3rd party login history tab
574 authorized inventory—login hist
580 permission settings tab
585 permission authorization box
590 batch image uploader sub-tab
592 item select box
595 batch document uploader sub-tab
597 item match dropdown menu
600 My Account tab
800 Reports tab
900 help tab
1000 administration tab
1100 Admin pricing tab
1200 Admin emails tab
1300 admin refer a friend
1400 Reminders tab
1500 admin transactions tab
1550 Admin tab, Items sub-tab
1560 Admin tab, Location sub-tab
1565 opens quick pick selection list
1566 save quick pick items button
1570 edit button
1600 admin reseller commission tab
1700 Items sub-tab of Admin tab
1710 add new item name button
1720 sort bar alphabetize or reverse
1730 item search window
1740 edit item
1750 delete item
1900 User sub-tab of Admin tab
1920 client edit button
1930 login as client button
1940 send welcome email button
1945 column search window
1947 user detail window
1950 renewal date
1952 role of user
1954 client name
1956 active client box
1958 AIP qualification box
1960 minimum trip charge
1962 maximum trip charge
1964 minimum hourly rate
1966 maximum hourly rare
1968 job commission percentage
1970 software commission percentage
1972 save button
1974 cancel button
1980 default sales commission
1981 default commission set window
1982 renewal commission amount
1984 unpaid commission
1986 commission payment summary
1988 paid commissions
1990 reseller's renewal comsn set window
1992 save button
2000 reseller tab
2100 AIP users sub-tab of reseller tab
2110 login as button
2200 AIP inventory jobs sub-tab
2300 AIP commissions sub-tab The present invention provides methods and systems to complete an inventory of the personal property for any individual, family or business. As shown in FIG. 1a, after the user has logged into his account, the user is presented with a row of account tabs allowing the user to select one of the account tabs such as Inventory 100, Item Details 200a, Properties tab 300, Estate Planning tab 400, Settings tab 500, My Account tab 600, Refer a Friend tab 700, Reports tab 800, Reminder tab 1400, Help tab 900, Admin. tab 1000, and Reseller tab 2000. In the Example shown, the user selects the Inventory tab and uses the "Add New Item" button or the "Add Multiple Inventory Items" button to enter items into the inventory. When the user selects an item from the inventory list, the user is taken to the "Item Details" main tab 200*a* at the top of the screen to create the detailed information for the item, and build an inventory list and is presented with a column of item details 200*b* corresponding to details about a specific item in the inventory. The Items Detail window, and each inventory screen that shows a list, such as a list of inventory items, includes a window that allows the list to be searched, filtered or sorted.

FIG. 1*i* shows an example of an Inventory 100 tab screen shot that a new client sees before any items are entered. When the user clicks on the Add New Item button 130, an Add Multiple Item Memory Tool is displayed that speeds up the inventory process.

Figure 1B:
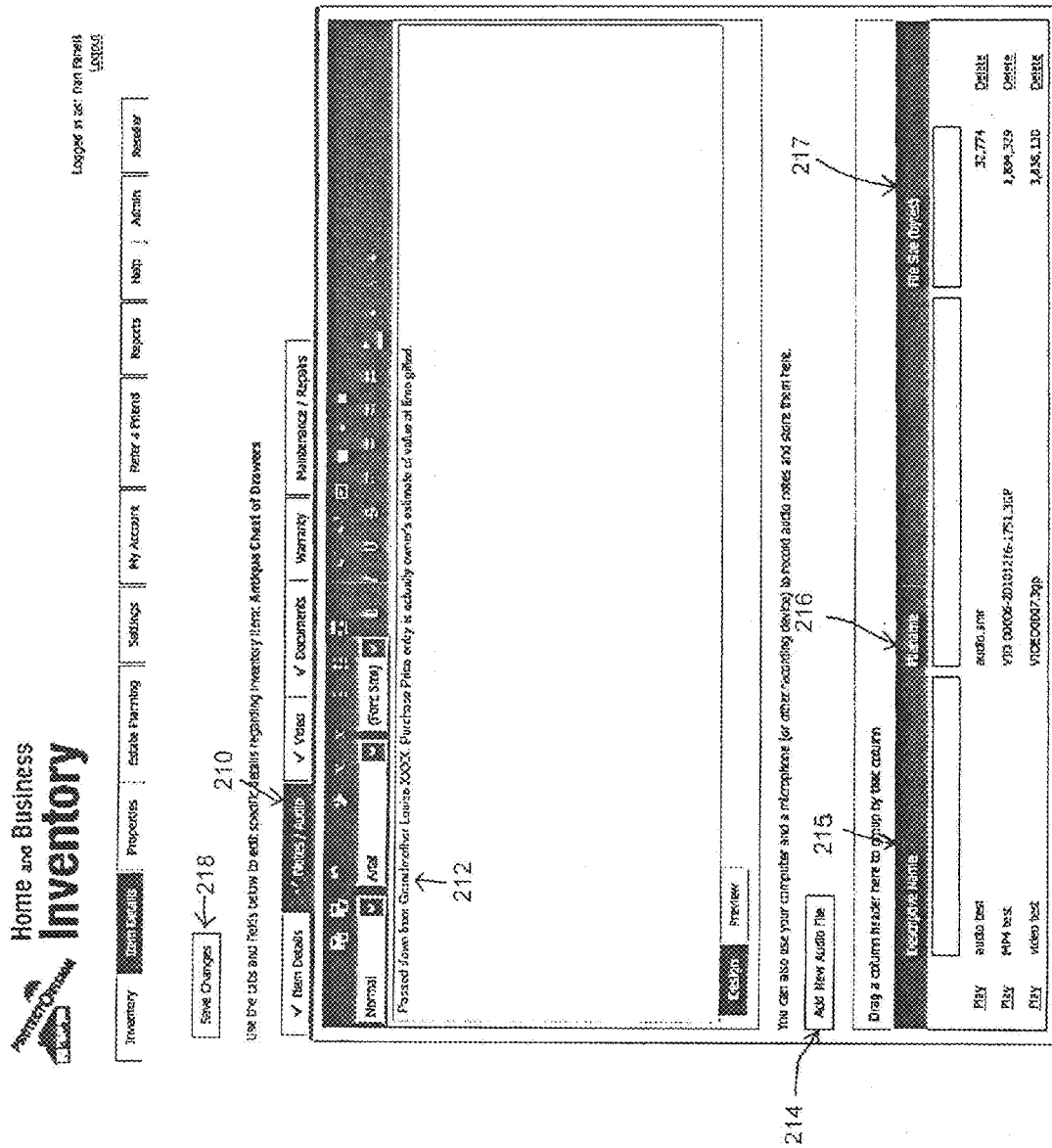
FIG. 1b shows an example of a screen shot of the Notes/Audio sub-tab of the Item Details tab for notes and audio for an inventory item.
Figure 11:
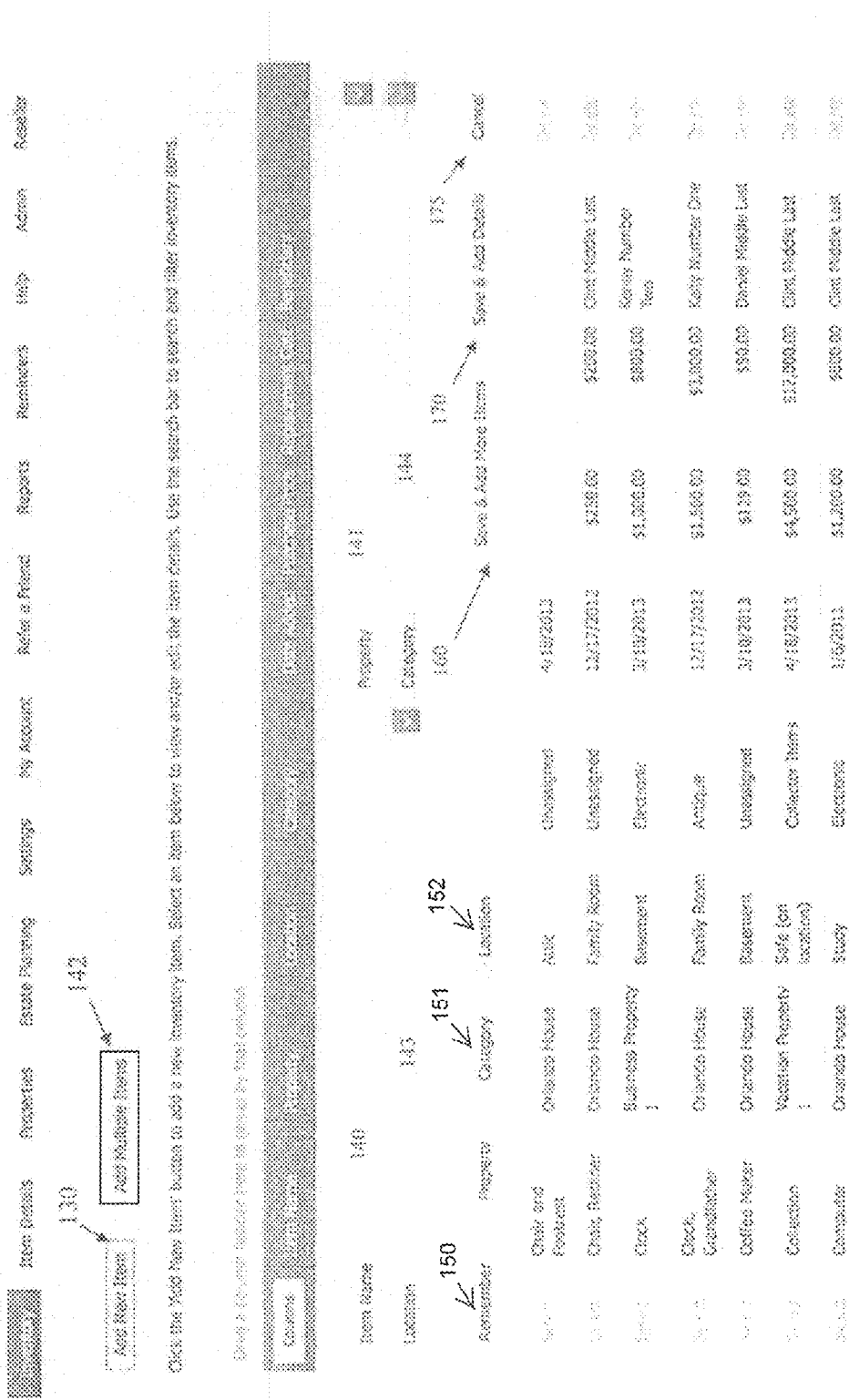
FIG. 11a shows an example of an administration screen for reseller renewal commission.
FIG. 11b shows an example of an Item sub-tab for the Admin tab, where the list of pre-stored items is accessed, and new items can be added.
FIG. 11c is a screen shot of the Admin tab, Locations sub-tab, where the list of locations is found, new locations can be added, and the respective room's Quick Pick Items can be accessed and update by clicking on the plus sign.
FIG. 11d is a screen shot of the top portion of the screen for the Admin tab, Locations sub-tab after the plus sign has been clicked-on by the Administrator to select the items for each respective room, in this example the Basement, that will go in that room's Quick Pick Items portion of the Add Multiple Inventory Item palette.
FIG. 11e is a screen shot of the bottom portion of FIG. 11d that shows where the "Save Quick Pick Items" button is located to put selected items in the "Quick Pick" list.
Figure 1K:
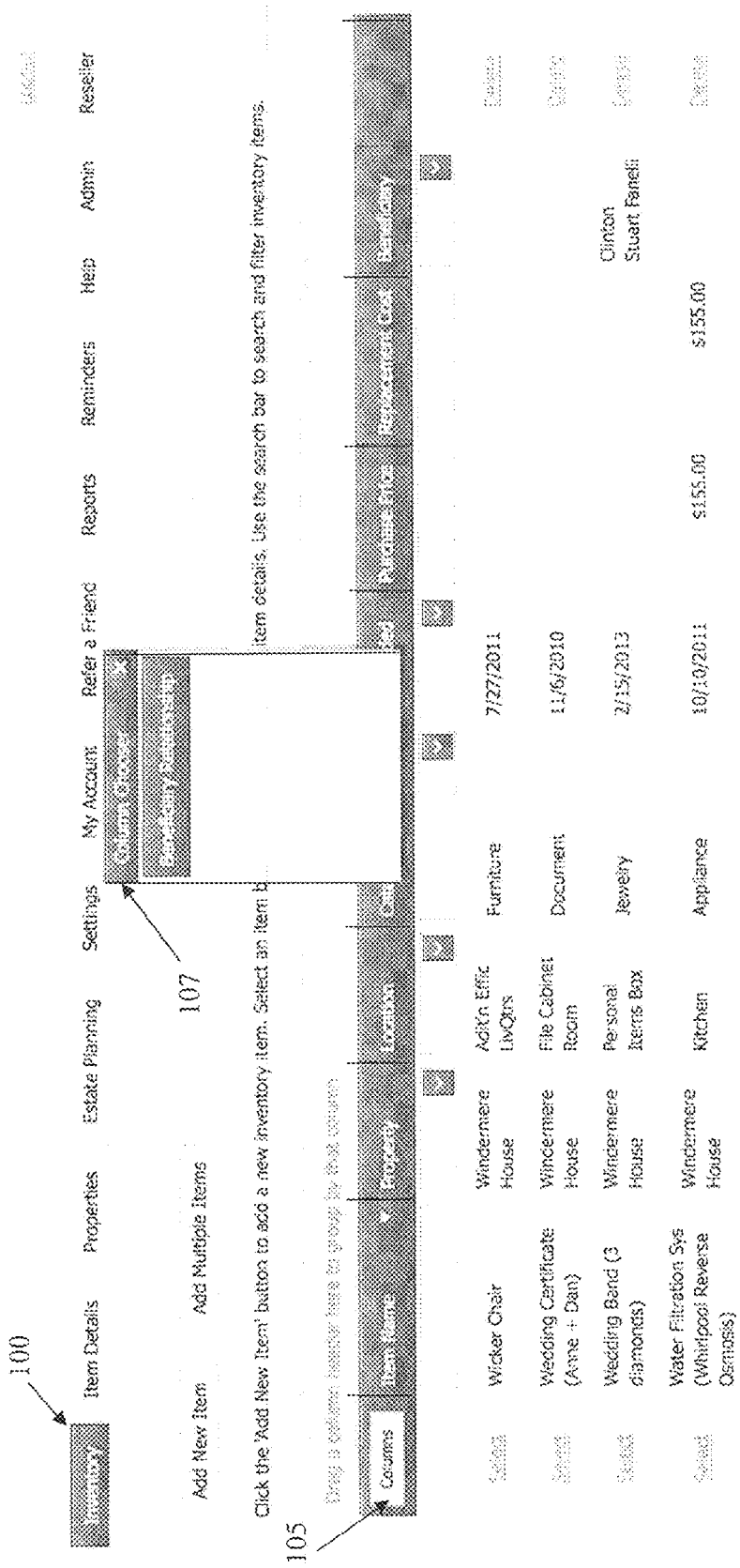
FIG. 1k shows an example of an Inventory tab screen shot used to select, add items, and add multiple items to an inventory list. It includes the "Columns" box checked to open the "Column Chooser" box. Unneeded columns can be removed from screen and put in the "Column Chooser" box or taken from the "Column chooser" box for the column to display on the screen.

FIG. 1*k* shows a box that is called the "Column Chooser" 107 that is opened by clicking on the "Columns" box 105, which is located on the far left of the page just above the "Select" buttons for all the items. The name of each column can be dragged out of the "Chooser Box" and put next to any column, to become a new column, as demonstrated by the "Beneficiary Relationship" column in the "Column Chooser" box. Any of the current columns can be removed and put in the "Chooser Box", or they can be dragged to be in a different order. Also, the top of each column name identifier, such as Item Name, Property, Location, and so on can be clicked on to have the column be sorted in alphabetical order, and then clicked again to be in reverse alphabetical order.

Figures 1, 1L:
FIG. 1L-1 shows a screen shot of the top portion of the Add Multiple Inventory Items palette, which is used to add multiple inventory items to an inventory list all at once by the user.
Figure 1C:
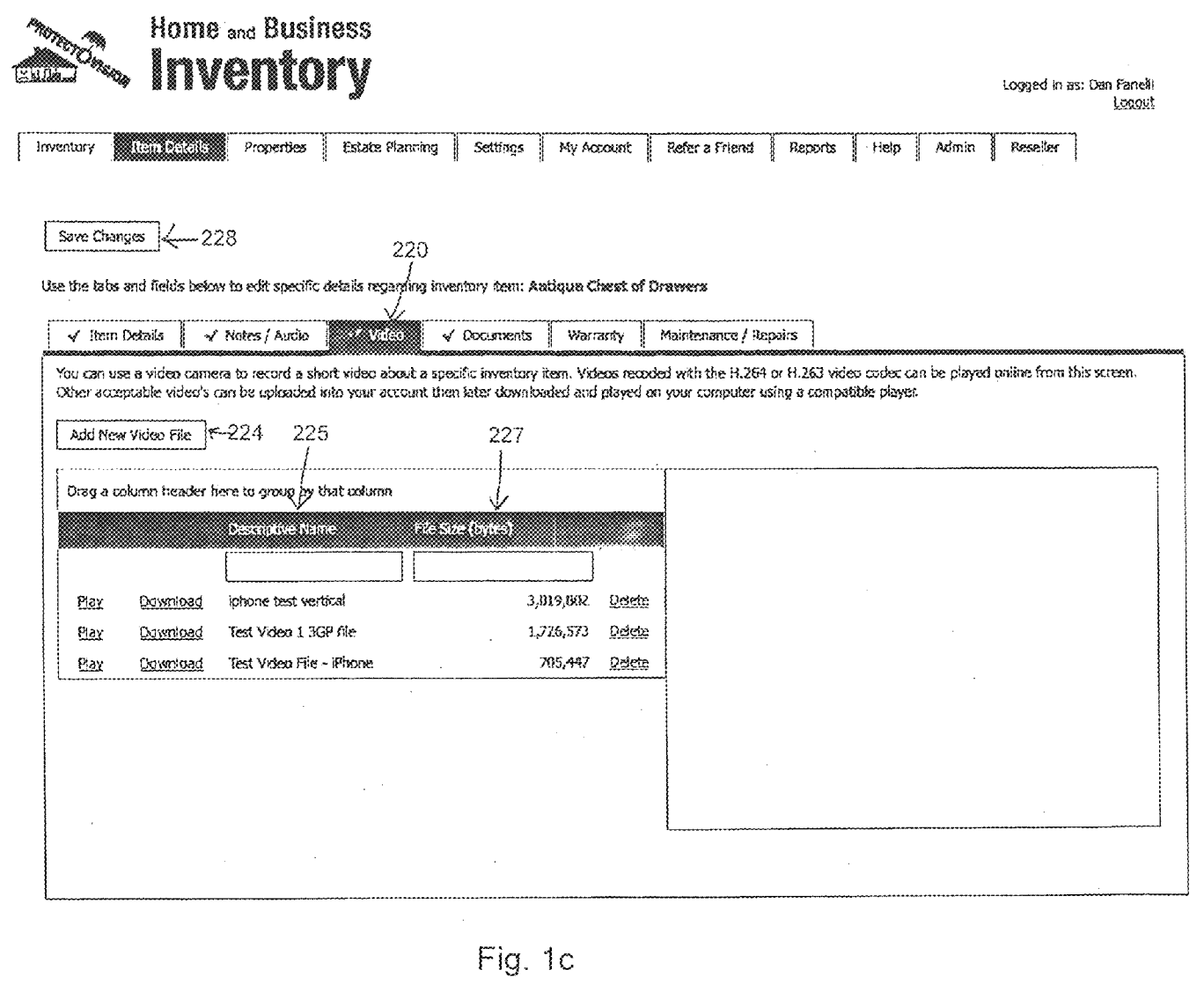
Figure 1D:
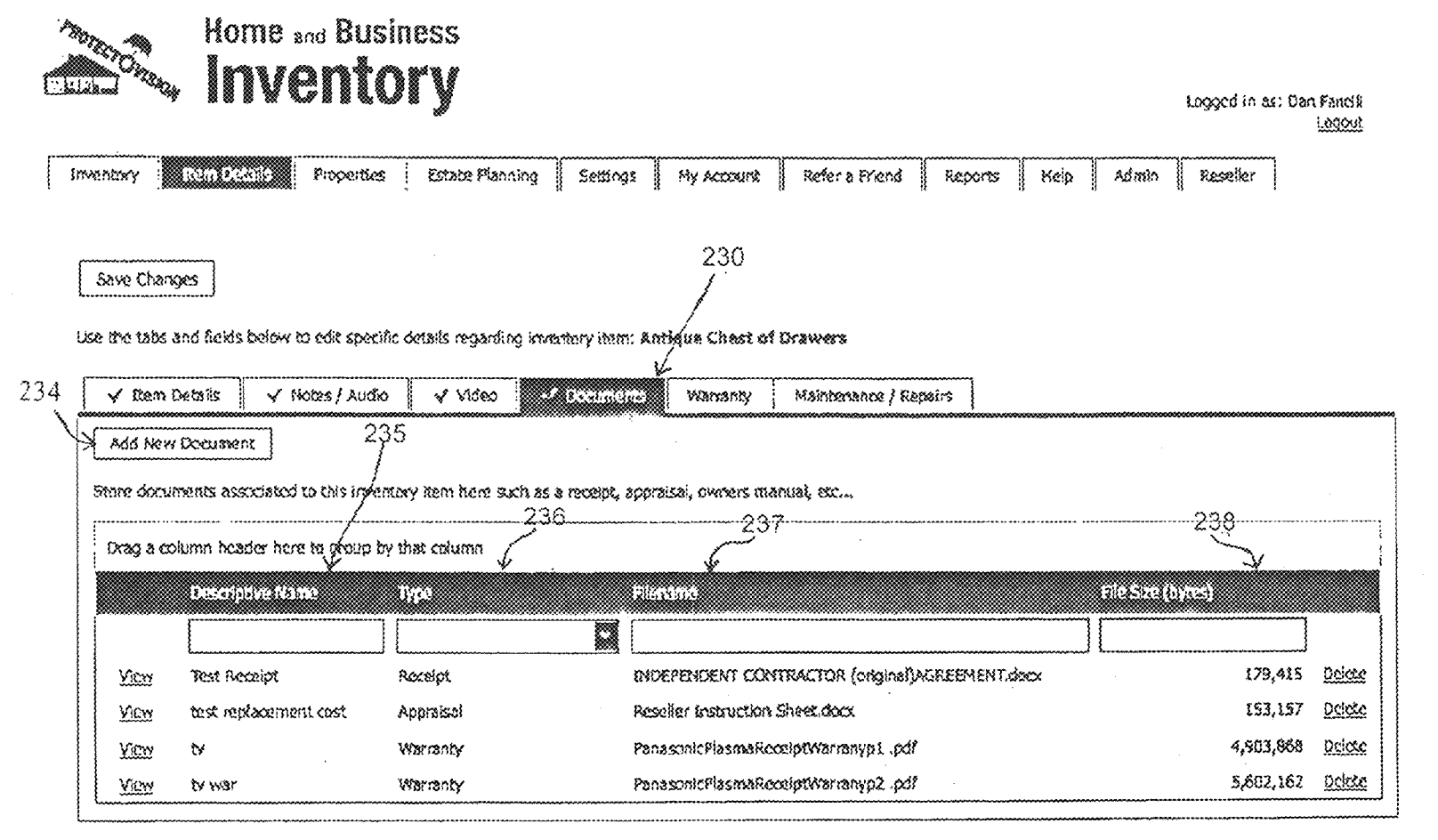
Figure 1E:
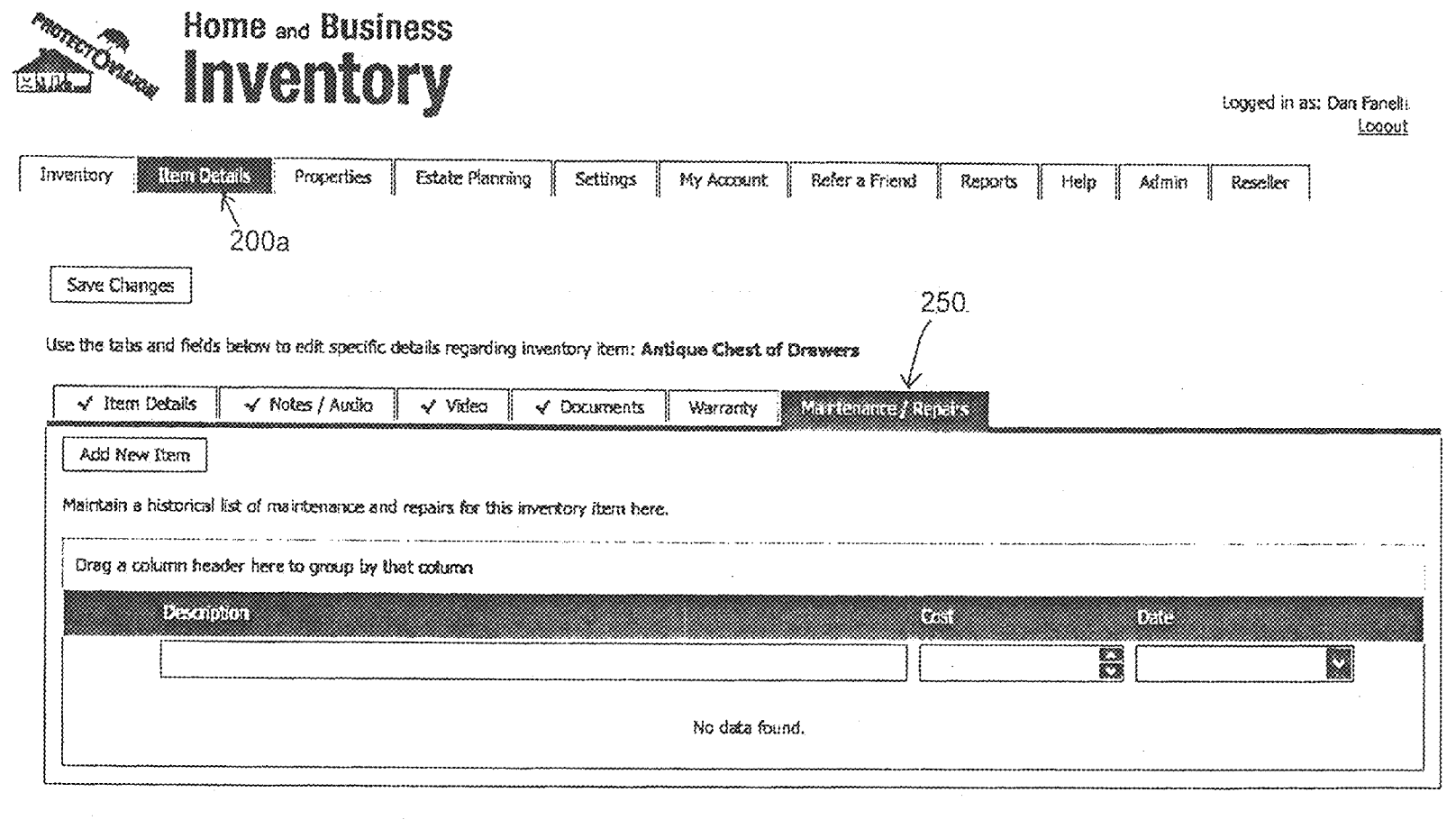
Figure 1F:
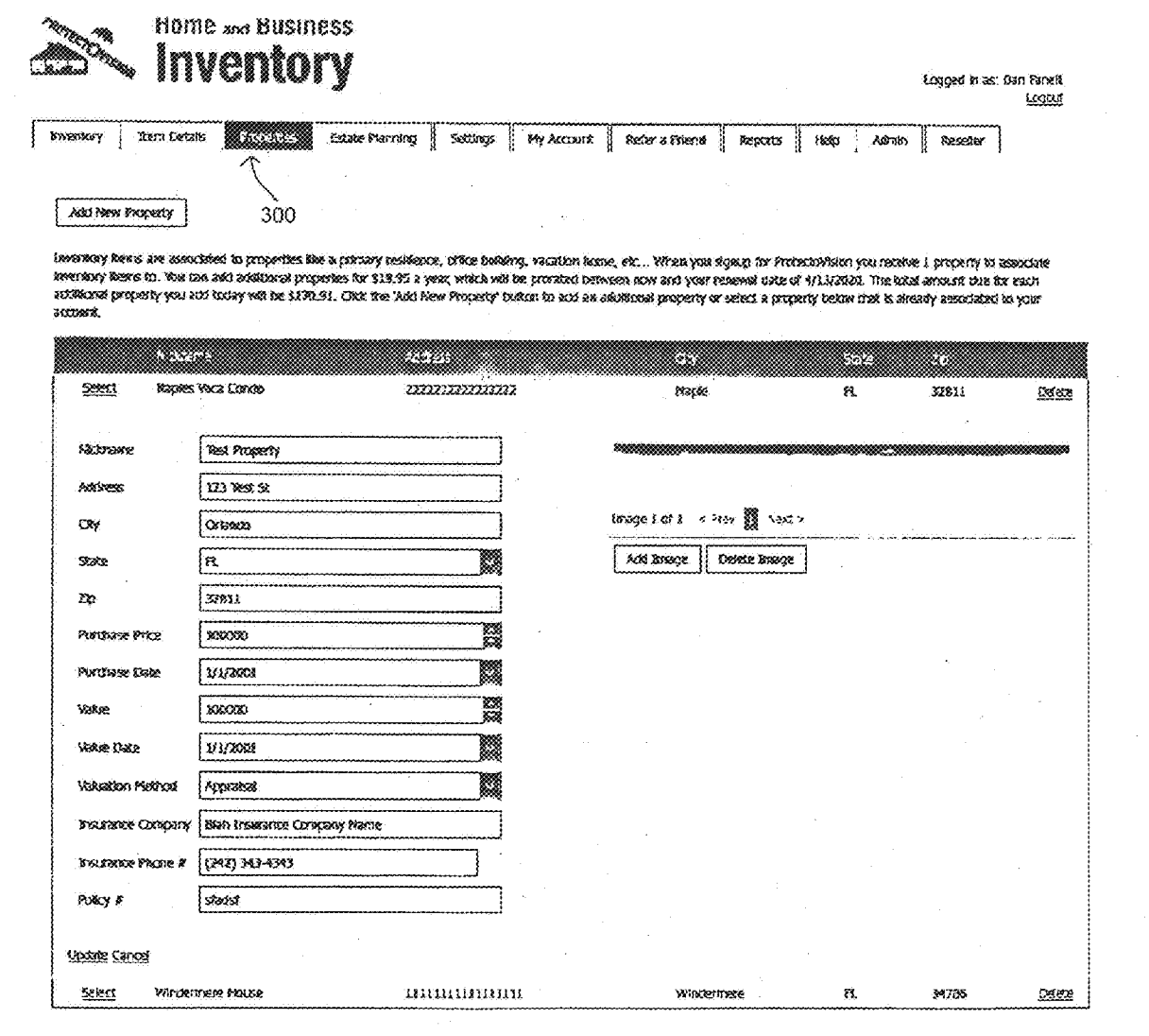
Figure 1I:
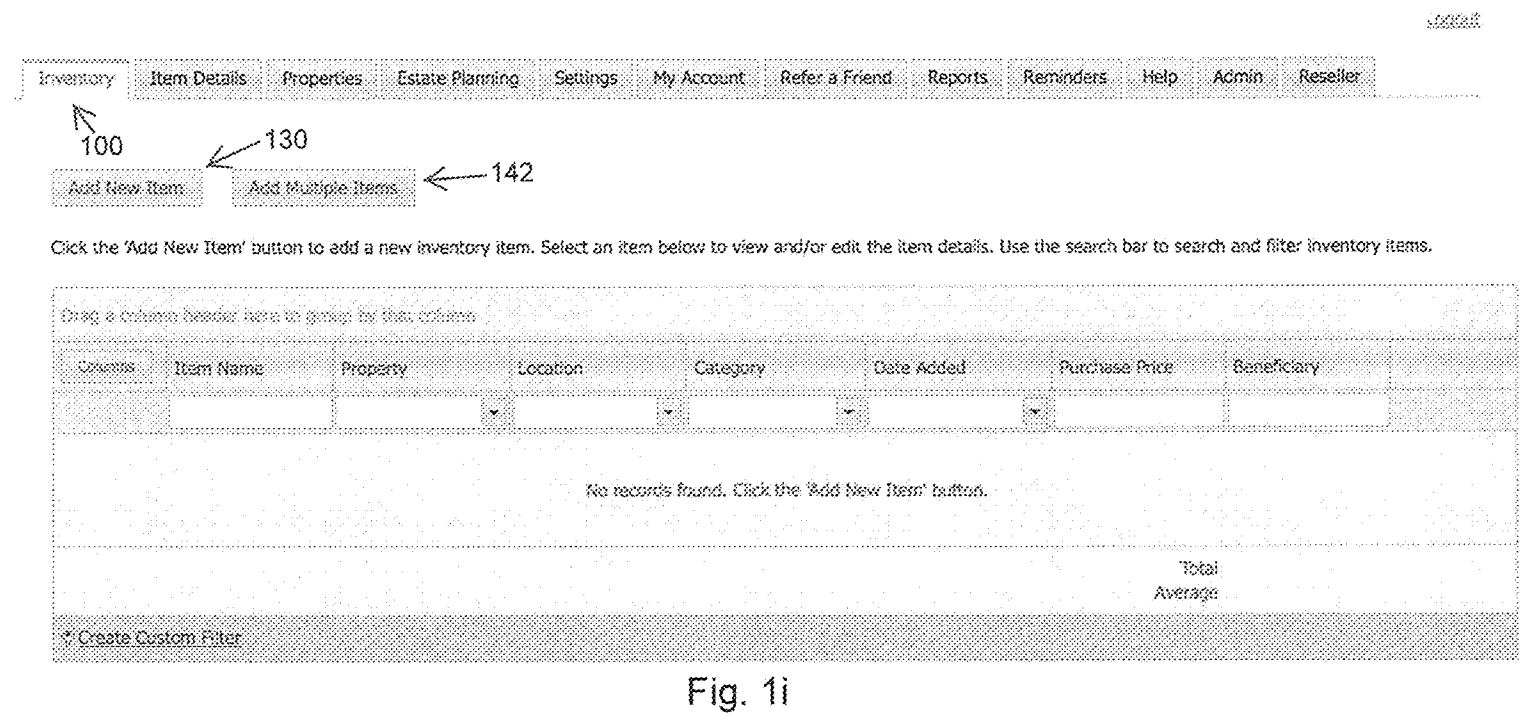
Figure 1M:
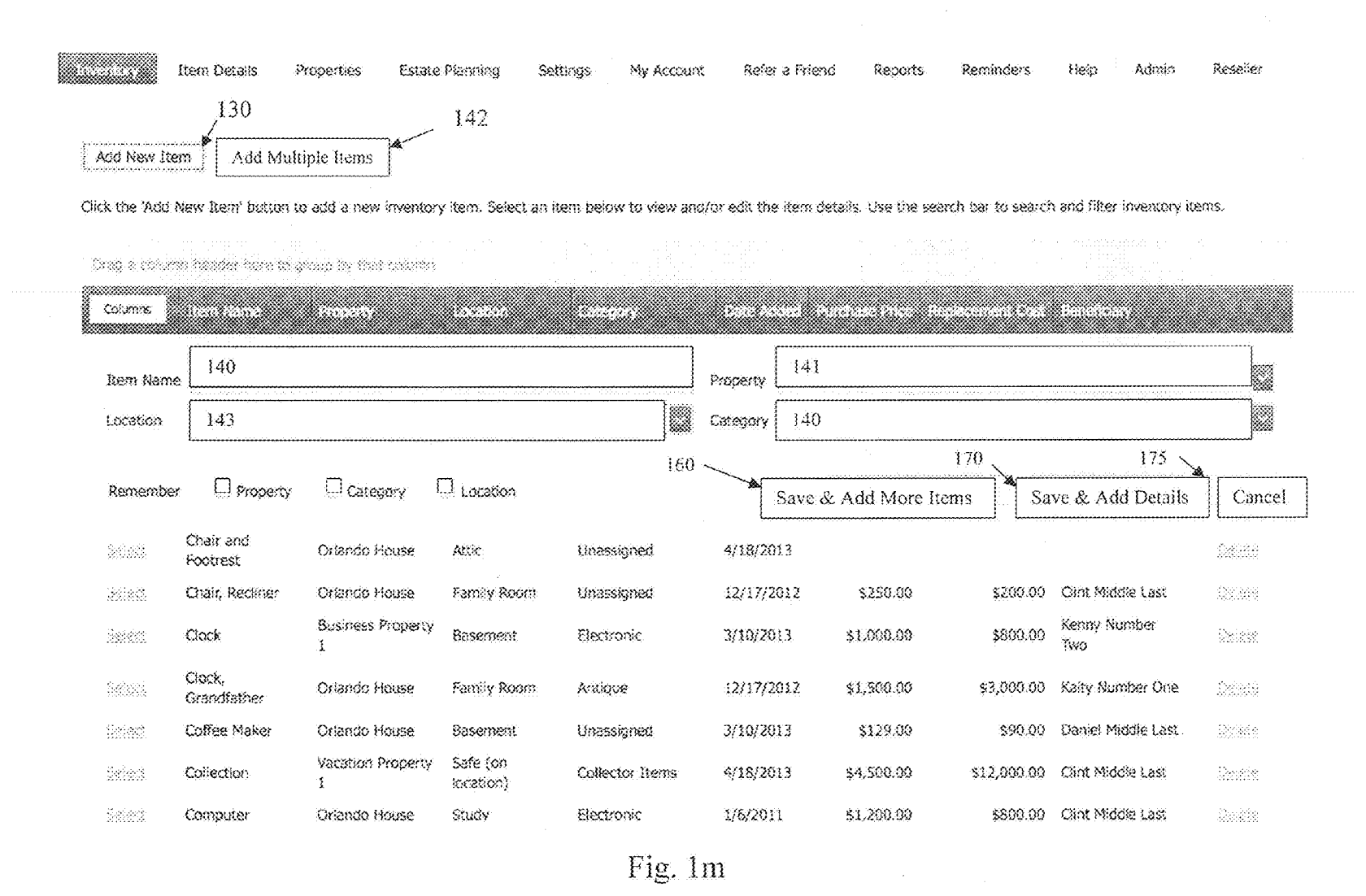
Figure 1N:
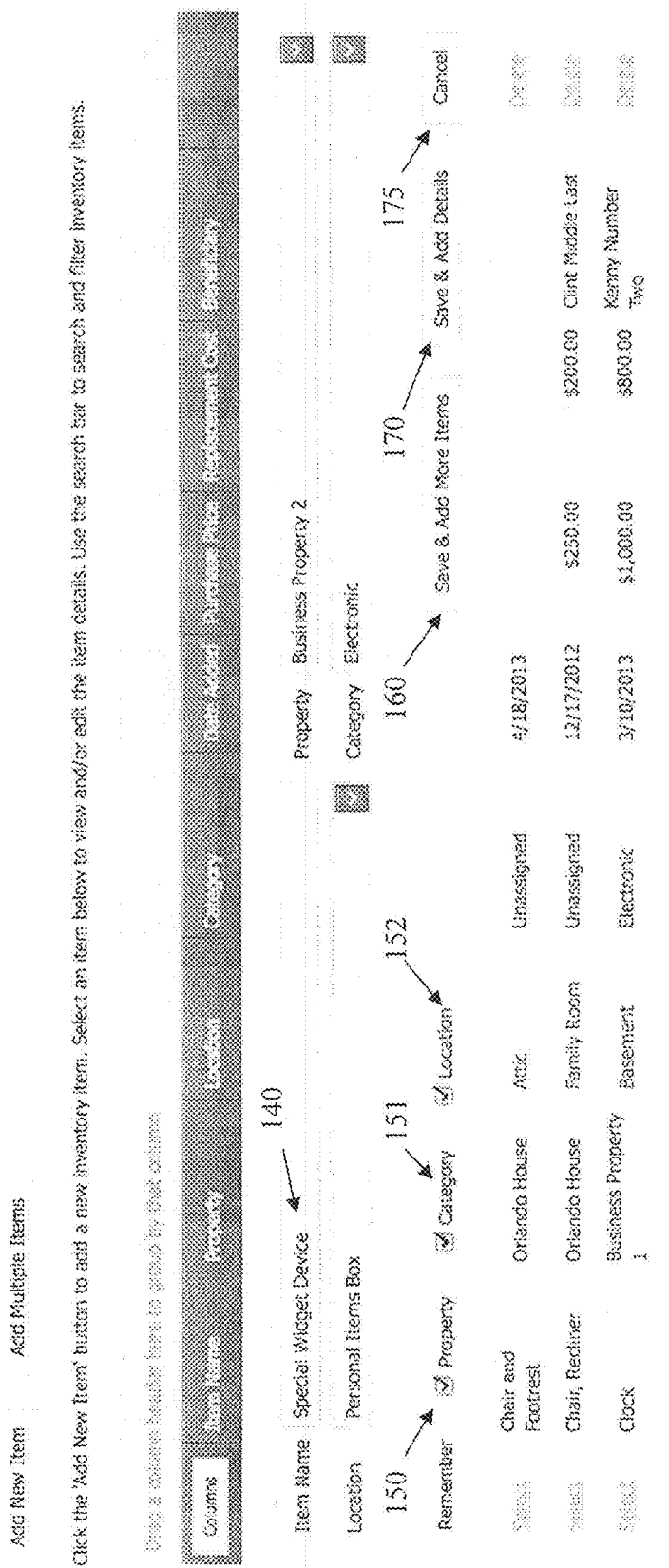
FIG. 1n is a screen shot for adding a new inventory item using the "Add New Item" button. Appropriate selections made to enter an item, and "Remember" boxes checked.

FIG. 1*j* and FIG. 1*n* show an example of the Add Multiple Item 142 memory tool showing the items already entered, and the fields for the user to add additional items to the inventory. As shown, the Add Multiple Item Memory 142 Tool screen is one way items are entered into the inventory. The Add Multiple Item Memory Tool has memory check boxes to allow the user to selectively remember the previous entry location 151, category 152, or property 153, respectively, so that the user does not have to fill it in again when working in the same location, property, or same category item. The user can select one or all of the check boxes to remember specific information for the next item to be entered. As shown, there is also a Save & Add More Items 160 button for adding multiple items, and a Save & Add Details button 170 to save the item entered and then add details about the item. The inventory system displays the Add New Item 130 button 130, Item Name 140, Property 141, Location 143, Category 144, Remember box for Property 150, Remember box for Category 151, Remember box for Location 152.

FIG. 1*m* shows an example of a screen shot of the Inventory tab 100 showing a list of inventory items that have already been entered, and the Add New Item boxes that are opened after the Add New Item box 130 has been selected. The user identifies the property in the property field 141 and selects a room location 143. From the inventory screen the user can select Add New Item 130 to add inventory items one at a time or the user can select the Add Multiple Inventory Items 142 to an inventory list. As shown in FIG. 1L (top), when the user selects the Add Multiple Inventory Items button 142, the screen displays a list of pre-programmed inventory Quick Pick Items 145 that are commonly found in the room location that can all be added to the list at one time by simply checking the box next to each item to be added, including those items selected in the "All Items" area 146.

The Add Multiple Item Pallet screen palette has three distinct parts. First, the user selects Property 141, Room Location 143, and optionally Category 144. For each item entered from this palette there is a "These items are Certified" box 205 that is activated only when the individual completing the inventory is an Authorized Inventory Professional and the box is checked. When a "Room Location" is selected, the "Quick Pick Items" 145 list populates with pre-programmed items most likely found in the selected room location.

Figure 11A:
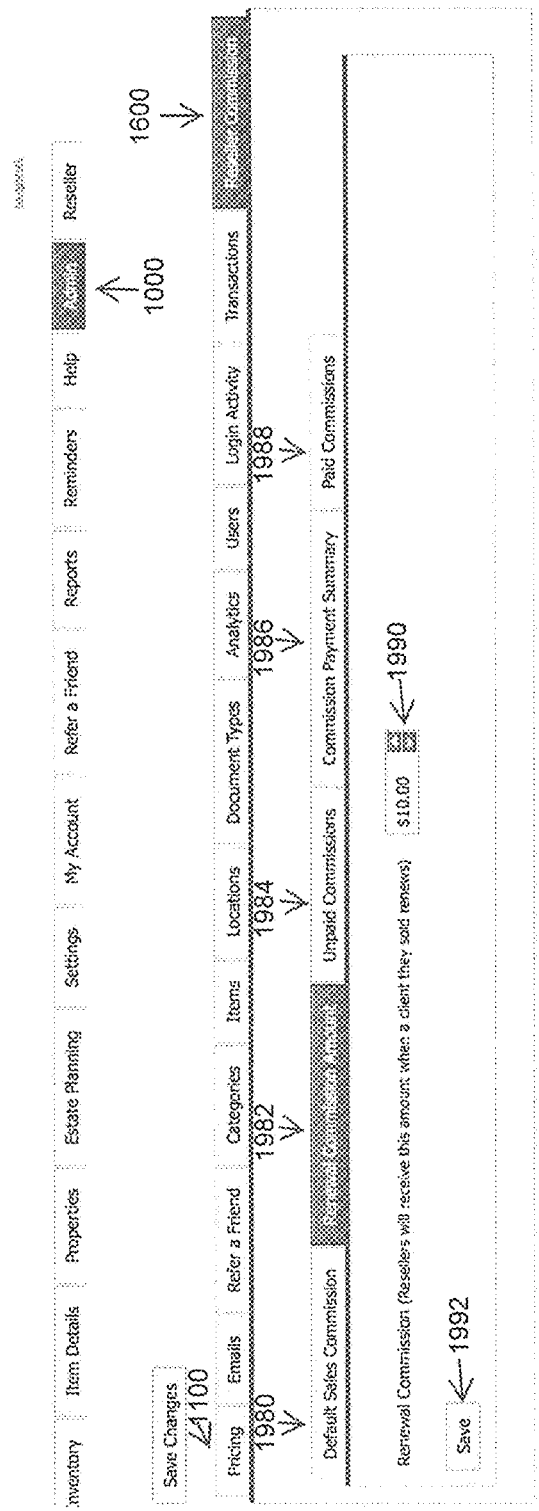

The list of pre-programmed items displayed in the "Quick Pick Items" list 145 is selected by the Administrator for each respective "Room Location" 143 and the list can only be revised by the Administrator. First the Administrator must enter items into an Items list found in FIG. 11*b*. Items are added to the Items list when the Administrator clicks the "Admin" tab 1000, "Items" sub-tab, and enters new items by using the "Add New Item Name" button 1710. Items can be edited using the "Edit" button 1740 and "Deleted" using 1750 These items can then be used by FIGS. 11*d* and 11*e* where a room location is selected and then the specific items appear that are in that room location's Quick Pick list. To add items and edit items on the "Quick Pick Items" list, the Administrator clicks the "Admin" tab 1000, "Locations" sub-tab, and selects the "+" symbol 1565 to the left of the "edit" button 1570 as shown in FIG. 11*c*.

When "Category" 144 is selected on the Add Multiple Item Palette screen FIG. 1L top, the program can reduce the items displayed in the "Quick Pick Items" list 145 even further to display only those items for the specific room further limited by the specific category selected. This function can be activated and deactivated by the user. The "Quick Pick Items" list 145 that is displayed after the Property 141, Room Location 143, and optional category field 144 have been selected by the user is the second area displayed on the screen.

The third area displayed is the "All Items" list 146, which includes all of the items in the pre-stored inventory list regardless of location or category. The "Add Items to Inventory" button 147 is located in the lower portion of FIG. 1L bottom to add the newly entered item into the user's inventory list. The items in both lists are alphabetized across the page so the user does not have to scroll up and down the page as often when searching for an alphabetized item. Alternatively the two lists could be alphabetized vertically. For quick identification, items previously added to the inventory from this screen are displayed with a different color text, for example, in red text based on the same respective Property and Room Location, and optional Category.

As previously discussed, the screen displays an alphabetical list of pre-programmed "All Items" list 146 to select inventory items from. For example, the user can select the "furniture" category to filter the quick pick items list to furniture and then check boxes next to the quick pick furniture items that are found at the location and property selected. After the furniture is added to the inventory, the user can select another category or can elect to just add inventory items without categorizing the items. FIGS. 11*d* and 11*e* at Admin tab, Locations sub-tab are the top and bottom portions respectively of the same screen that the administrator uses to add multiple items in each selected room. After all the Item have been selected that are common to that particular room from the entire list of pre-stored Items, the administrator clicks on the "Save Quick Pick Items" button 156 at the bottom of the screen to save these as the "Quick Pick Items" for the respective room. The administrator can revise each room's "Quick Pick" by reopening this page and selecting or deselecting the Items to update the "Quick Pick" list and saving it with button 1566.

FIG. 1*m* is a screen shot of an inventory screen showing a list of items in the inventory and allowing the user to add an individual item by completing the item name field 140, property, 141, location 143 and category 144 then the user can save & add more items 160, save & add details 170 or cancel 175.

As shown in FIG. 1*n*, after the user has entered an item name, property 141, location 143 and or category 144, the user can elect to remember property 150, category 151 or location 152. If one or more of the remember boxes are checked, after the user selects save and add more items, the corresponding field is automatically populated with the remembered information.

Alternatively, the user can select to save and add details 170 or to cancel 175 the entry. In the example shown, the user enters new item name: Special Widget Device. After the user clicks on save & add details 170 in FIG. 1*n*, the screen shot shown in FIG. 1*o* is displayed for entering details about the Special Widget Device. In the preferred embodiment shown, the item detail tab 200*b* can include a information that more distinctly describes the item such as property 202, category 203, location 204, brand, Model No., Beneficiary and the like.

Other entry options under the item detail tab 200*b* include inventory ID or BAR CODE; item Condition, Purchase Date, Purchase Location, Purchase Price, Valuation Method, and Replacement Cost. For the purchase price valuation method and replacement cost valuation method, there is a drop-down menu with 3 options: owner estimate, receipt, and appraisal. Also, the user can include an image of a document such as a receipt or an appraisal corresponding to the item. As shown, if an image is linked with the valuation method, the user can view the image by clicking on the "view document" icon.

When using inventory item recognition software in other embodiments, items can be entered automatically from the uploaded images or video. Another embodiment includes using voice recognition software to verbally populate any text fields or portions of the inventory and tabs and sub-tabs throughout the inventory system.

If the user is a new client, the inventory list is blank when the inventory tab 100 is clicked, as shown in FIG. 1*i*. When a returning user who has stored items in their inventory clicks on the Inventory tab 100, a list of inventory items is displayed as shown in FIG. 1*k*. From the inventory screen, the user can add new items, delete an item or edit information about the items by selecting one of the items in the list.

Referring back to FIG. 1*a*, from the item details tab 200*b*, the user enters a physical property where the inventory item is found using the properties tab 300. For example, the property list can include home, business, and government entity as properties, which are entered as shown on FIG. 1*g*, and the user can inventory which items are located at the home and at the business separately or collective, with the ability to sort the inventory by property, location, category, and other parameters and combinations on the Inventory tab 100. When the user is adding details about the item on the Item Details tab, Item details sub-tab 200*b* the property field 202 includes a dropdown list of those properties pre-stored on the Properties tab 300, FIG. 1*g*, for property selection. To add another level of detail, a preinstalled list of room and area locations 204 within the property is available for selection. The user can also enter additional locations 204 within the property. For example, the item may be located in a specific room within the home or business. This additional field identifying a more specific location can be useful when, for example, one room is destroyed in a fire. Then the user has an inventory of the items found in that specific room of the home.

Figure 3:
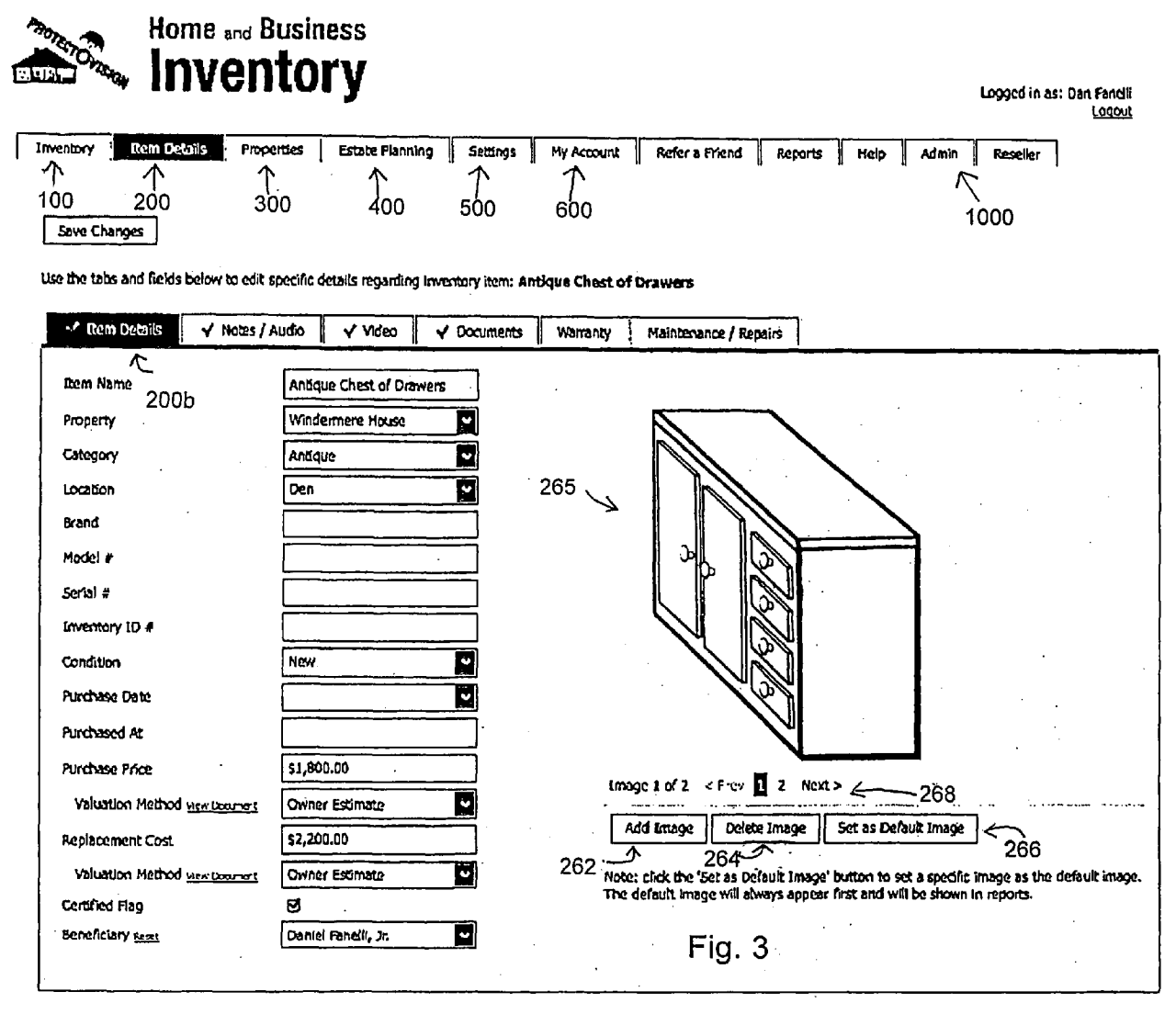

After being entered, an item and information on the Item Detail page can be revised at Item Name 201, property 202, location within the property 204 and then add details about the item such as serial number, model number, inventory ID, purchase date, warranty, price paid, replacement price, evaluation method (receipt). An item's conditions 207 can be entered by allowing the user to select from a dropdown list including, for example, "new", "like new", "good", "fair", and "poor". The user can include images of the new item such as one or more photos from different views. FIG. 3 shows an example of an item detail screen that includes an image 265 of the inventory item. The user can provide digital photos or videos in the image section 260 of the display using the add image button 262. After the new item is entered, the user clicks on Save Changes button 150 to save the new item in the inventory. This step is repeated until the user has entered all of the items to be included in the inventory.

Each inventory item should be associated to a Location within the property. In the example shown in FIG. 1*j*, the Locations are primarily rooms and areas within the property. The system maintains a default list of locations to choose from when adding/editing inventory items. The Location field 204 has a drop down list to select locations from in FIG. 1*a*. When a new location needs to be added, the user can simply go to the Setting tab 500, select the Location sub-tab, then click on the "Add Location" icon. A blank box is displayed for the user to add the name of the new location, for example, a game room can be added to the list of locations. After the new location has been entered, the location is then saved. Now the location list includes the new location. With the new location in the list, the user selects the inventory tab shown in FIG. 1*j* to add the new inventory item that is located in the game room.

Inventory items should also be associated to a category. The system category field 203 includes default categories such as toy, book, clothing, antique, electronic equipment and the like in a drop down list. The user can maintain the list of categories to choose from when adding/editing inventory items. When a new category needs to be added, the user can simply go to "setting" tab 500, select the category column then click on add category. A blank box is displayed for the user to add the name of the new category, for example, "computer equipment" can be added and saved to the list of categories. Now that the system includes the new category for computer equipment, the user selects the inventory tab, a list of inventory items is displayed and the user selects an item, such as Macbook Pro, and changes the category for the Macbook Pro from the default electronic equipment to the new category, computer equipment, and then clicks on save changes button 280.

Figure 1P:
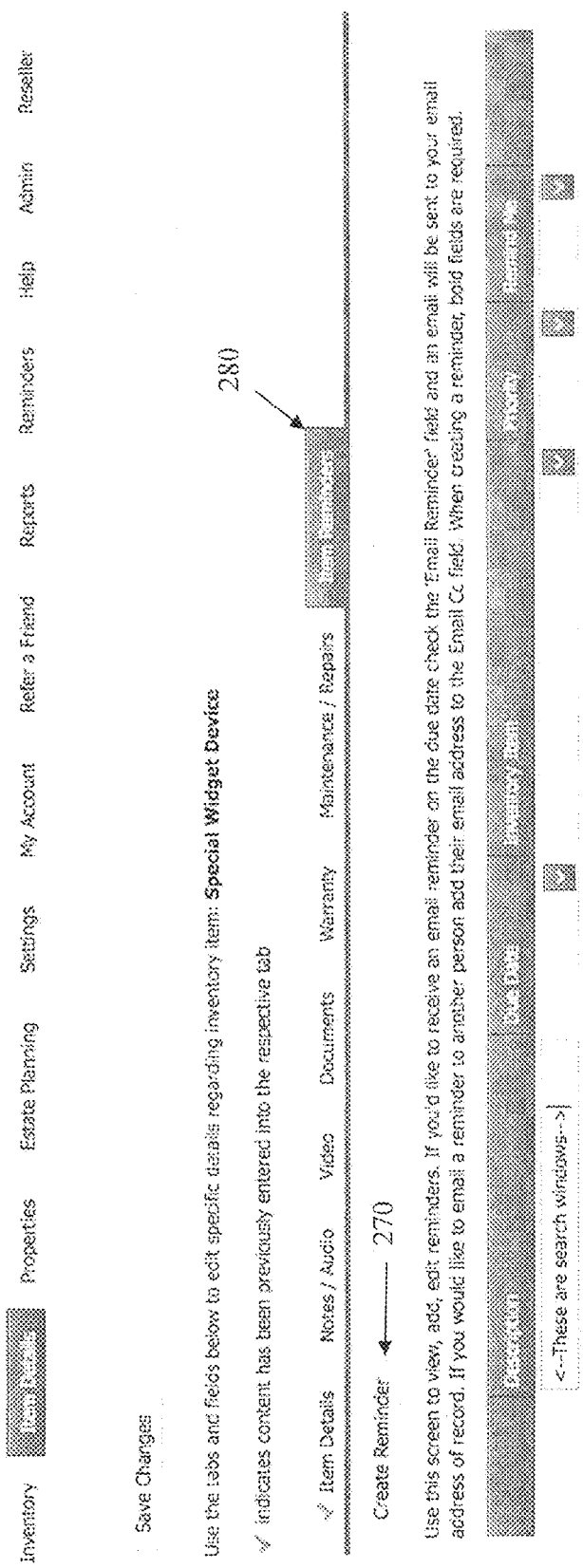
FIG. 1p is a screen shot of an Item Detail tab, Item Reminder sub-tab selected, which is used for creating a reminder for an inventory item.

From the Item Details tab 200*b*, the user can add Item Reminders 280 as shown in FIG. 1*p* for the system to automatically send an email message to the user. From the Item Reminder screen shown in FIG. 1*p*, the user clicks on the Create Reminder button 270 to open the reminder set up screen shown in FIG. 1*q*. As shown, the user sets up the reminder by filling out the form including reminder description 272, reminder due date 274, repeat frequency 276 and repeat times 277. Other fields the user can complete include reminder priority 278 and email cc 279 to send a copy of the email reminder to a second different email address.

For example, the user can set up an email reminder to change a filter on an inventory item such as an air conditioner or to remind the user of a warranty expiration date. For the change filter reminder, the user can elect to have monthly reminders, or quarterly, semiannual or annual reminders. The number of times the reminder repeats is also user selectable, for example, the user can schedule a three month reminder for the warranty expiration reminder and then have monthly reminders until the date of the expiration. The user can enter a number into the repeat times field or use the arrows to increase and decrease the number of repeats.

Figure 1Q:
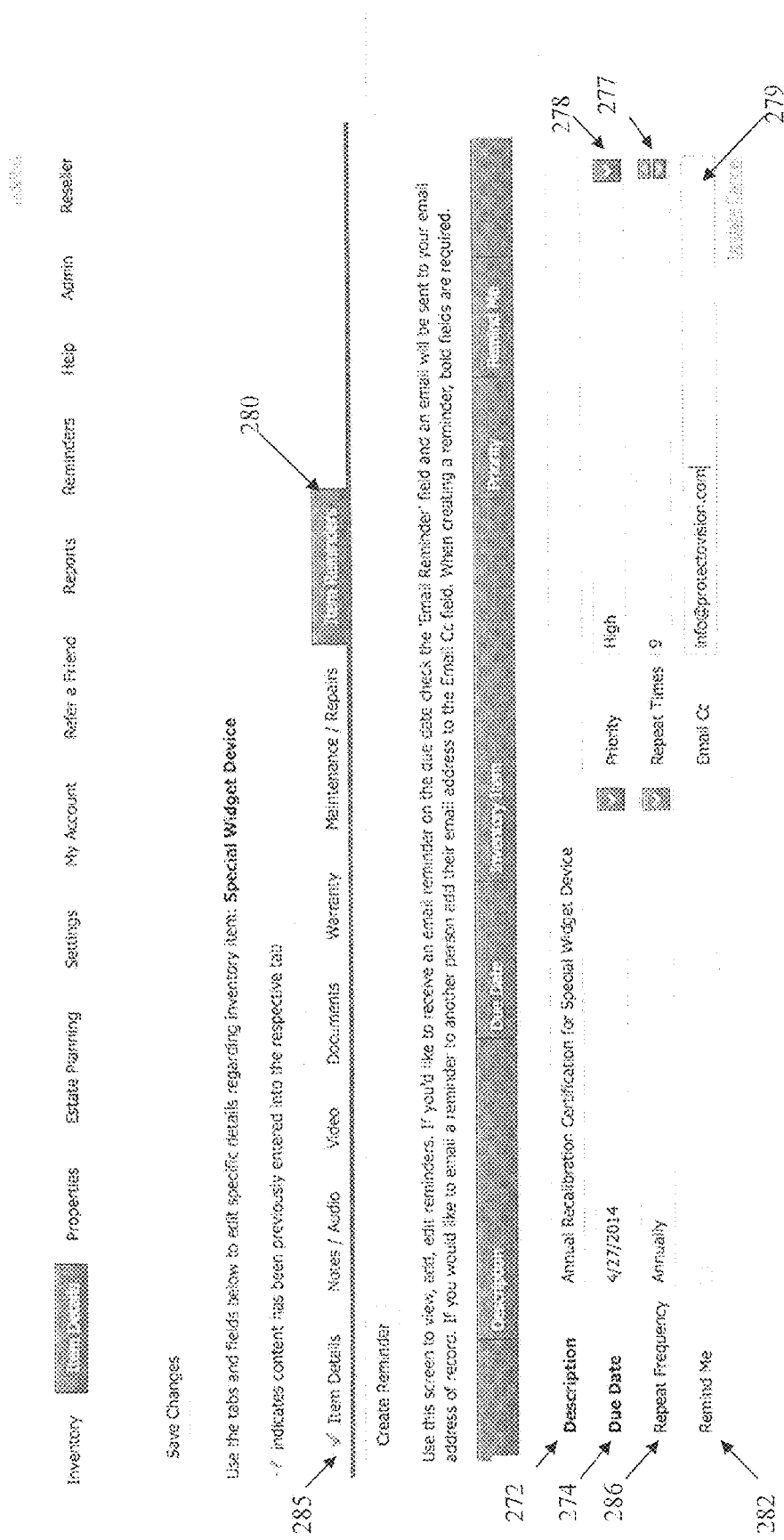
FIG. 1q is an example of the screen shot displayed after the "Create Reminder" button has been selected on the Item Reminder sub-tab, which is used for scheduling an email reminder.

To start, the item, in this example the "Special Widget Device", is shown on FIG. 1*O*. FIG. 1*r* shows the reminder tab screen with a list of scheduled reminder emails. In FIG. 1*q* the user has scheduled an annual recalibration certification for the "Special Widget Device". Once the user has entered the reminder, the reminder is saved by simply clicking on "Update". Alternatively, if the user changes his mind, the new reminder can be canceled with one click.

FIG. 1s is a screen shot of the reminder tab after the user clicks on update showing the scheduled of all reminders, including a list of all the annual recalibrations (see arrow). Any of the reminders in the list can be edited by clicking on edit next to the reminder description.

FIG. 1t shows the reminder tab screen shot with a reminder ready to be edited. The fields corresponding to the reminder are displayed initially populated with the existing reminder data in editable fields.

Figure 2A:
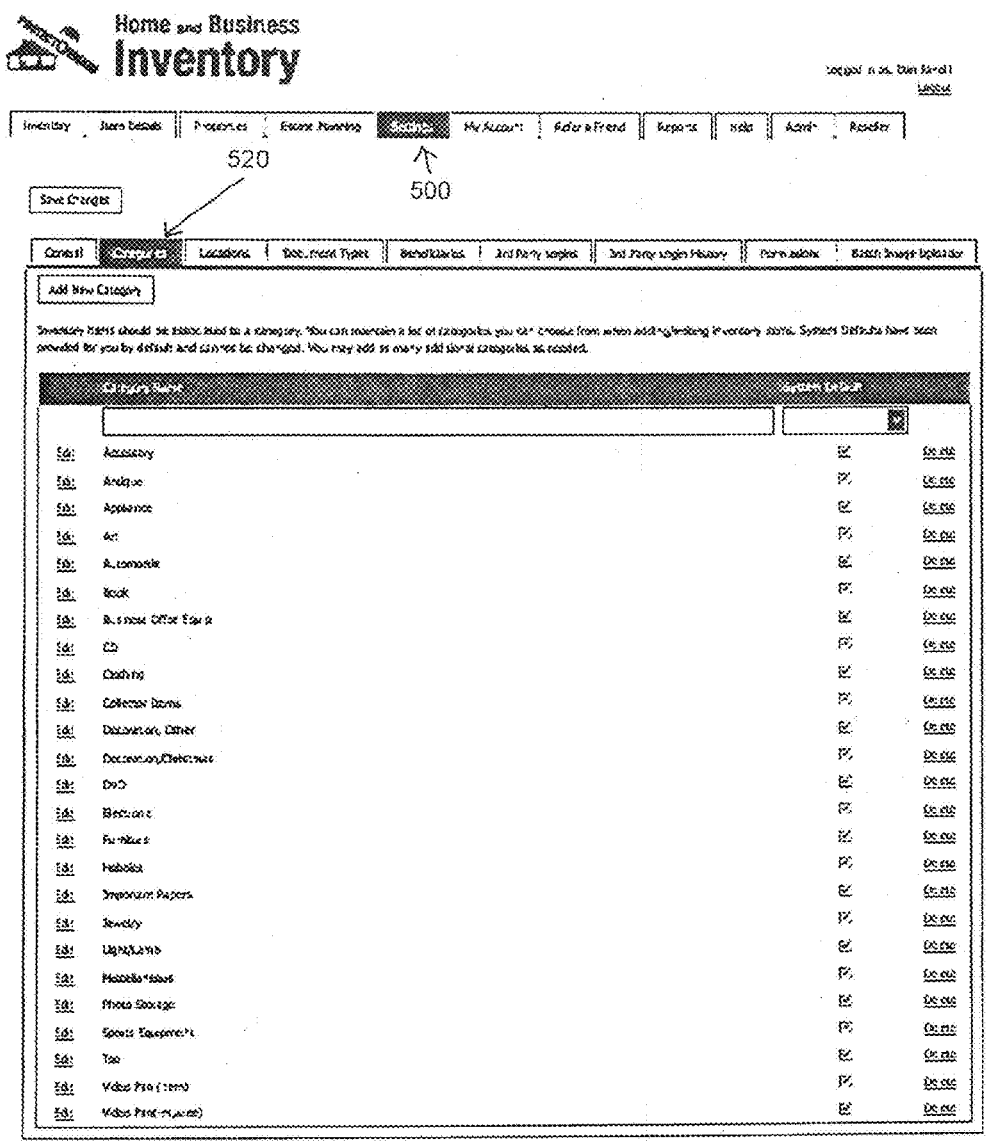
FIG. 2a shows an example of a screen shot for the Categories sub-tab under the Setting tab for entering different categories for the user to select from when entering inventory item details.
Figure 2B:
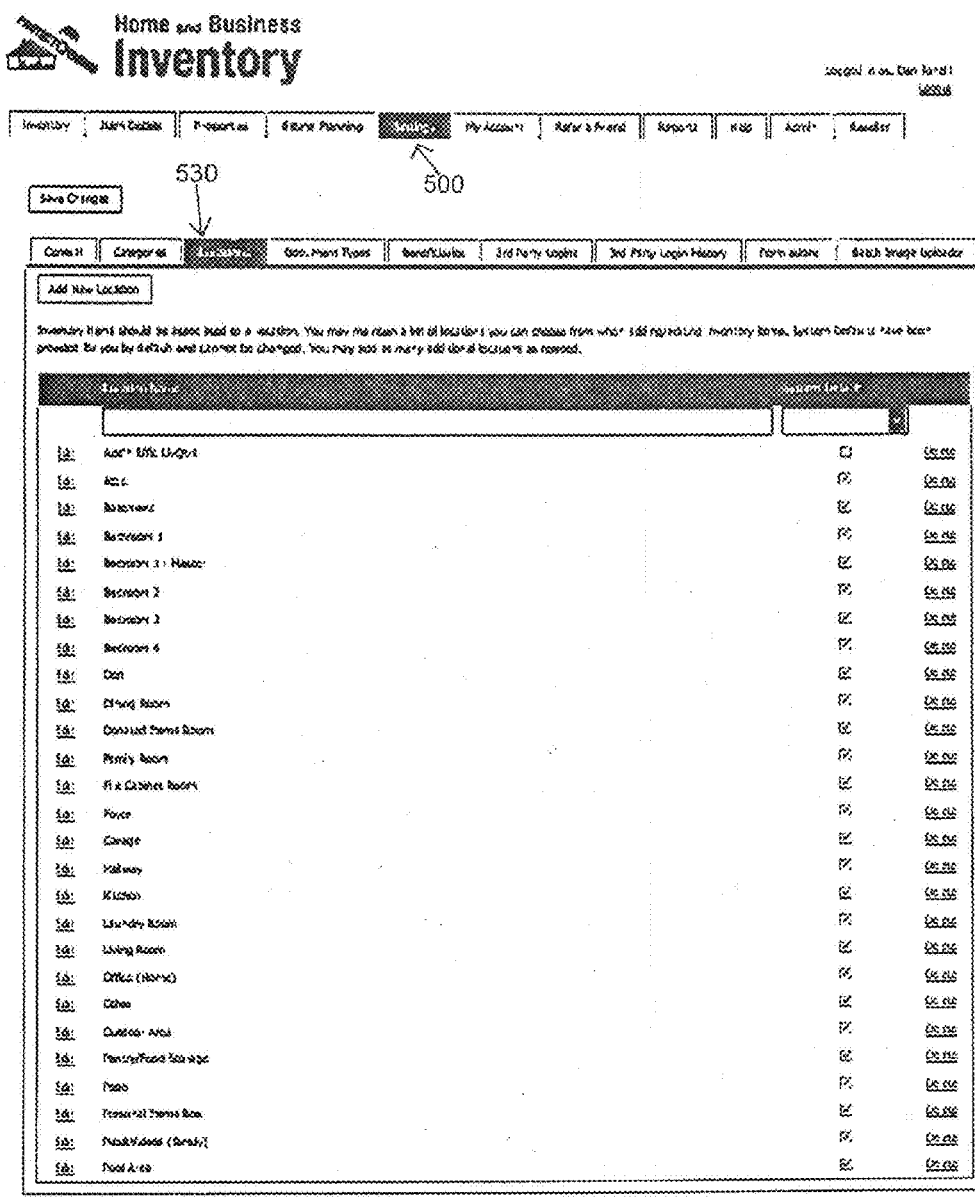
FIG. 2b shows an example of a screen shot under the Settings tab, more specifically, the Locations sub-tab.

Under the Setting tab 500, the user is allowed to enter categories, locations, document types, beneficiaries for the user to select from while entering inventory items. Referring to FIG. 1a, the inventory item details tab 200b allows the user to identify which property, category and location the inventory item is associated with. The fields include a drop down list for the user to select from that corresponds to the lists entered under the setting tab 500. FIG. 2a shows an example of a screen shot for entering different categories for the user to select from when entering inventory item details. In the example shown, the Categories include accessory, antique, appliance, art, etc. Other setting lists entered by the user include Locations 530 (FIG. 2b), Document Types 540 (FIG. 2c), Beneficiaries 550 (FIG. 5d), third party Logins 560 (FIG. 2e), and third party Login History 570 (FIG. 2f). Under third party Login History 570, there are two tabs, third party login history (FIG. 2f) that shows login activity and an authorized inventory professional login history (FIG. 2g) that shows authorized inventory professional login activity. Other sub-tabs under Settings tab 500 includes a Permissions sub-tab 580 (FIG. 2h), and a Batch Image 590 and Batch Document 590 uploader sub-tabs (FIG. 2i).

FIG. 2a shows an example of a screen shot under the Setting tab 500 for entering different categories 520. The list of categories is initially displayed for clients to use. These are the categories the user can then select from when entering inventory item details. The user can use the "Add New Category" button to add additional categories for their inventory. The added categories only affect the client's account; however, the Administrator can make the same type changes from the Admin Screens, and now they will globally affect all user accounts. FIG. 2b shows an example of a screen shot under the Settings tab 500, more specifically, the Locations tab 530. By selecting the "Settings" tab, and selecting sub-tab "Locations", the user can use the "Add New Location" button to add additional locations. These only affect the client's account; however, the Administrator can make the same type changes from the Admin Screens, and now they will globally affect all user accounts.

Figure 2C:
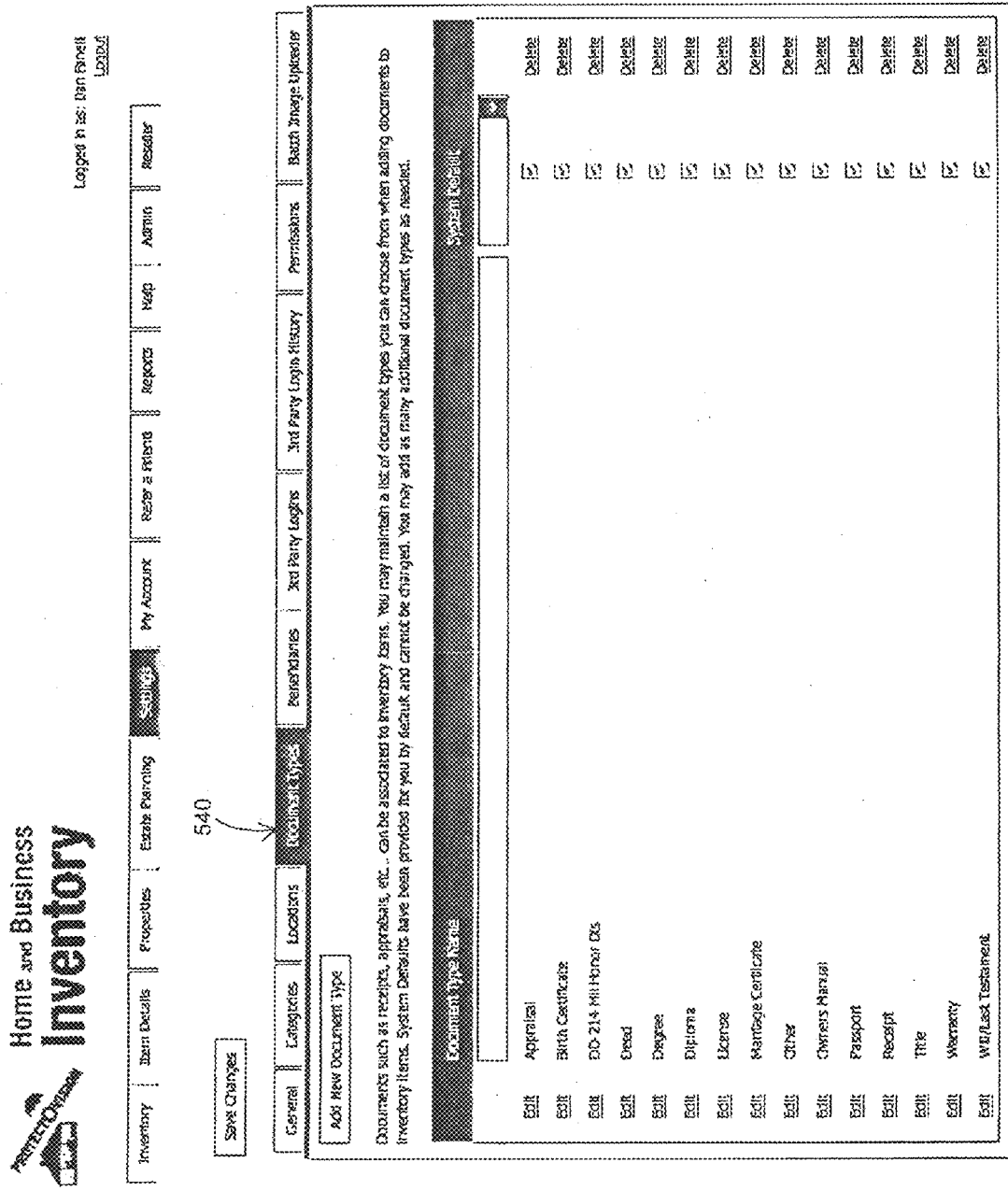
FIG. 2c shows an example of a screen shot under the Settings tab, more specifically, the Document Types sub-tab.

FIG. 2c shows an example of a screen shot under the Settings tab 500, more specifically, the Document Types tab 540. The user can add documents such as receipts, appraisals and the like that can be associated to inventory items. The user can maintain a list of documents types for the user to select from when adding documents to inventory items. The system provides default document types that cannot be changed. By selecting the "Settings" tab, and selecting sub-tab "Doc Types", the user can use the "Add New Document Types" button to add additional document types. These only affect the client's account; however, the Administrator can make the same type changes from the Admin Screens, and now they will globally affect all user accounts.

Figure 2D:
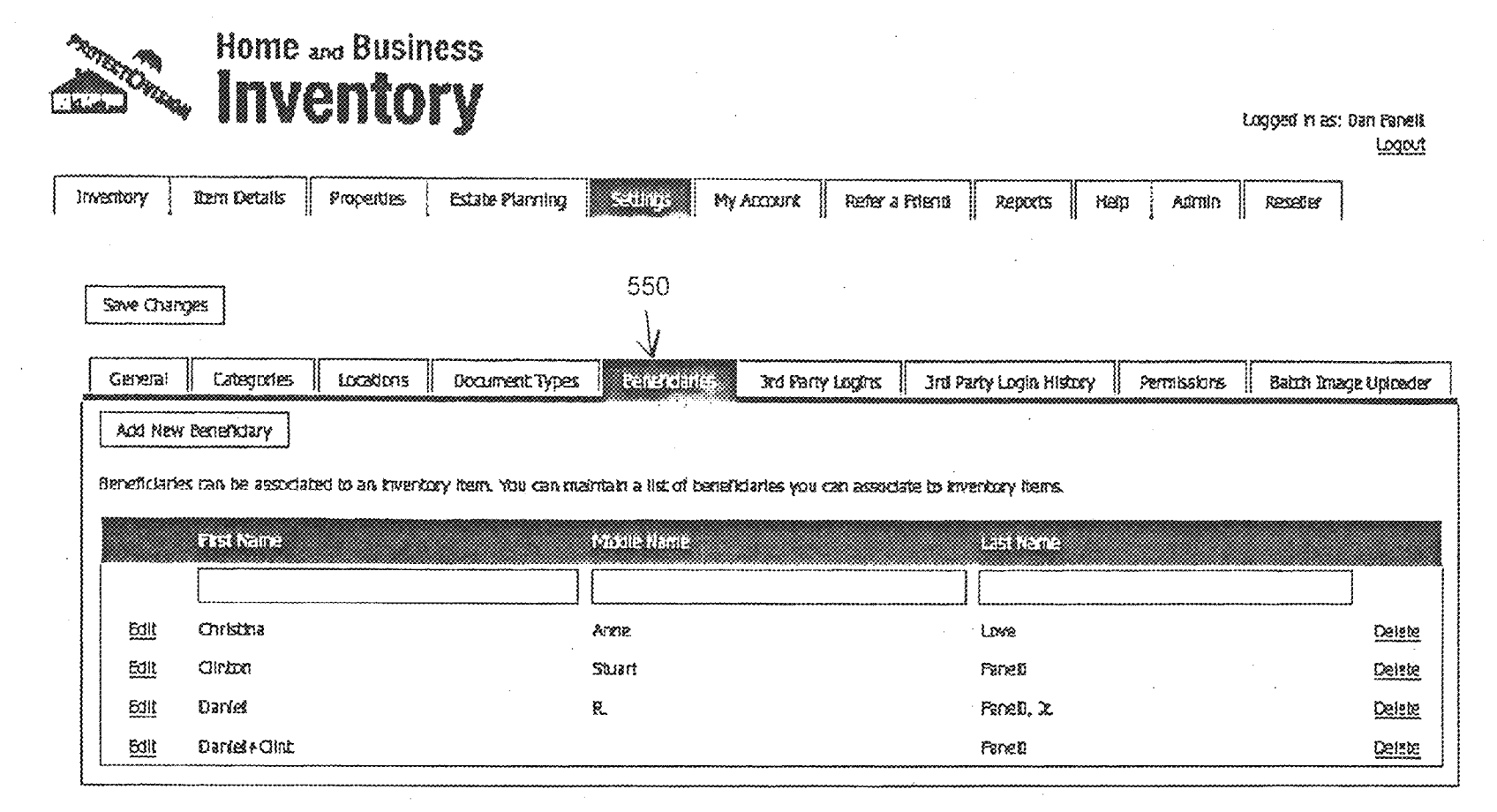

FIG. 2d shows an example of a screen shot under the Settings tab 500, more specifically, the Beneficiaries tab 550. As shown, beneficiaries can be associated to an inventory item. The user can maintain a list of beneficiaries that the user can associate to an inventory item. New beneficiates are added by clicking on "Add New Beneficiary" button to display the form shown in FIG. 2d where the user enters the new beneficiary name. The "Add New Beneficiary" feature can include a "relationship" field for each beneficiary named.

Figure 2E:
FIG. 2e shows an example of a screen shot under the Settings tab, more specifically, the Third Party Logins sub-tab.

FIG. 2e shows an example of a screen shot under the Settings tab 500, more specifically, the Third Party Logins tab 560. The "Add New $3^{rd}$ Party Login" button is used to add any new $3^{rd}$ Party individuals being granted this account access. As shown, a new $3^{rd}$ Party will be assigned a name and a password by the account owner, and the account owner can give $3^{rd}$ Party access to their account to anyone they choose. The $3^{rd}$ Party has limited access with "read only" capability. After a $3^{rd}$ party has been added, the user can click on "Send" to send an email to the 3rd party with instructions for them to login to the account with their new access. To inactivate a 3rd party login, the user selects the "Select" button and then can uncheck the active box and "Save" the change. The user can also totally delete the $3^{rd}$ party from the list by selecting the "Delete" button. Another embodiment would be to limit the $3^{rd}$ Party access to specifically designated items in the inventory, rooms in the inventory, categories in the inventory, tabs in the inventory, and other selectable groups.

Figure 2G:
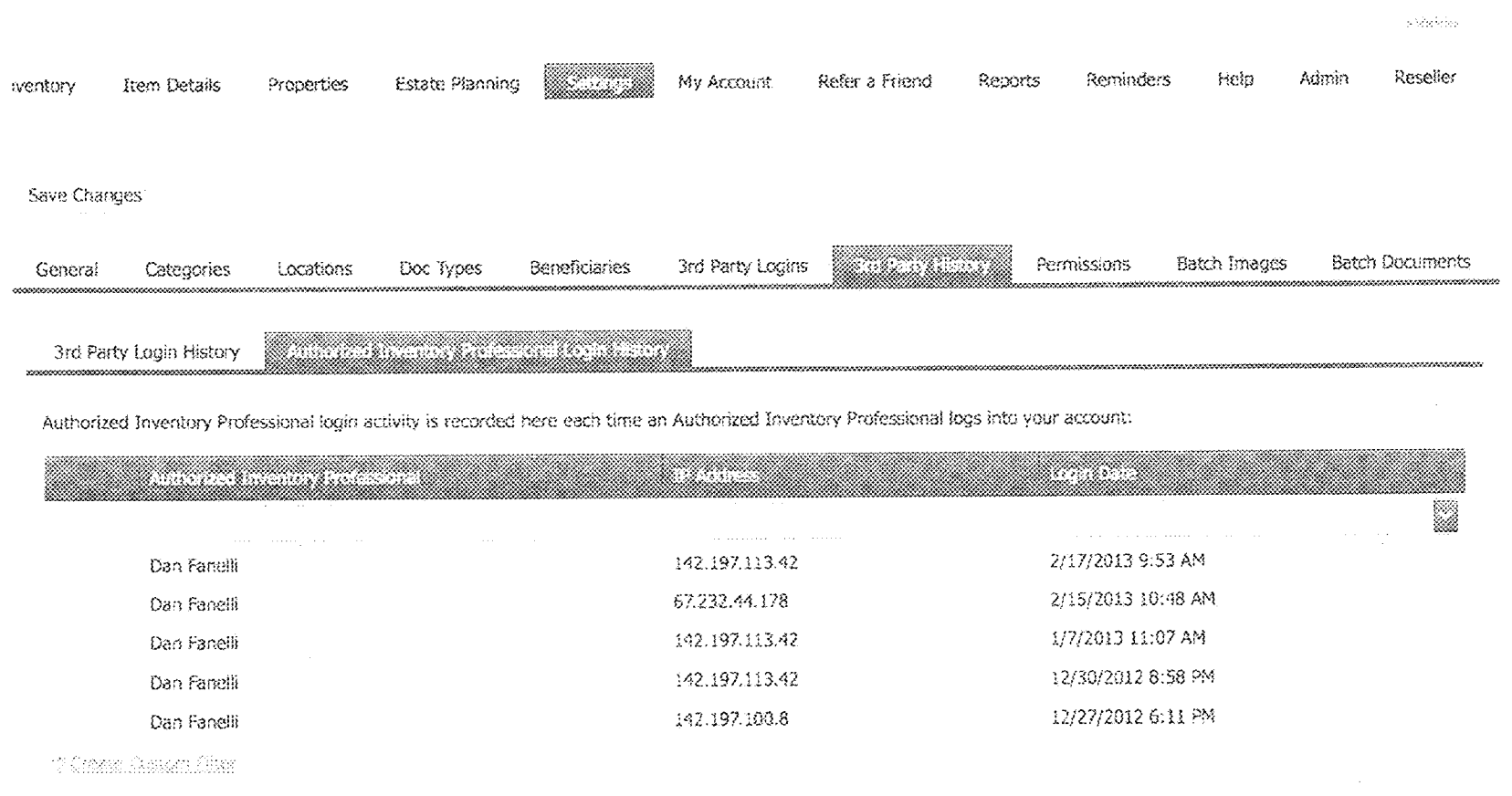

FIG. 2f shows an example of a screen shot under the Settings tab 500, then $3^{rd}$ Party Login History 570 tab, showing the sub-tab Third Party Login History tab 572. Anytime a $3^{rd}$ Party accesses the client account, the program automatically generates an email to the client's registered email account, and an entry is automatically entered into the $3^{rd}$ Party Login History 572. Separate from $3^{rd}$ Party access, the user could give their personal sign-in name and password to anyone, and that person would have complete "read and write" access to their account. This is not recommended unless they are trusted and need access to control, update, and have the ability to change all of the client's account information. FIG. 2g shows another example of a screen shot under the Settings tab 500 for $3^{rd}$ Party Login History tab 570, with sub-tab Authorized Inventory Professional Login 574. For the security of the client's information, a History Log of Authorized Inventory Professional access to the account, and is available for the client's review. In the example shown, there is no login history. When a person with $3^{rd}$ Party login authority actually logs into the account, an entry is made into the $3^{rd}$ Party History tab, and an email is generated to the client so that they can verify it was an authorized access.

Figure 2H:
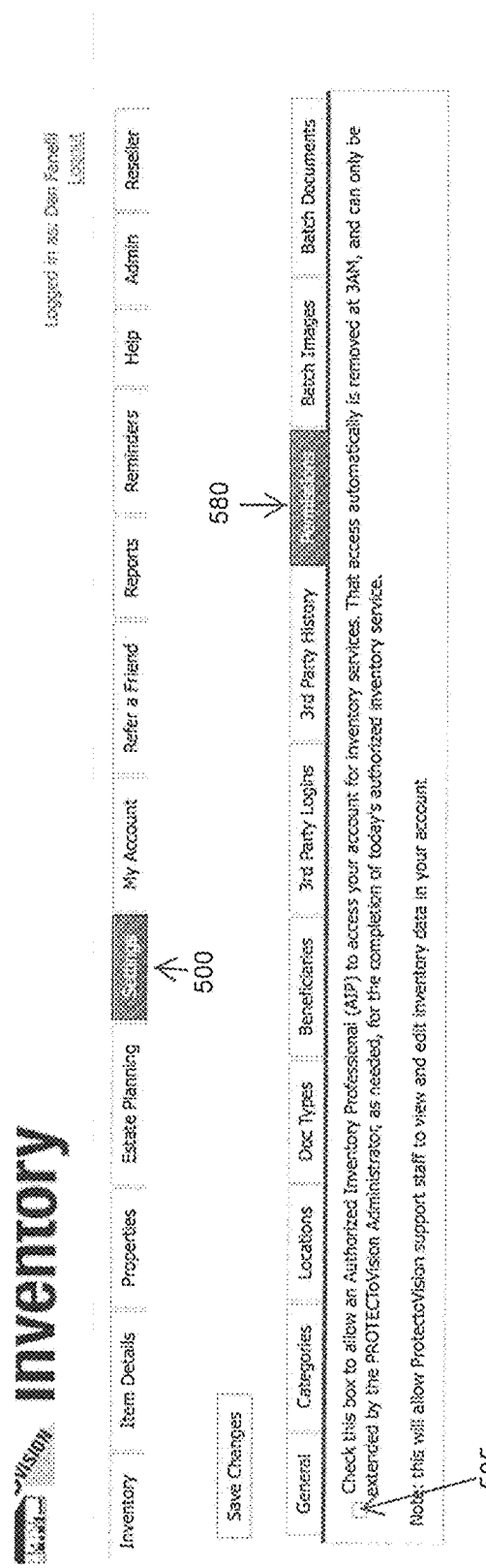
FIG. 2h is a screen shot of the Settings tab Permissions sub-tab granting permission from the client for an inventory to be performed by the Authorized Inventory Professional.
Figure 2I:
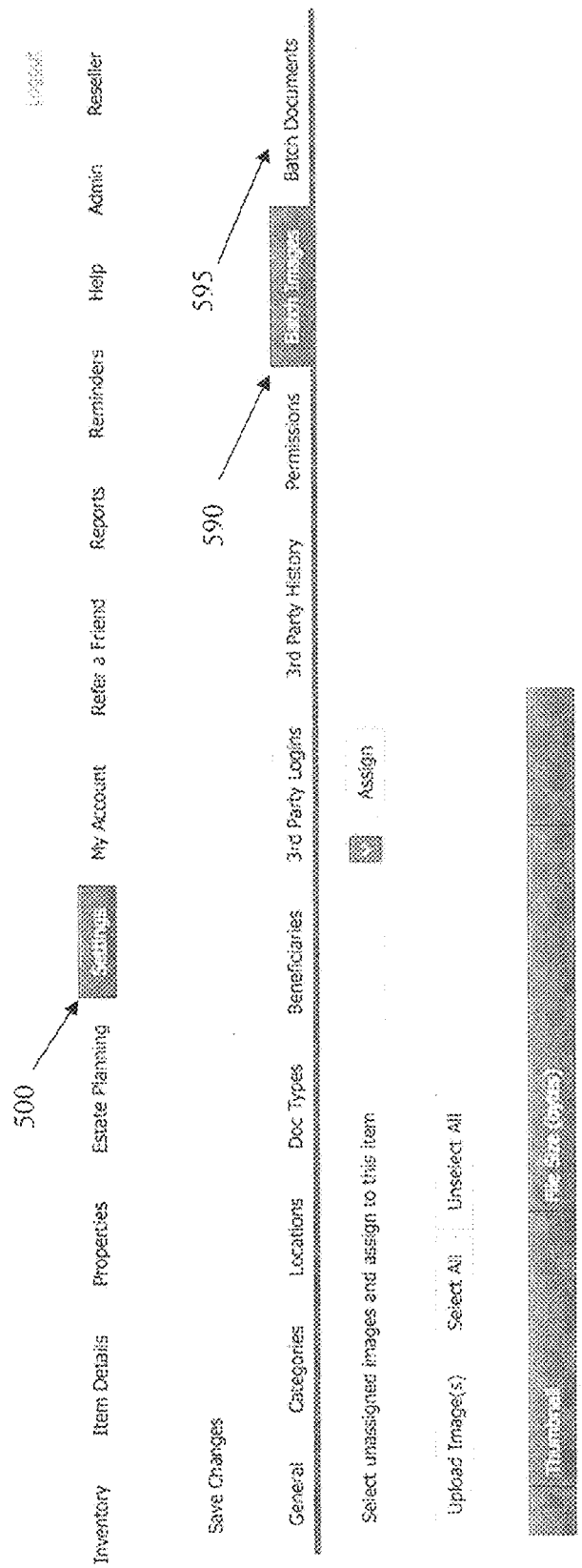
FIG. 2i shows an example of a screen shot under the Settings tab, more specifically, a Batch Image uploader sub-tab.

FIG. 2h shows an example of a screen shot under the Settings tab 500, more specifically, the Permissions tab 580. Putting a check in the Permissions box by the client account owner or the Administrator enables the Authorized Inventory Professional access to login to the client's account to perform the inventory (see FIG. 20a), and to have access to the appropriate billing screens for the job and for the earned commission documentation. (see FIG. 10).

FIG. 2i shows an example of a screen shot under the Settings tab, more specifically, a Batch Image Uploader tab 590. In the example shown in FIG. 2i, in the preferred embodiment, a "Batch Document Uploader" tab 595 is available and allows multiple documents to be uploaded by the user at one time. The "Batch Document Uploader" tab 595 functionality and displays mirror the "Batch Image" uploader 590 for uploading documents instead of images.

Figure 2J:
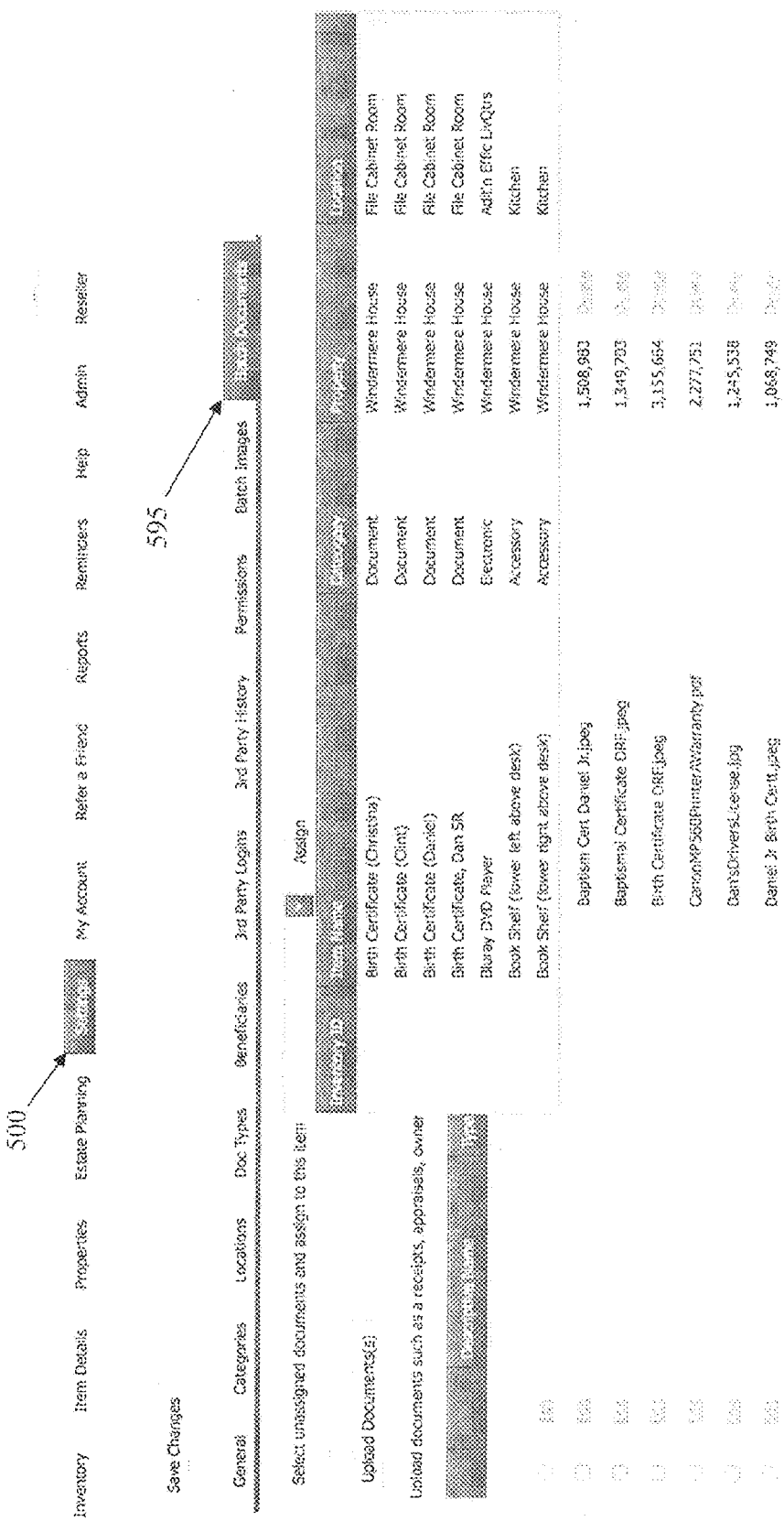
FIG. 2j shows an example of a screen shot of the Batch Documents uploader used for uploading multiple documents at one time, located on the Batch Documents sub-tab under the Settings tab.

In this embodiment digital documents can be uploaded in groups of more than one document at a time. The function is called a "batch upload" of documents that are stored and displayed on the "Batch Documents" uploader page or tab 595, displayed in FIG. 2*j*. Once a batch of documents has been uploaded, then one or more documents can be selected from the stack of documents on the "Batch Document Uploader" page. This page also displays the list of items in the inventory, including the respective item numbers when entered, and the location corresponding to each item that has been entered into the inventory. In this way the documents that have been uploaded can be assigned to one or more items in the inventory item list, relocating them to the respective item's Document sub-tab.

Figure 4:
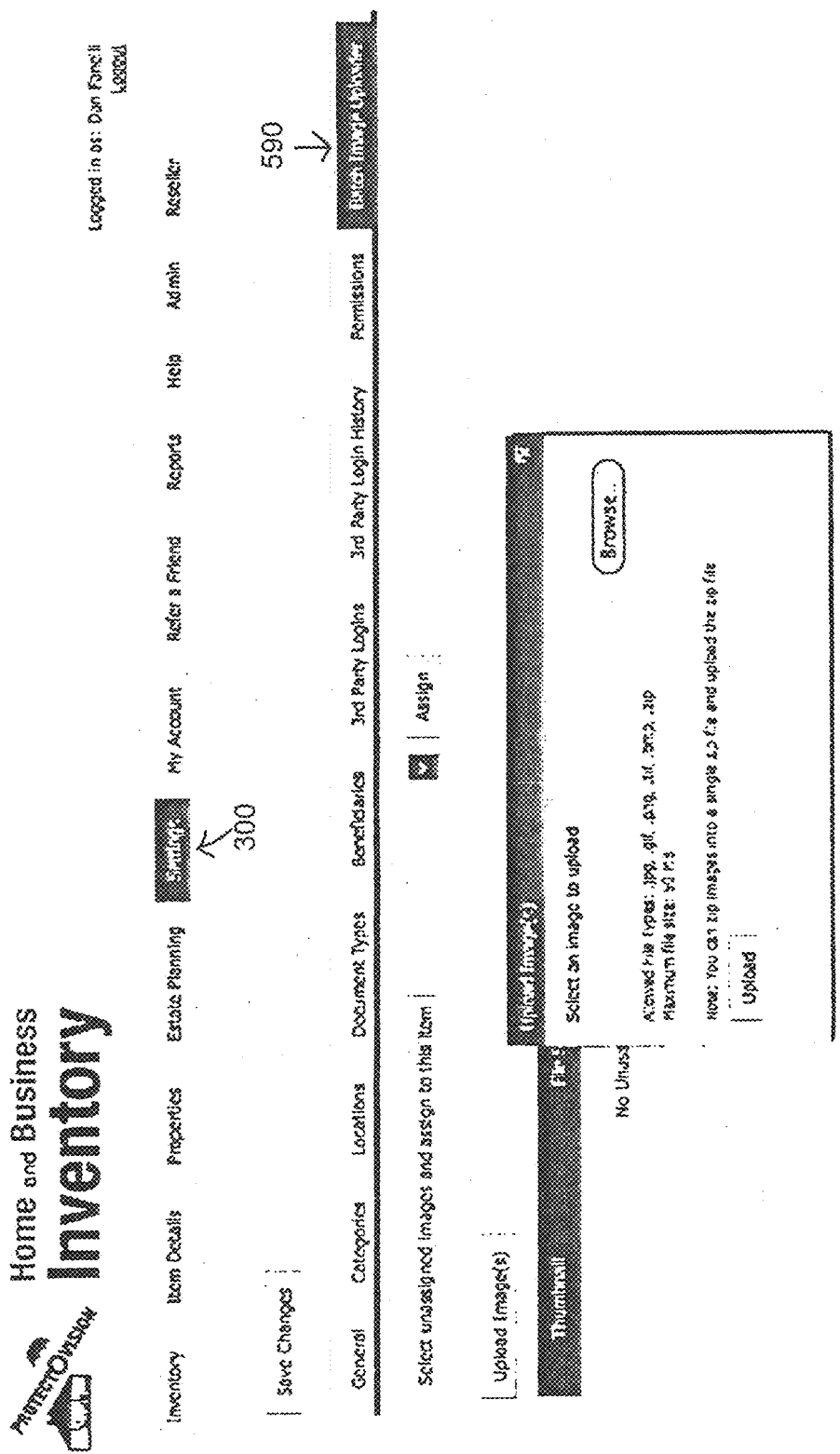
FIG. 4 shows an example of the screen displayed where the batch image file has been selected for uploading one or more images.
Figure 5A:
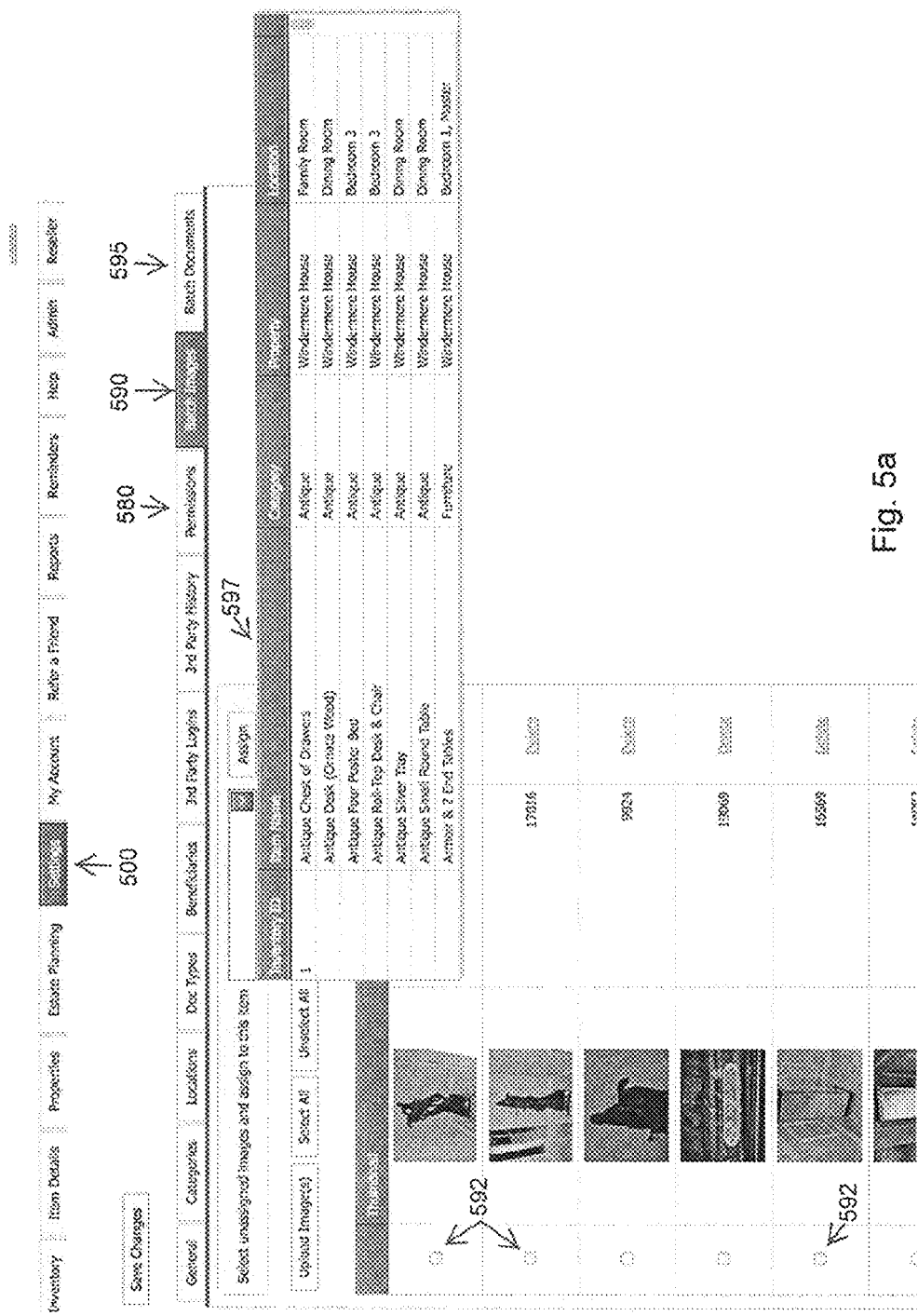
FIG. 5a shows an example of the screen for assigning "batch images" of one or more images to any of the entered inventory items.

The "Batch Tool" includes a Sort and Search Window to enter information for locating and linking the correct inventory item with the specific document. The search and sort window feature displays all the saved items in the inventory with the same text combinations anywhere in the stored item's phraseology in a dropdown list below the characters being typed into the Search and Sort Window. Another option under the setting tab 500 is batch images where the user can be prompted to upload images as shown in FIG. 4. As shown, the images can be any one of a variety of different formats. After the batch of images is uploaded, each image and group of selected images can be associated with one or more of the items in the inventory list. FIG. 5*a* shows an example of assigning the unassigned images with an item in the inventory list. This screen displays a column of thumbnail images and includes a field for selecting an item name to assign to an image.

Later, the user can view and or edit an inventory list or one or more specific items in the list. The user can select an inventory item from the inventory list so that the user can add one or more images to an inventory item, enter notes and or audio clips for an inventory item by typing notes manually with your keyboard or cutting and pasting directly from a manufacturers web site into the Notes/Audio tab 210. The user can also use the Documents tab 230 to upload and store a document such as a user manual for the inventory item.

The screen shots for the notes/audio tab 210, video tab 220, document tab 230, warranty tab 240, maintenance/repair tab 250, and item reminder 280 are shown in FIGS. 1*b*, 1*c*, 1*d* and 1*e*, respectively. FIG. 1*b* shows an example of a screen shot for notes and audio for an inventory item. Under the notes/audio tab, the user can enter notes about the particular inventory item. In the example shown, the note 212 indicates that the item was passed down by a relative and inventory about the relative's purchase of the item. The user also has the option of adding a new audio file 214. This is accomplished by selecting the "Add New Audio" button. When this button is selected a browser window opens to select the audio file, describe the audio file, and upload the file to its respective item sub-tab. Across the bottom of the display is a list of notes and audio files already associated with the inventory item. The list includes a descriptive name 215, file name 216 and a file size 217. Just below the aforementioned 215, 216, and 217 are search windows to search for needed files when a user has long lists of stored files. As with the item detail tab screen shot, the screen includes an icon for saving changes 218. To save the user time and make it easier for the user to know which tabs have content in them, any tab and sub-tab with stored content or information has a green checkmark on the tab. Any type marking or color could be used to indicate content as previously described.

FIG. 1*c* shows an example of a screen shot to associate video with an inventory item. When the user selects the video tab 220 for an inventory item the screen displayed includes instructions for linking one or more video files with the inventory item when the user clicks on Add New Video File icon 224. When this icon is selected a browser window opens to select the video, describe the video, and upload the video to its respective item sub-tab. Similar to the notes/audio tab 210 screen, the screen displays a list of video files already linked, showing the descriptive name 225 of the video file and the file size 227. Just below the aforementioned 225, and 227 are search windows to search for needed files when a user has long lists of stored files. To save the user time and make it easier for the user to know which tabs have content in them, any tab and sub-tab with stored content or information has a green checkmark on the tab. Any type marking or color could be used to indicate content as previously described.

The document tab 230 under item details 200*b* allows the user to add new documents 234 and displays a list of documents when documents have already been added. FIG. 1*d* shows an example of a screen shot to link documents with an inventory item. The list of documents includes the document name 235, the type 236 of document, filename 237 and the size of the file 238. Just below the aforementioned 235, 236, 237, and 238 are search windows to search for needed files when a user has long lists of stored files. When the "Add New Document" button 234 is selected a browser window opens to select the document, describe the document, link the document if appropriate to a Purchase Price Field or Replacement Price Field, and upload the document to its respective item sub-tab. While documents can only uploaded on at a time from this location, they can be uploaded in groups from the Batch Document uploader tab 595. The document sub-tab 230 can accept all file formats except for executable file formats. This feature allows new types of files to be uploaded and stored, as well as hi-resolution uncompressed photo images. FIG. 1*e* shows an example of a screen shot for item details for maintenance and/or repair records for a specific inventory item. As shown, the maintenance/repair sub-tab 250 can include a written description including cost and date for the user to maintain an easy to access historical record, and has search windows and "Add New Item" button comparable to the previous sub-tabs. The warranty tab 240 includes pertinent warranty information. To save the user time and make it easier for the user to know which tabs have content in them, any tab and sub-tab with stored content or information has a green checkmark content indicator 285 on the sub-tab as shown in FIG. 1*a*. Any type marking or color could be used to indicate content as previously described. FIG. 1*f* shows a selected property's information page, selected from FIG. 1*g*, which can be updated and have pictures of any desired type including the outside of the property and its grounds.

FIG. 1*g* shows an example of a screen shot of all the listed of properties in the inventory. As such, they can be independently selected when entering each item into the inventory list. By using the "Add New Property" button the user can add an unlimited number of properties, each one representing a different post office mailing address or other identifiable entity. A business client could enter an unlimited number of independently identifiable business real estate addresses to monitor and compare each of their business properties entered into the inventory. For an individual, the residence, rental properties, and other entities could be entered and separately identified by mailing address or other identifiable method. For a military application, an Air Wing Commander could have each of his Squadrons entered as a separate property. This would enable him to look at all of his Wing assets, sort each squadron separately by its Property name, or sort by each Location, Category and even a combination of these to compare all the Wing's "Locations" (i.e. Training Room) and "Categories" (i.e. Electronic Equipment).

FIG. 1h shows an example of an Estate Planning tab 400 that includes a memo field to enter information such as insurance policy information, attorney information, will information, safe deposit box information, funeral/burial information, special information and instructions, and the like.

FIG. 1i shows an example of an Inventory 100 tab screen shot that a new client sees before any items are entered. The "Add New Item" button 130 is used to open the add new item window shown in FIG. 1j for adding new items to the list. FIG. 1j shows an example of a screen shot for the add items including the item name 140, property 141 at which is item is found, the location 143 of the item within the property and the category 144 corresponding to the item being added. The inventory tab also includes an "Add Multiple Items" button 142 to add multiple items selected from a list shown in FIG. 1k.

As shown in FIG. 1r, the user can click on the Reminder tab 1400 to create a reminder for one or more inventory items by clicking on the create reminder button 270. FIG. 1s is a screen shot showing a list of reminders that have been set up and the fields for creating a new reminder. Each reminder includes a reminder name, a due date, an inventory item name if the reminder is associated with an item, and the priority of the reminder. As shown, the email reminder does not have to be associated with an inventory item. For example, the user can add a reminder for corporate taxes due on the 15$^{th}$ of each month or each quarter. For each reminder, the user can select edit to make changes to the reminder or can delete a reminder. After a reminder has been edited, the reminder can be updated as shown.

The inventory system includes the capability for "green checkmark" content indicators for each of the inventory item sub-tab. The sub-tab's (Item Details, Notes/Audio, Video and the like for each inventory item displays a green checkmark to indicate that content has been previously entered onto the respective sub-tab. This saves time for the user, who may not have been on the account for months, to quickly know which sub-tab's have information stored, and also which sub-tab's have no additional detail information entered. This feature eliminates the need for the Client to click on each sub-tab to determine if information has been entered and saved. Any suitable shape or color marking could be used for this feature.

Referring back to FIG. 1a and FIG. 1k, from the Inventory Tab 100, a list of inventory items and details about the inventory items is displayed. The user can select one of the items already listed in the inventory by clicking on an inventory item name 201 and clicking on the "select" icon adjacent to the name to display the item detail screen, then for example, select add image 262 icon to add new images associated with the inventory item. The user can, for example, then select notes/audio tab 210 to add additional information about the item such as, but not limited to, size, manufacturer specification, owner's manual, etc.

As previously described, when entering a new item, the program has a "New Item Memory Tool" with includes buttons that streamline the "item entry" and the "details" data entry process, saving time and allowing the user to enter lists of items without having to enter details about each of the items by using the "save and more items" button or to enter details about one or more inventory items without entering another item at that time by using the "save and add details" button. In this same area, the program has "remember" buttons that will remember one or more data entries for "Property", "Category" and "Location" to make completing the inventory faster, easier and more automated. This tool saves time and allows the user to enter multiple items from the same "property" and/or the same "location" and/or "category" without having to reenter the field for the repetitive "property" and/or "location" and/or "category", or go directly to the "Item Detail page" to enter detailed information specific to that inventory item.

The method and systems can use "computer vision" technology to automatically identify or recognize inventory items visually found in photographs and/or from video camera sources in order to automate and accelerate the inventory process and generate the inventory list, and details about each item on the inventory list.

"Computer vision" is the science and technology of making machines that see implementing algorithms that can automatically process images and videos to identify things. This inventory capability can have various levels of identification based on the stored recognition data base and the digital image information provided by the user while performing the inventory. The itemized inventory list automatically created using this capability can name basic inventory items such as chair, table or picture frame with minimal detail information for the item. Alternatively, the inventory methods and systems can be used for identifying very specific inventory items with extensive detailed information about each item such as Panasonic HDTV with the item's model number, Sony Surround Sound Receiver and model number, and identifying a Steinway Piano and model number, thus providing an automatic inventory list of the home or business.

In another embodiment, an identifiable bar codes scan code, QR code, or other scanable image that can be placed on the item and detailed information related to that code can be manually entered into the system. From that point the program can recognize that same scanable image for all subsequent data entry items associated with that item. Therefore, after scanning the bar code/scan code/ or other identifying marking, the digital pictures taken for that item will go to their respective location within the inventory list, as well as any other detail or other information, thus automating and speeding up the inventory process.

Figure 8:
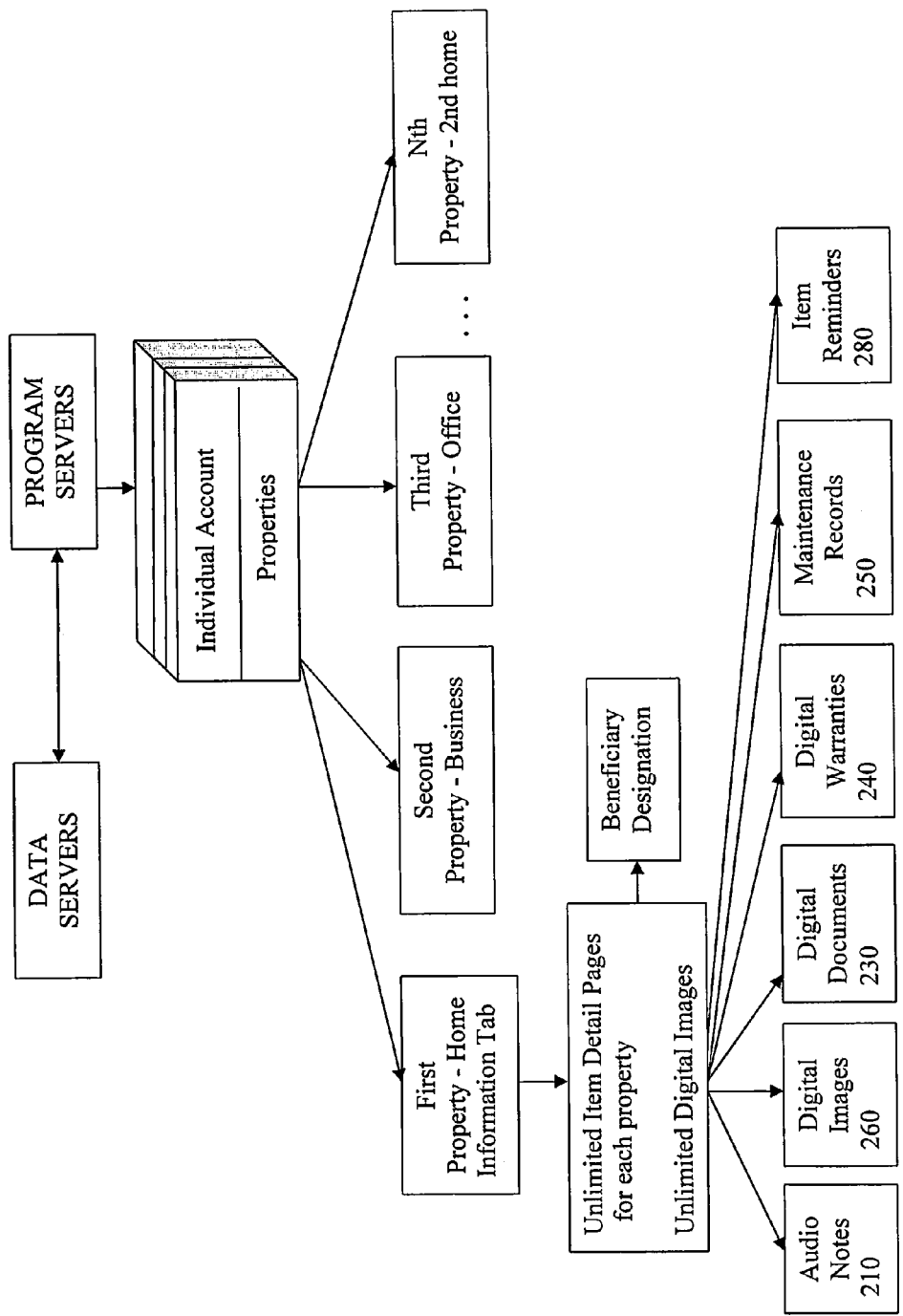
FIG. 8 is a block diagram showing an example of an inventory database for one account with more than one property being inventoried separately.

As shown in FIG. 1a and FIG. 8, inventory item details 200b can include one or more tabs for entering digital notes and/or audio 210, video 220, documents 230, warranty 240 and maintenance/repairs data 250. FIG. 3 shows an example of the data entry page for adding or editing an inventory item with an image. For example, inventory item details can include one or more of upload photos in the image area that allows the user to access an unlimited number of images using the image selection filed 268. The image selection filed 268 allows the user to move forward or reverse when viewing one of multiple images for the item and shows the number of images associated with that specific inventory item. The example shown in FIG. 3 has three different images and allows the user to select any one of the three images or to view the next or previous image.

For each inventory item, the user can be as detailed as he/she likes with descriptive text, record voice info & description (for example, let Grandma talk about her antiques), store and access documents associated with each inventory item such as receipts, appraisals, owner's manual, certificate of authenticity, etc. Other related information can include the name of the store where the item was purchased, the manufacturer or 3rd party detailed warranty information. When the information is added to the inventory item detail, the inventory list can be used by the user to maintain detailed records of maintenance and repairs for each inventory item.

FIG. 4 shows an example of the screen displayed for uploading one or more images. As shown, plural images can be uploaded in a batch and the inventory system accepts images in a variety of different formats. Digital pictures can also be uploaded in individually or in groups of more than one picture, called a "batch upload" that are stored on the "Batch Image Uploader" page or tab using the "Batch Image Uploader" tool. FIGS. 5a and b show an example of the screen for assigning "batch images" to one or more inventory items. Referring to FIGS. 5a and b, one or more pictures can be selected from the stack of pictures on the "Batch Image Uploader" display page so that the picture can be removed from the "Batch Uploader" display page and delivered to its correct "Item Detail" page. After one or more photos are uploaded, the system allows the user to manage the photos for each inventory item by adding new images, deleting one or more images and setting one of the photos as a default photo.

Figure 7:
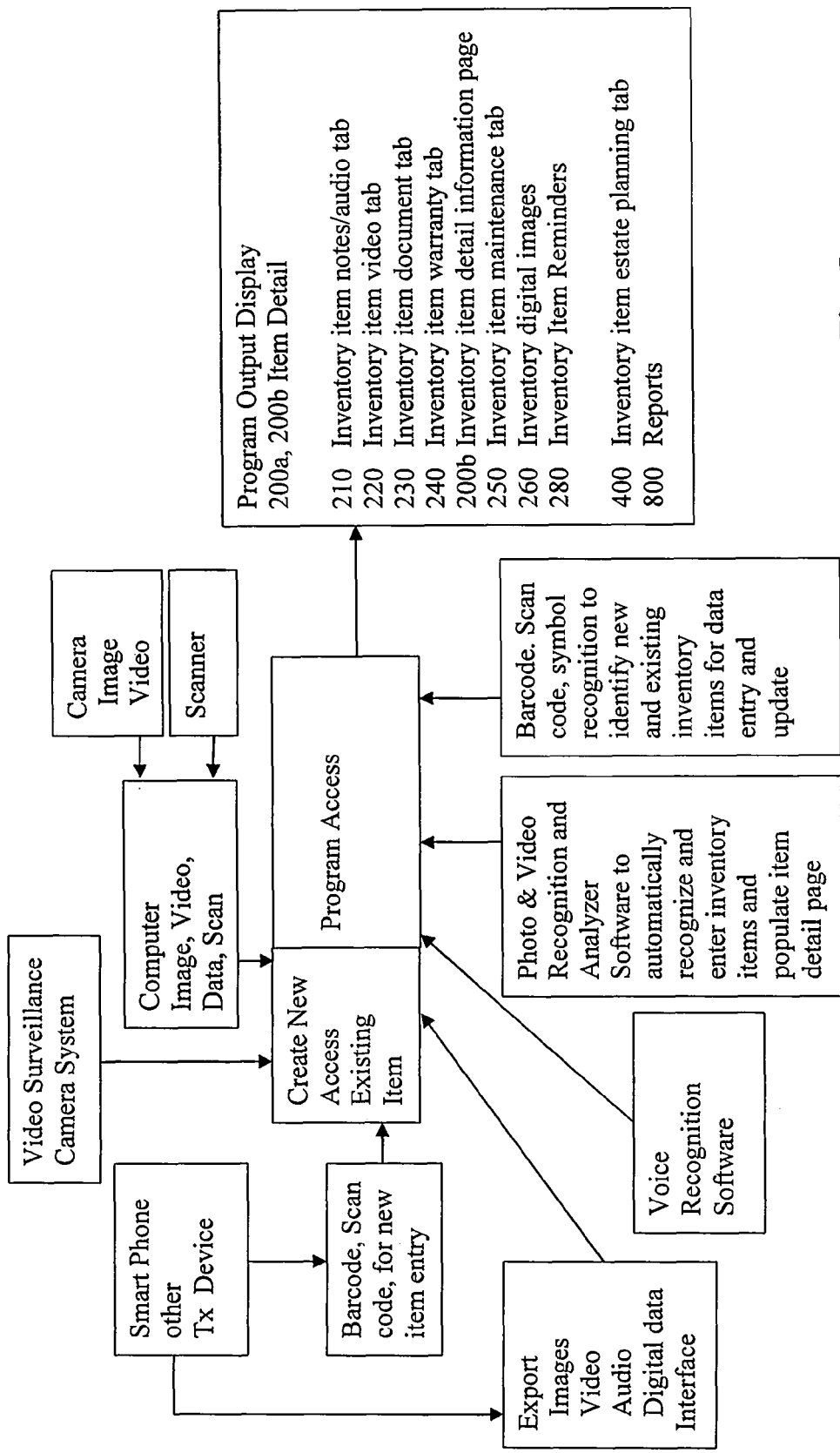
FIG. 7 is a block diagram of the inventory system according to an embodiment of the present invention showing plural interfaces between the computer systems and different peripheral devices.

Referring to FIG. 7, another feature of the methods and systems of the present invention is the capability to import and store one or more video files of various video formats in the video tab area under each "Item Details". The inventory system can support some video formats by having the video player pre-installed to automatically play as the videos accessed. These video formats therefore "stream" or load and play automatically. The videos can be of inventory items, overall rooms, documents or anything the client wants to store. Alternatively, the selected video format can play based on an installed video player on the user's specific computer. In this example, the stored inventory video file needs to be downloaded to be played on the user's computer with the appropriated "video player" already installed on the computer. An embodiment provides the ability to complete an inventory by using a cell phone using a custom "application" that allows any or all pictures, video, and data to be uploaded directly from the phone into the program.

Documents entered for one or more inventory items can be encrypted and inventory items can be disassociated from the property address and can be encrypted. For additional security, the inventory list and associated data, audio and video is stored in a secure website on the Internet. Documents can be stored on the respective "Document" tab 123 for each item, and a "receipt" or "appraisal" that is stored on this tab 123 can be linked directly to the "Item Detail" page for the "Purchase Price" and "Replacement Cost". Documents can also be store as an independent "Item" and stored in the category called "File Cabinet", or anywhere the user selects.

Inventory items can have a "beneficiary" specified for estate planning, as well as an Estate Planning tab 400, for more detailed descriptions of the estate, property, and the owners wishes and intentions. FIG. 1h shows an example of a screen shot for an estate planning tab 400 that allows the user to enter estate planning information such as insurance policy information, estate planning attorney information, a will, safe deposit box and funeral/burial information or any other information. An unlimited number of beneficiaries can be entered by the user under the estate planning tab 170 in order to link each respective "Item Detail" page to the intended beneficiary. Every inventory item has the capability for a beneficiary to be named for it using the item detail tab 125, and a list can be sorted to list every item designated for each beneficiary, including the sum of the values of all the items. This list could be taken to an attorney and attached to a will.

Figure 6:
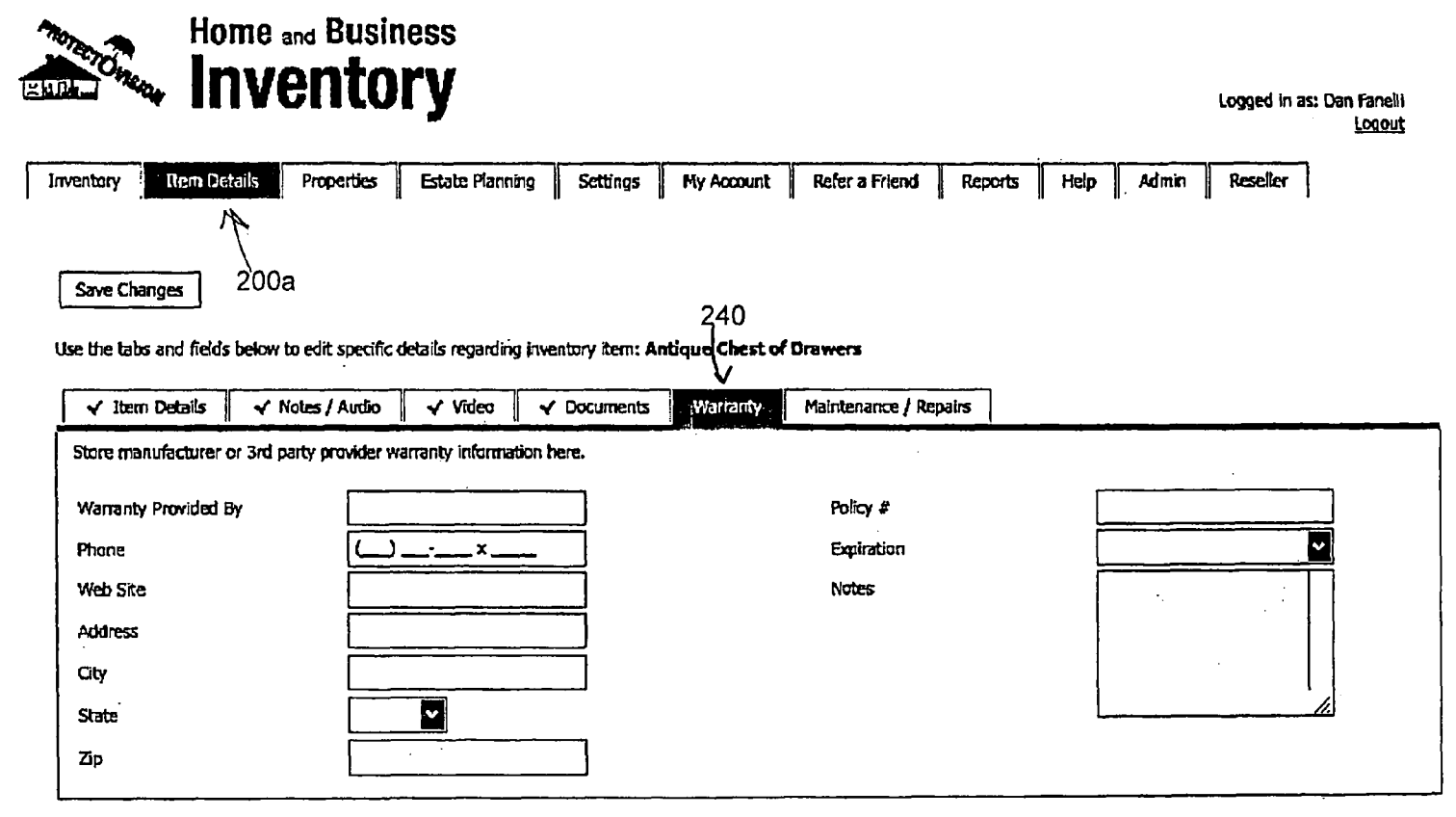

Another tab under item details is the warranty tab shown in FIG. 6 that allows the user to store information relating to the warranty policy information, phone numbers, addresses and an expiration date of the warranty. As shown in FIG. 7, a preferred embodiment provides a numeric system to identify customized inventory types for different professions or businesses with appropriate locations and categories such as doctor or dentist office, business office, manufacturing facility, auto repair shop, athletic fitness training facility, farming and agricultural equipment and inventory, government, military and the like.

The system allows the user to sort the inventory item list based on property, location, category, date range, beneficiary, value price, and the like. The system also provides a tab for creating various prepackaged or customized user developed reports under the Reports tab 800. Once the user has created a report, the report can be stored for use in the future by the same user that created the customized report. Using the customized reports and customized sorting, the inventory software of the present invention is many programs combined into one. The software can be used for individual, family, business, or government entity inventory, warranty and maintenance records, photo, video and audio storage, document record storage, estate planning, as well as video surveillance monitoring of home or business (being able to view and store this information also provides evidence that the inventory item existed at the property at the time of the loss.

Referring back to FIGS. 2a and b, the inventory tab displays a list of the items in the inventory with several different columns such as item name, physical location, location within the physical location, category, etc. The inventory system allows the user to search for inventory items using the search box within the inventory list to search for inventory items by name, category, location, etc . . . the user can optionally apply multiple search criteria/filters at once and can sort in ascending and descending order.

Inventory items in each column can be searched independently, or in combination. For example, the user can search the item name list for a particular item. When there is more than one physical location for the inventory item, the user can search using the item name in combination with the physical location column to add a second level filter to the search. The search can be general, or can be more detailed by adding additional filters. The inventory screen also allows the user to create a "filter" for future use. Then when the user logs in and selects the inventory tab, the user can use the saved filter to initiate a search.

The user's account information is located under the My Account tab 600 includes contact information, turn on/off the 'auto renew' feature, change your password, view your billing history, print a receipt can be viewed and edited. After logging into the user account, the user selects the My Account tab 600 and the system displays tabs related to the users contact information, credit card, subscription, file storage, change password and billing history. The contact tab includes name, phone, email address and street address. The subscription detail includes account number, billing period and the next renew date and allows the user to select or deselect auto renewal of the subscription. The file storage tab allows the user to view the file storage usage and purchase additional storage area. Once all of the changes have been made, the user simply clicks the save changes icon to document and save the changes.

Figure 9A:
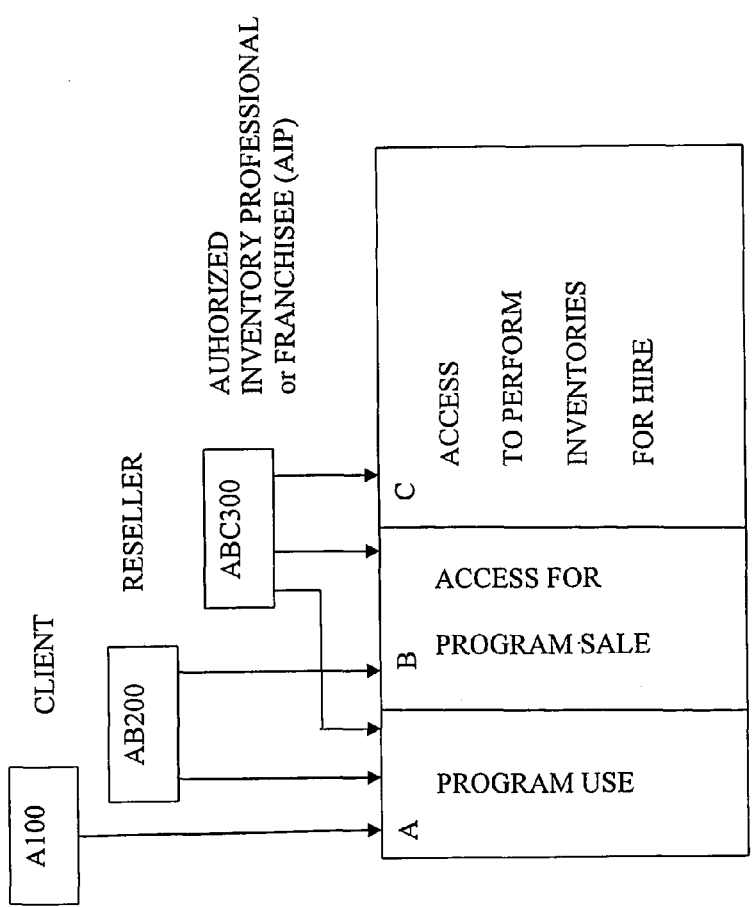
FIG. 9a is a block diagram showing different levels of access to proprietary inventory software by three different types of users.
Figure 9B:
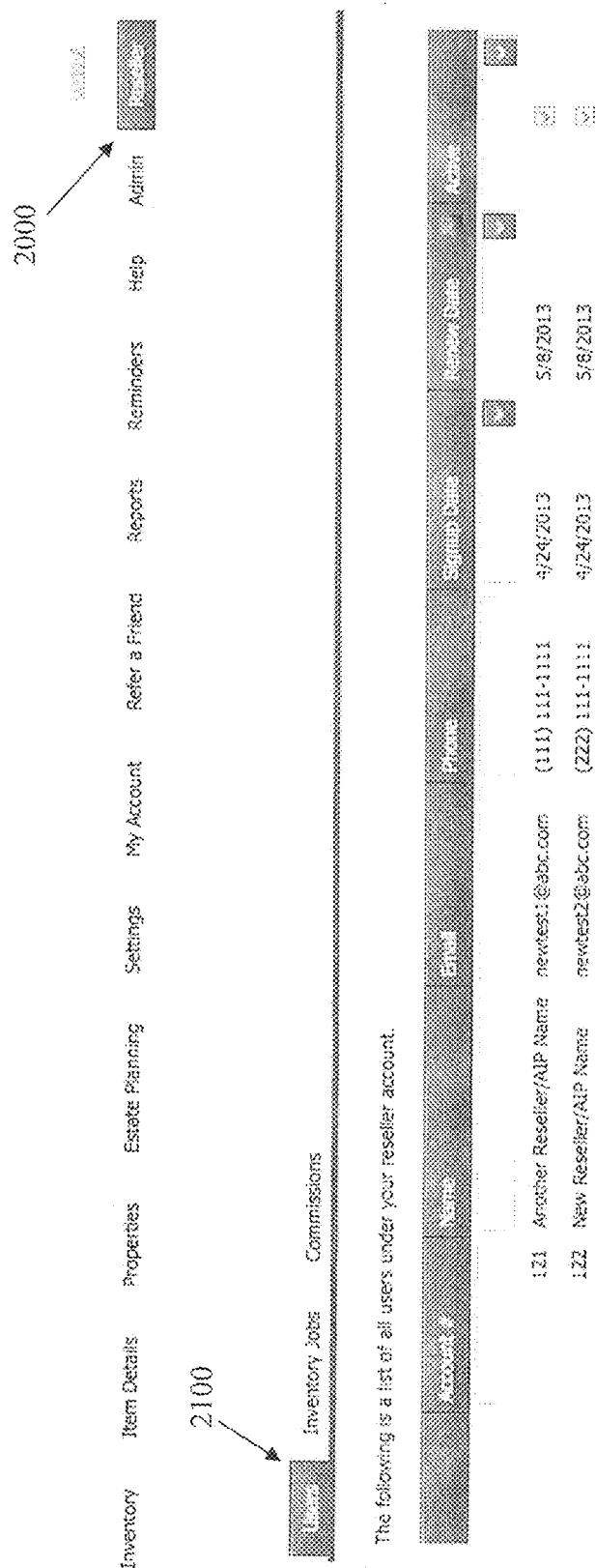
FIG. 9b is a screen shot of the Reseller tab, Users sub-tab showing a list of clients.
Figure 9C:
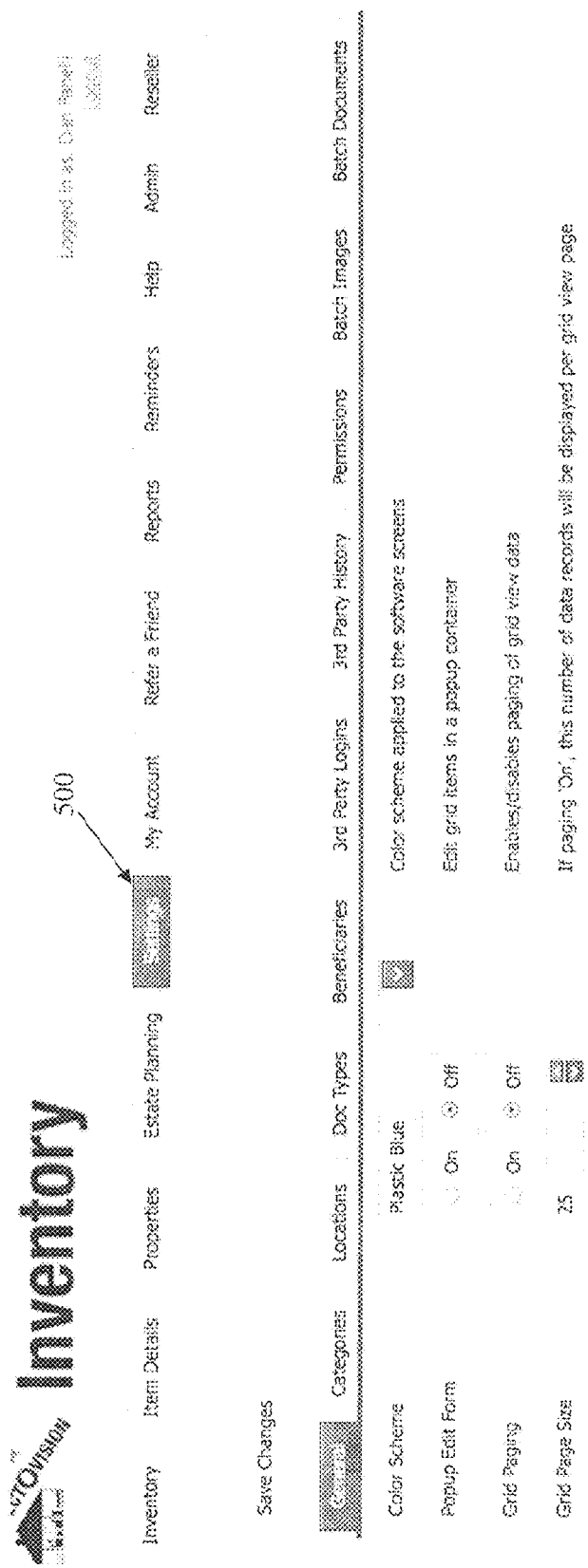
FIG. 9c shows an example of the client settings tab 500 general sub-tab screen shot to setup their display for their inventory.

The software settings can be adjusted by the user on the Settings tab, General sub-tab, shown in FIG. 9c, which allows the user to change the color scheme used by the software, to turn on/off grid view paging and set the number of records displayed at a time when paging is turned on. Once the software changes have been adjusted, the user clicks on the save changes icon. Inventory items can selected in the inventory list and be moved to the "Donate Room" location for those items donated during the year for Income Tax purposes. Since there is a record of the value, at the end of the fiscal year, the total charitable contribution is recorded.

In a preferred embodiment, the user can give "read only" access to their entire account or only selected portions of their account by assigning a specific name and password to different people or businesses. This "read only" access could be given to their attorney, financial planner, accountant/tax preparer, children, or anyone they choose. Instructions can be included on the Estate Planning tab, as well as provide access to important information like a "Last Will and Testament" and other information that may be needed that is accessible on the Internet, instead of traveling to their home or business. The user can be provided with an email message whenever a third party access the account with this privilege. A history of all access by these individuals is also stored on the account for the client's review.

FIG. 7 is a schematic block diagram showing wired and wireless interconnections between a variety of peripherals and the inventory software according to the present invention. As shown on FIG. 9a and integrated into FIG. 7, the inventory system includes an access port for client users, Resellers and Authorized Inventory Professionals to access the inventory software to access existing inventory database and create a new inventory database. The inventory system also includes interfaces for downloading digital data for creating an inventory list and making changes to an existing inventory list. The peripheral devices include a scanner 300, camera 400 downloading video images, and barcode scanner 600 to download digital data corresponding to barcodes associated with items being inventoried. A video surveillance system 500 can be used for downloading surveillance video that is automatically processed by the inventory system to identify inventory items shown in the surveillance videos. Cellular telephones and other handheld wireless devices 700 can also be used to input data, images, video and audio to the inventory system.

As seen on FIG. 7, the interface algorithms coupled with the inventory system include one or more of photo & video recognition software and voice recognition software to automatically recognize and enter inventory items and populate item details, barcode, scan code, symbol recognition software to identify new and existing inventory items for subsequent entry into the inventory Item Detail tab 200a and Item Details sub-tab 200b including the notes/audio sub-tab 210, inventory item video tab 220, inventory item document tab 230, inventory item warranty tab 240, inventory item maintenance tab 250, and inventory item reminders 280 within the inventory item detail page. Data can also be downloaded to the inventory item estate planning tab 400 for recording a will or trust documents.

FIG. 9a is a block diagram showing different levels of access to proprietary inventory software by thee different types of users. The program incorporates the ability for independent contractors or franchisees called "Resellers" (AB200) or "Authorized Inventory Professional" (ABC300) to perform work for clients, and earn a specified dollar amount per program sale and per inventory completed, built right into the inventory software. The revenue they earn can be a specific or variable percentage of the revenue that they generate. The percentage split that they earn can be adjusted by the Administrator based on achieving volume sales targets or as agreed to in advance.

For example, the Reseller AB200 has access for program sales and when sales are completed, can receive compensation according to (Program Sale)×(% per sale)=P (Paid to the Reseller)

A program sale is the sale of access to the inventory software to allow the client to complete a self-inventory for the home, family or business. Commission payments can be automatically direct deposited into the Reseller's bank account by the program, or other payments options can be negotiated.

Referring back to FIG. 1a, the Reseller logs into the inventory system and clicks on the "Reseller" tab 2000 to see a list of Clients assigned to the Reseller on the "User" sub-tab. When a Reseller has an annual program-licensing sale, the client's name is automatically entered into his Reseller client list shown as "Users" sub-tab in FIG. 20d, with the transaction information and commissions shown on the respective "Commissions" tabs 2300. A "Reseller" does not have the necessary qualification to access the program's capability to perform a fee-based inventory for a client, and therefore does not have an "Inventory Jobs" sub-tab.

Figure 9D:
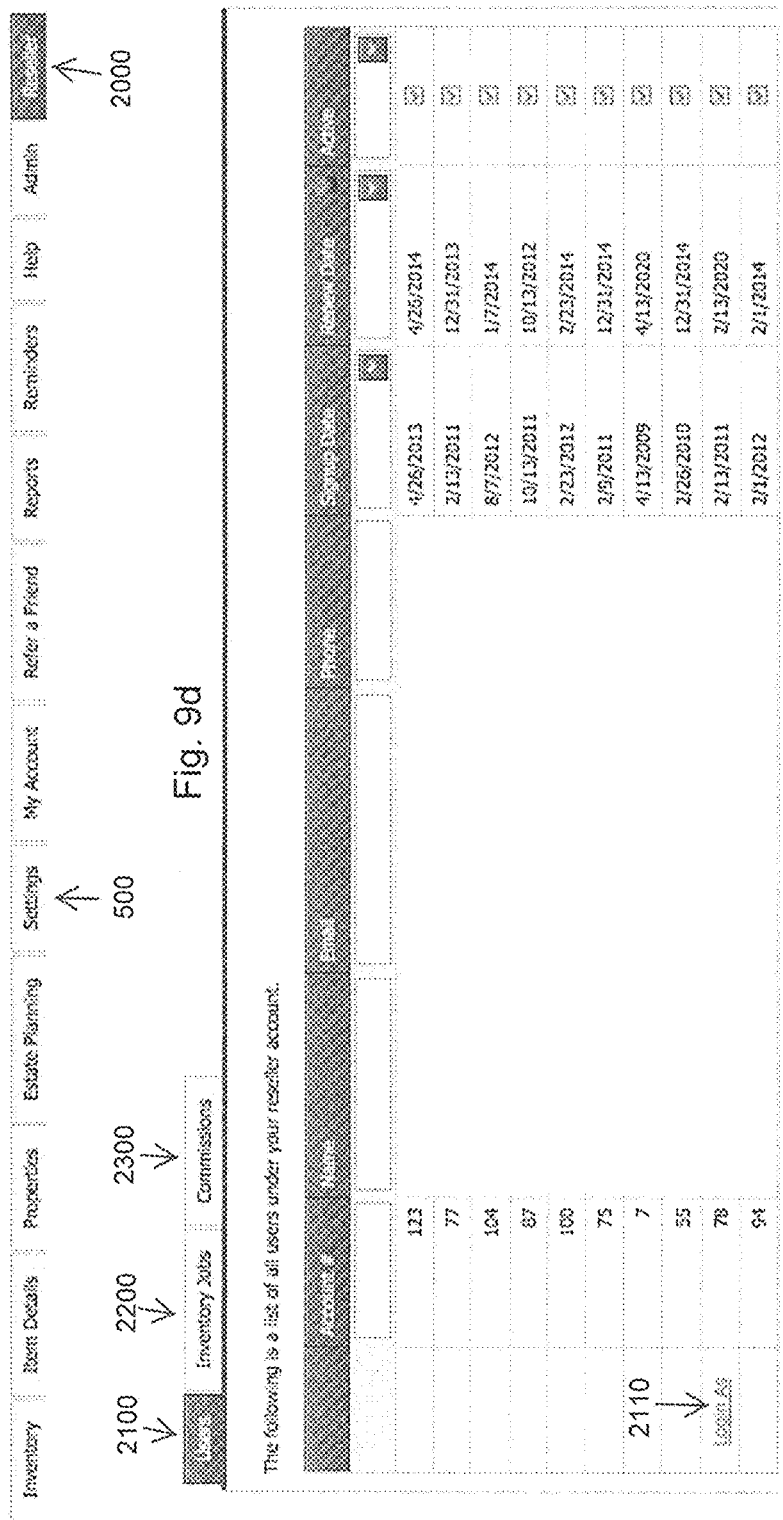
FIG. 9d is a screen shot that shows the "Login As" button on an Authorized Inventory Professional's User sub-tab that only appears when permission has been granted for an inventory by the respective client.

An "Authorized Inventory Professional" does have the necessary qualification to access the program's capability to perform a fee-based inventory for a client as shown in FIG. 9d. When they sell the client the licensing software the client's name is automatically placed on their "User" sub-tab.

Figure 10A:
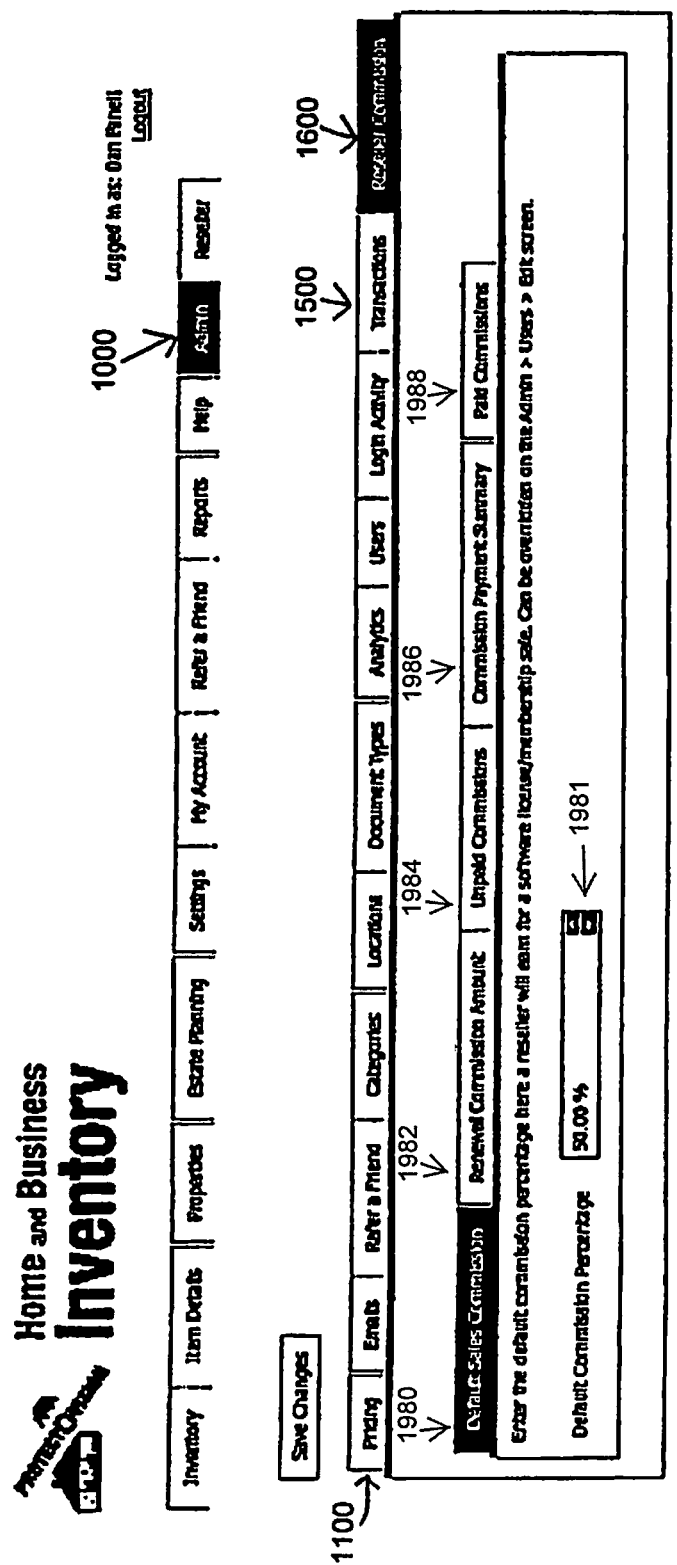
FIG. 10a shows an example of an administration screen for reseller default sales commission.

An Authorized Inventory Professional cannot do an inventory unless a client is entered on his client list. This situation would exist if the Authorized Inventory Professional is not the person who sold the Client the program license, but is contracted to complete the inventory for the Client. In a preferred embodiment, the inventory program has a feature that allows the Administrator, from the "Admin" tab 1000 to manually select a client and move the selected client onto the Authorized Inventory Professional's client list as shown in FIG. 10c so the Authorized Inventory Professional can perform the client's inventory, after the client has authorized the Authorized Inventor Professional as shown in FIG. 9d.

For the security of the client's information, a History Log of Authorized Inventory Professional access to the account is available for client and or Administrator review. In addition, the client also gets an automated email when an "Authorized Inventory Professional" logs onto their account, to ensure this is an authorized login. As shown in FIG. 9d, the permission for the Authorized Inventory Professional to login to their account has to be given on the Permissions tab 580 (FIG. 2h) by the client, and is removed at a predetermined time as designated by the Administrator. In the example shown in FIG. 9d, the access permission is active until 3 am. The Administrator or designated representative also receives an email notification when a client authorizes third party access via the Permissions tab 580 for an Authorized Inventory Professional to complete their inventory.

The Authorized Inventory Professional (ABC300) receives payment for program sales and for client inventory completion. The program sale compensation is a percentage of the sale which is calculated according to the same formula as the Reseller compensation; however, the percentage commission per sale can vary. For example, the commission percentage can vary based on volume of sales, in which case the payment is calculated according to (Program Sale)×(% per sale)=P (paid to the AIP)

(Inventory Completion Hrs)×(Hourly rate)×(% volume sales)=I

Compensation to AIP=P+I

Similarly to payment to the Reseller, Payments can be automatically direct deposited into the Reseller's bank account by the program, or other payments options can be arranged.

The inventory system has 3 levels of access. As shown in FIG. 9a, level one (A100) is "Client" only has access to the inventory program in block A for inventory needs. Level two (AB200) is the"Reseller". The reseller is provided with access to the inventory program in block A and the "backend" of the program shown as block B, in order to be able to sell the program and be paid a percentage or flat fee for program sales. The "Reseller" has access to see which client program sales went through and to see which sales have been paid, or remain yet to be paid. Payments for sales are a percentage of the sales and are electronically deposited to the "Reseller's" personal and private account.

FIG. 9*b* shows an example of a screen shot displayed to an Authorized Inventory Professional on the Reseller tab. In the example shown, after the Authorized Inventory Professional logs in, a list of all the clients under the Users sub-tab is displayed. In the example shown, the Authorized Inventory Professional's account includes 2 clients that are assigned to the Authorized Inventory Professional account. The list could be displayed several ways, including a long one-page list. Each client can be assigned an Authorized Inventory Professional or another assigned support staff to assist in creating the inventory list or to complete the inventory for the client. After the Authorized Inventory Professional is assigned, the client receives a message of the assignment and the client is instructed to log into the inventory system, click on the Settings tab 500 and Permissions sub-tab to approve the assignment.

After the client logs into the inventory system, the client selects settings. FIG. 9*c* shows an example of the client settings tab 500 general screen shot. From the settings screen shown in FIG. 9*c*, the client selects the Permissions sub-tab 580. FIG. 9*d* shows an example of a client permissions sub-tab screen shot for authorizing the Authorized Inventory Professional to access the clients account. As shown, the client checks the allow support staff to access my account box 510. After the client "saves" that authorization, the client is done will normally accompany the Authorized Inventory Professional, and the authorized support staff is authorized to complete the inventory. Referring back to FIG. 9*b*, from the Reseller tab, Users sub-tab shows the Authorized Inventory Professional's client list. Any client that has given the Authorized Inventory Professional permission to do the inventory will have "Login As" to the left of their name. The Authorized Inventory Professional can login to any one of the clients accounts with "Login As" displayed. Once the Authorized Inventory Professional logs in as one of the clients, the client's inventory list and all account functions are displayed. FIG. 9*e* is a screen shot that shows the button an Authorized Inventory Professional uses by clicking on "Login As" next to the name of the client that has authorized access.

Level three (ABC300) access is for the "Authorized Inventory Professional" (AIP) or Franchisee, who has access to the inventory program, can resell the program, and can perform inventories for clients. The authorized inventory professional has access to see which client program sales went through, and to see which sales have been paid, or remain yet to be paid. The authorized inventory professional also has the ability to select an agreed upon hourly rate from a range in the program for each inventory job, access to see each client's job, the hourly rate, the hours worked, the percentage earned based on volume of sales, the amount earned, and if payment for this work has been paid or is waiting to be paid. Payments for inventory sales are a percentage of the total dollar amount for performing the inventory and are electronically deposited to the "Reseller's" personal and private account. The system also provides the ability to be able to split commissions between two or more independent contractors.

When client inventory is conducted by an authorized inventory professional, the program has the capability for authorized inventory professional's to check the Certified box, showing that the specified item has been observed to exist at the respective location as entered for verification purposes. This is particularly useful for business inventory, for designating a beneficiary for specific inventory items such as antiques and artwork.

FIG. 9*a* is a block diagram showing the multiple levels of control for the administrator to oversee and control a backend business development system for multiple subgroups to utilize the program and business method for sale, distribution and inventory completion and inventory data storage.

The methods and systems of the present invention provide screens for administration that is accessible by resellers and authorized inventory professionals. The administration tab 1000 opens a screen where the reseller or authorized inventory professionals have access for product pricing 1100, transactions 1500, commissions 1600 and the like. As shown in FIG. 10*a*, options under the reseller commissions tab 1600 can include default commission 1980 renewal commission 1982, unpaid commission 1984, commission payment summary 1986 and paid commission 1988. FIG. 10*a* shows an example of an administration screen for default sales commission 1630. In the example shown the default commission is 50%, however the commission can be adjusted up or down in the default commission set window 1981. Resellers and authorized inventory professions can also be paid a commission for renewals. FIG. 11*a* shows an example of an administration screen for renewal commission 1990 that is adjustable up or down, set at $10 in this figure.

Figure 10B:
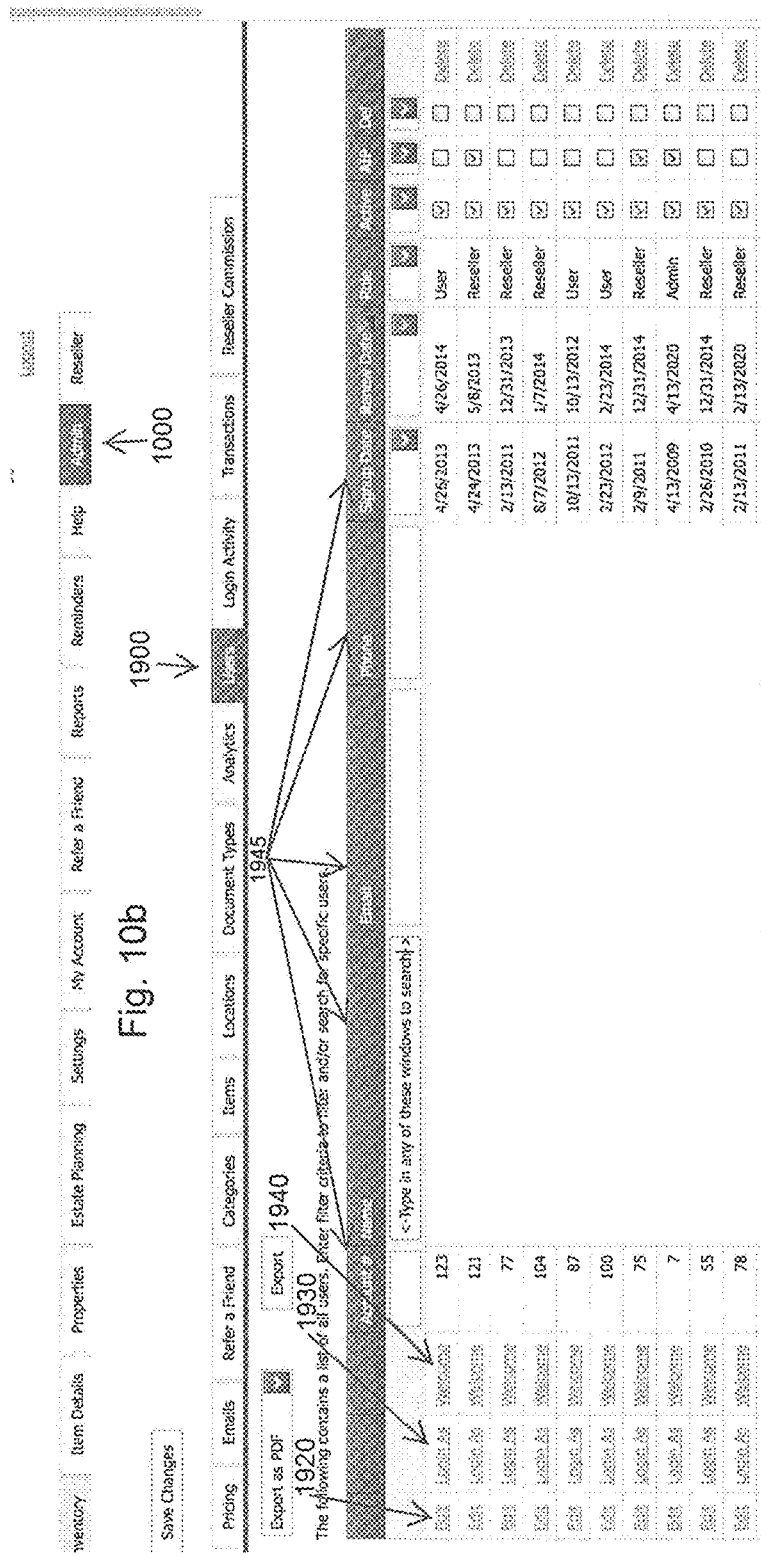
FIG. 10b is a screen shot of a User sub-tab under the Admin tab showing the list of clients that serves as an administrative control panel.
Figure 10C:
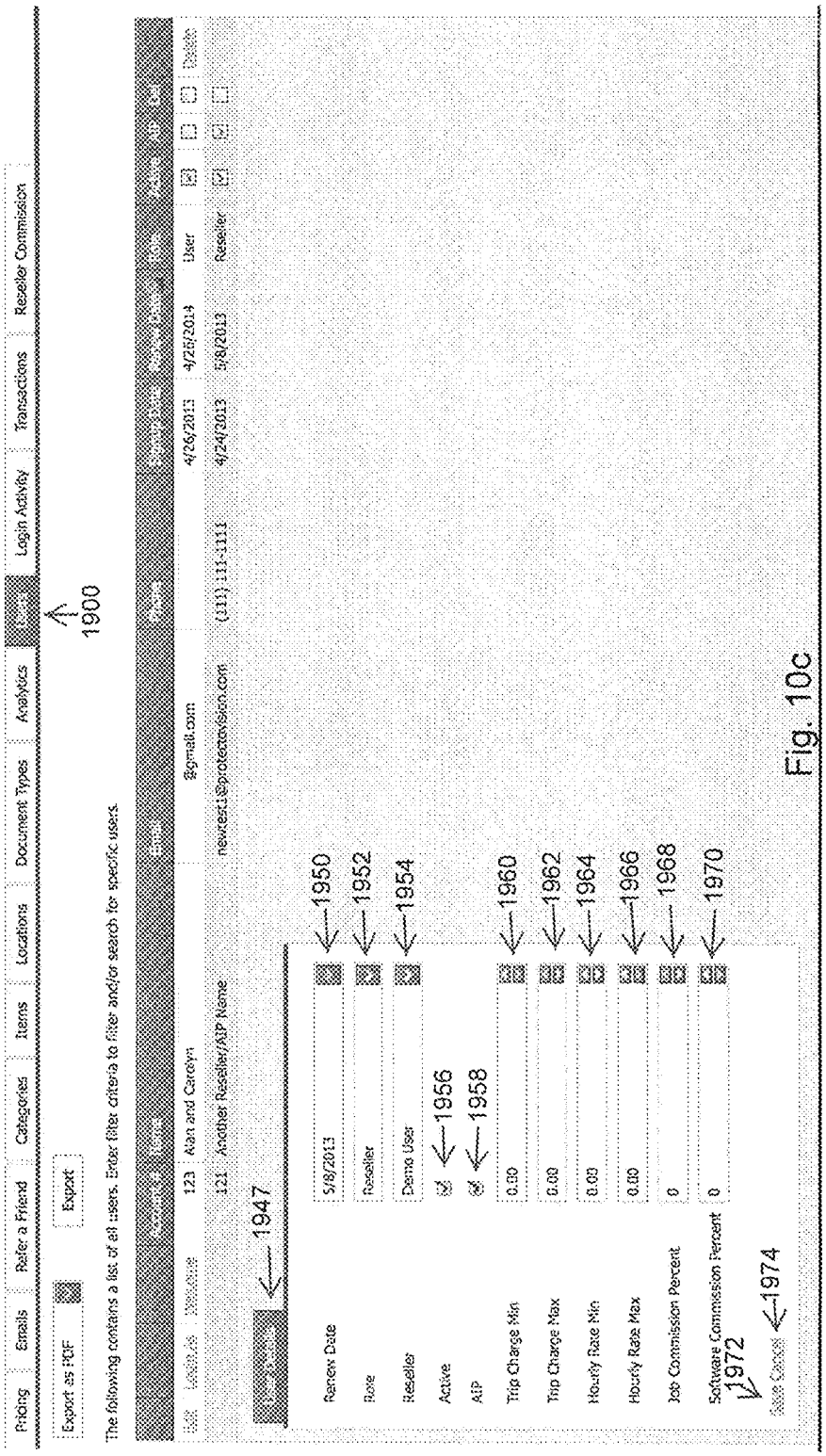
FIG. 10c is a screen shot of the User sub-tab of the Admin tab after a client has been selected, showing the administrative account changes that can be made for that client.

FIG. 10*b* is a screen shot of a User sub-tab 1900 under the Administration tab 1000 showing the list of all client users from this administrator control screen. From this screen, the administrator can edit a client inventory list by clicking on edit 1920 for any one of the user names. From this screen, the administrator can also login as one of the users 1930 and resend the "Welcome Email" to the client. The first "Welcome Email" is automatically sent to the client upon signup. The screen also allows the administrator to filter the list according to selectable filter criteria and initiate a search for a specific user and other column titles by using the search windows for any respective column 1945. After the administrator clicks on edit in FIG. 10*b* for the desired user, the User Detail window 1947 opens on FIG. 10*c*. Here is where the administrator can control important account information, including: the renew date 1950, role of the user 1952, reseller name 1954 and other details about the user. In the example shown, for account number 121 the client's fictitious name is "Another Reseller/AIP Name" and the fictitious person that sold him the program is named "Demo User" 1954. If "Demo User" is not available to perform the inventory or if the original seller is not qualified to perform inventories, the administrator can change the original Authorized Inventory Professional to another Authorized Inventory Professional from the list of qualified people that are available by selecting the dropdown carrot next to the Reseller field 1954.

Referring to FIG. 10*c* in conjunction with FIG. 10*b*, after the administrator has changed the name assigned to a client in FIG. 10*c*, the client is instructed in an email message, in person or by phone to log into the inventory system and authorize the assigned reseller in the client settings tab as shown in FIG. 9*d*. From the settings tab 500, the client can approve the Authorized Inventory Professional by checking the permissions box 585 in FIG. 2*h* and then clicking on save changes to allow the assigned inventory system support staff to have access to the clients account as shown in the Resellers tab FIG. 9*d*, by clicking on the "Login as" button 2110.

Figure 11B:
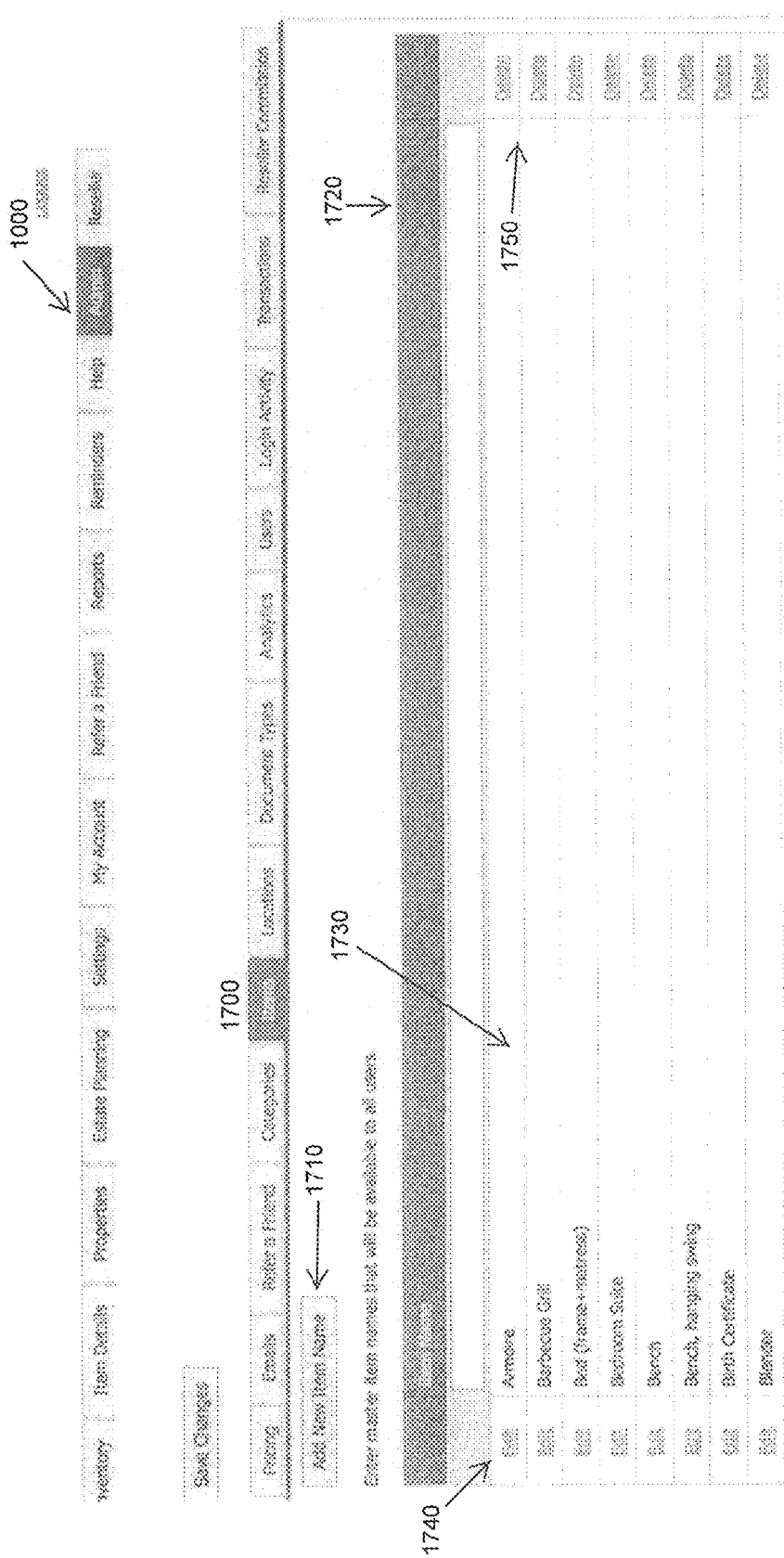
Figure 11C:
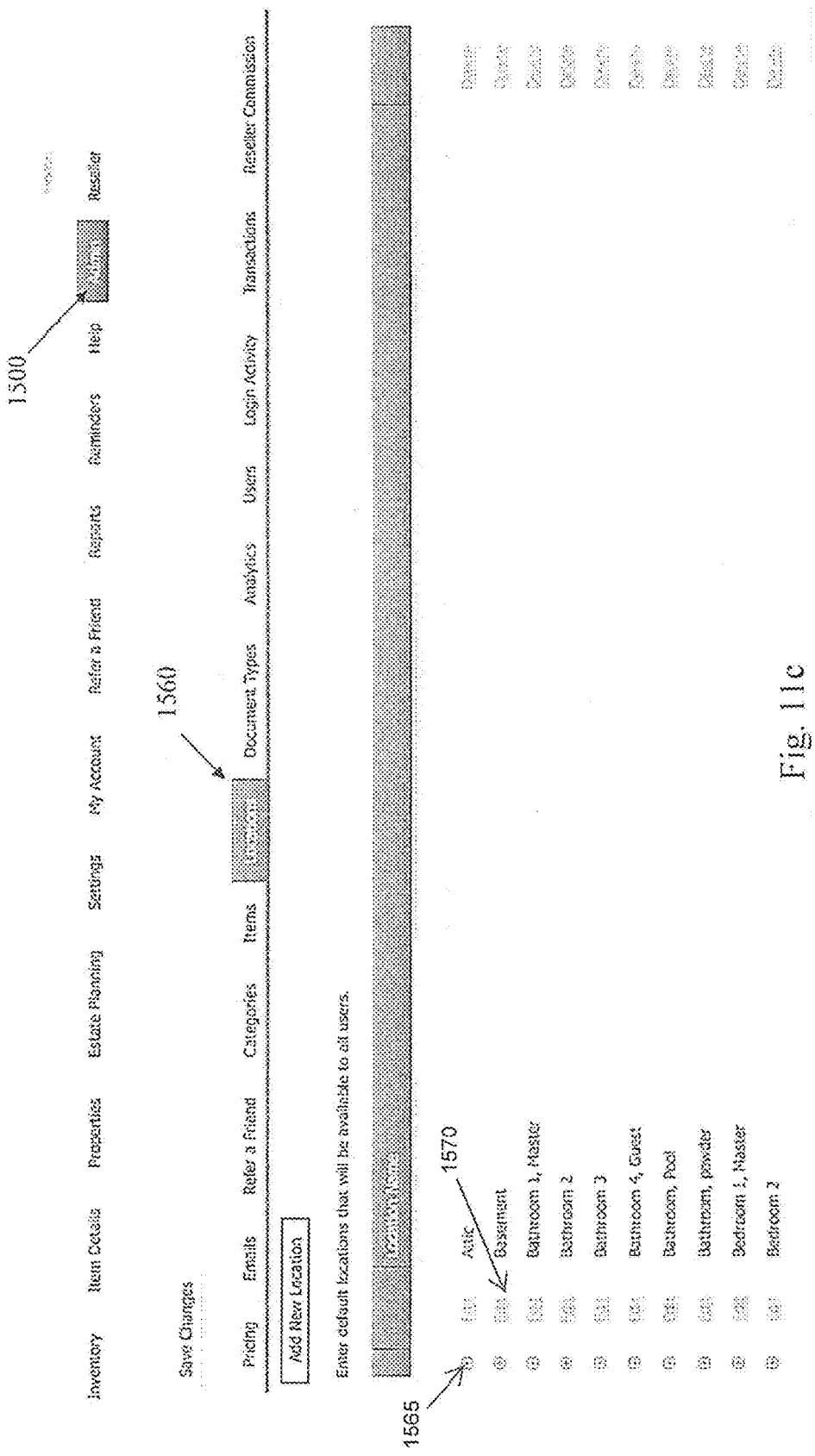
Figure 11D:
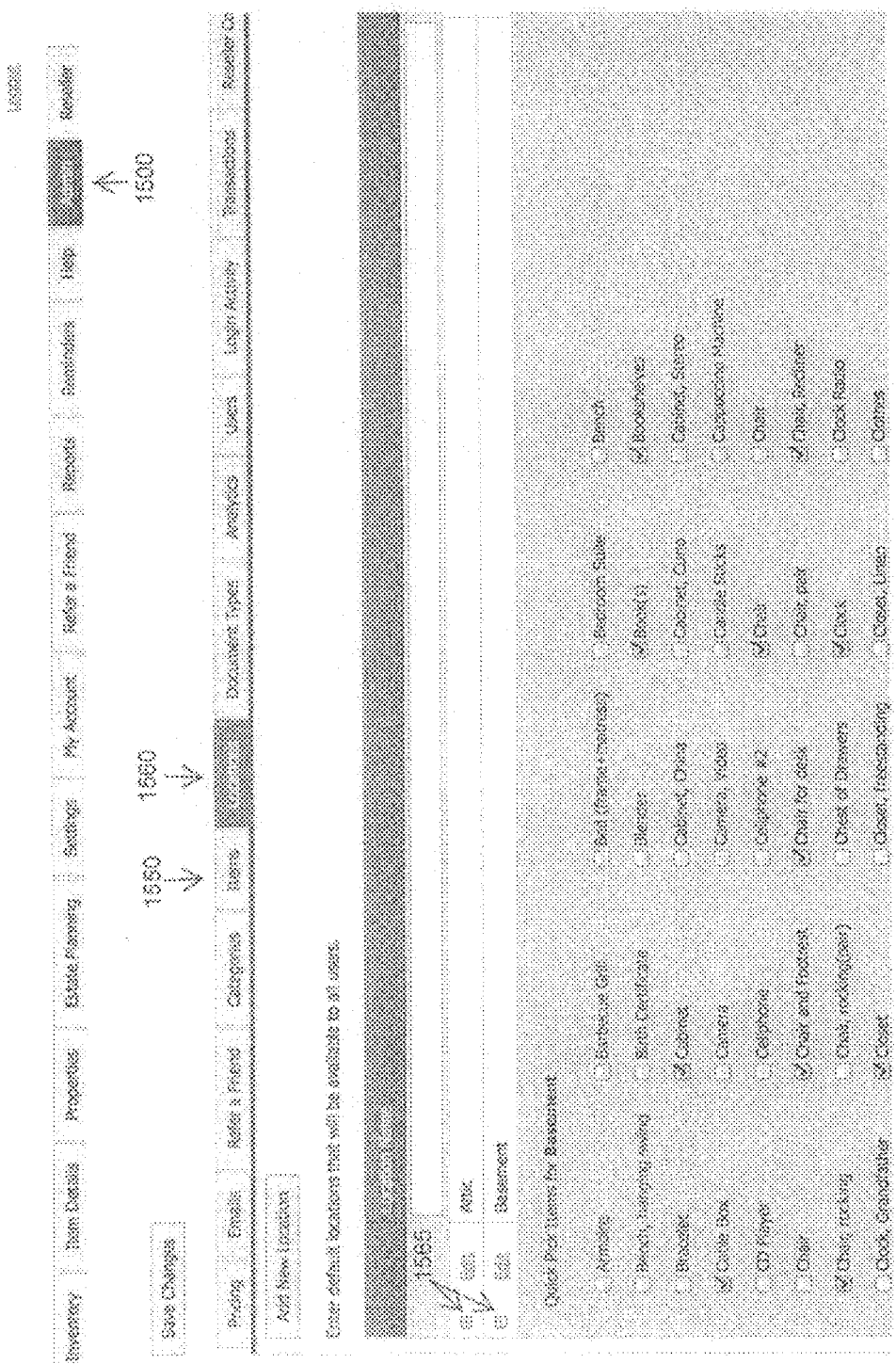
Figure 11E:
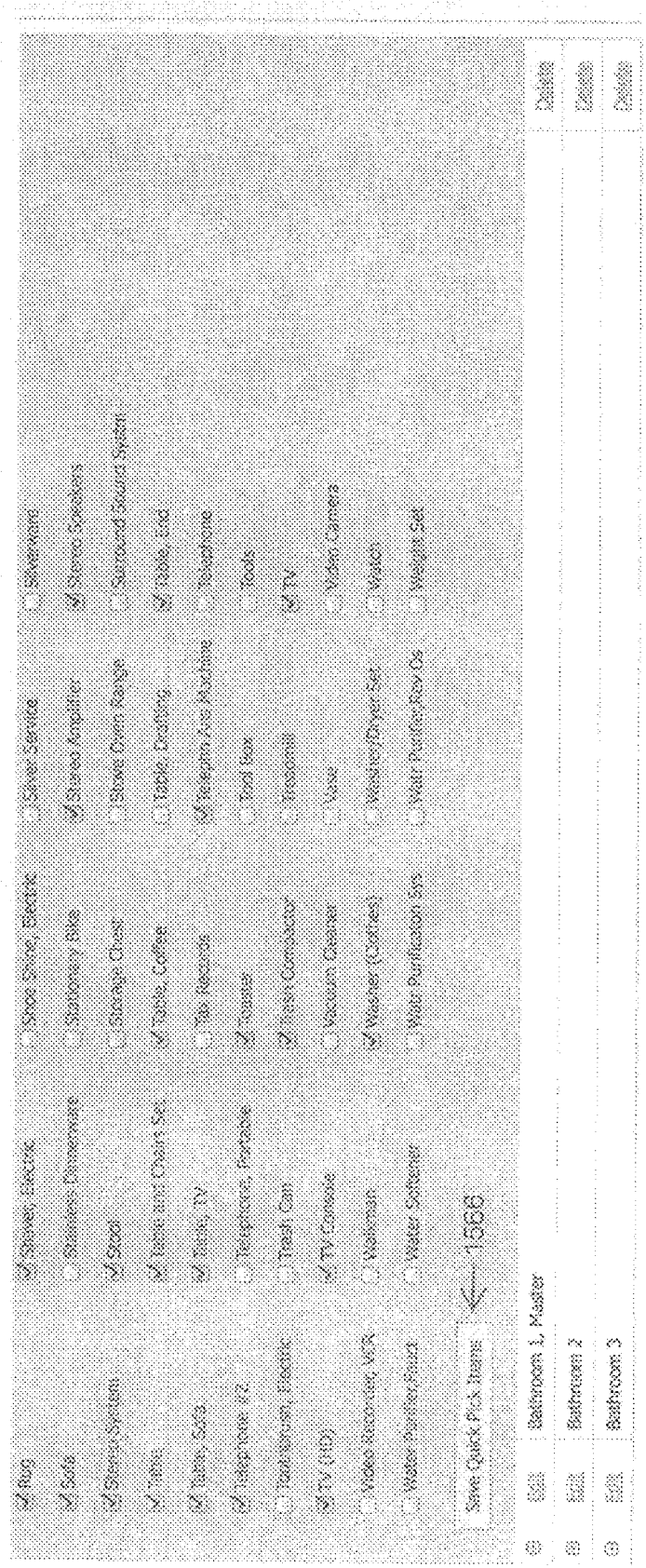

FIG. 11*b* shows the Item sub-tab 1700 below the Admin tab available for the administrator to add 1710, edit 1740, and delete 1750 pre-stored item names that are available to the user when entering inventory items. In this example, the "Items" sub tab 1700 from the "Admin" tab 1000 allows the Administrator to have an unlimited number of pre-stored items entered into a list of potential items for an auto-complete function. Note that the auto-complete function also includes those items entered in the users account. The administrator's list of pre-stored items is also used for the "Add Multiple Inventory Items" palette 135, on FIG. 1L top which is accessed by selecting the "Add Multiple Items" button 142 on the "Inventory" tab as shown in FIG. 1k.

Each item in the Item sub-tab list from the Admin tab is an item name given to personal and business property that the user will find on FIG. 1L top and bottom to add items to their inventory list by selecting the appropriate pre-stored items in the list and then using the "Add Items to Inventory" button 147. The items that are commonly found in an inventory and in a particular location (room) are entered into a pre-stored inventory "All Items" list 146 and a specific room's "Quick Pick" 145 list for use by multiple different users. The auto complete function and the "Add Multiple Inventory Items" palette 135 are timesaving features that allow the user to select multiple pre-stored item names when conducting an inventory.

The Autocomplete function is utilized when the "Add New Item" button 130 is selected on FIG. 1j, as the user types an item name, and the pre-stored item names are compared to the letters the user is typing as they enter a new item into the inventory. For example as shown in FIG. 5b, if the user is adding a "bronze figure" to the inventory list, as the user types "b", the autocomplete function in the background narrows the list to item names that include the letter "b". When the user types "br" as the first and second letters, the list is further narrowed to all words that have the "br" combination anywhere in the pre-stored word or phrase, and so on until the user clicks on the correct autocomplete option or finishes typing the item and the selects "Save & Add More Items" 160 or "Save and Add Details" 170 to enter the item into the inventory list. This feature enables the user to have the word automatically completed by selecting from the list of the possible pre-stored words in the item list. Referring to the administrator's FIG. 11b for items in the "Items" sub-tab 1700 in conjunction with FIG. 11c, for the items likely to found in a specific room Location both from the "Admin" tab 1000 are used by the clients and by the Authorized Inventory Professionals in FIG. 1L top and bottom on the "Quick Pick Items" list 145 and on the "All Items" list 146 on the Add "Add Multiple Inventory Items" palette 135, so that instead of typing the letters of the inventory item, the user simply clicks on the item's respective box and selector. The Add Multiple Inventory Items page is also called the Add Multiple Items Palette.

Figure 14:
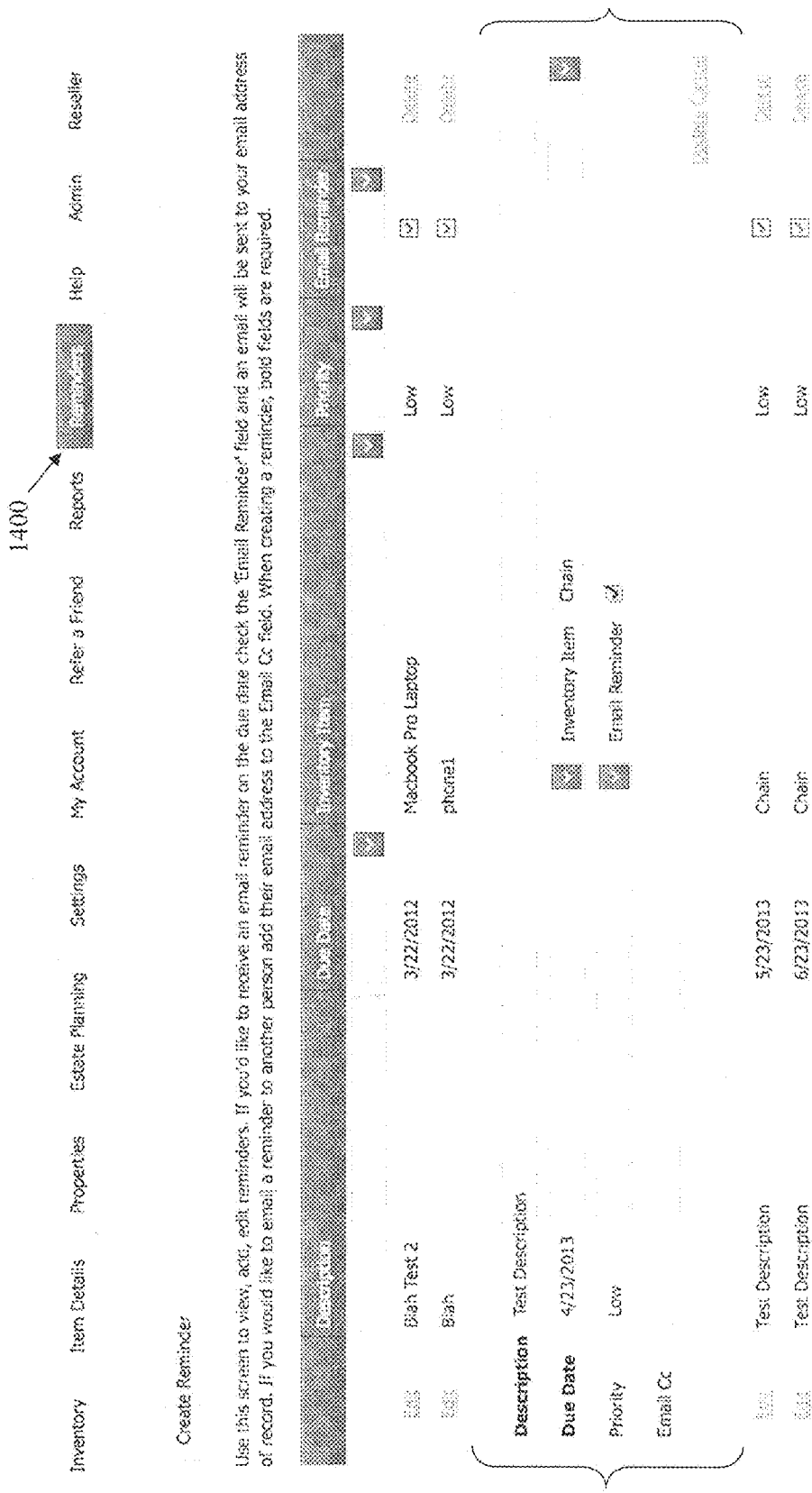
FIG. 14 shows an example of an administration screen for reseller commission, more specifically, paid commissions.
Figure 12:
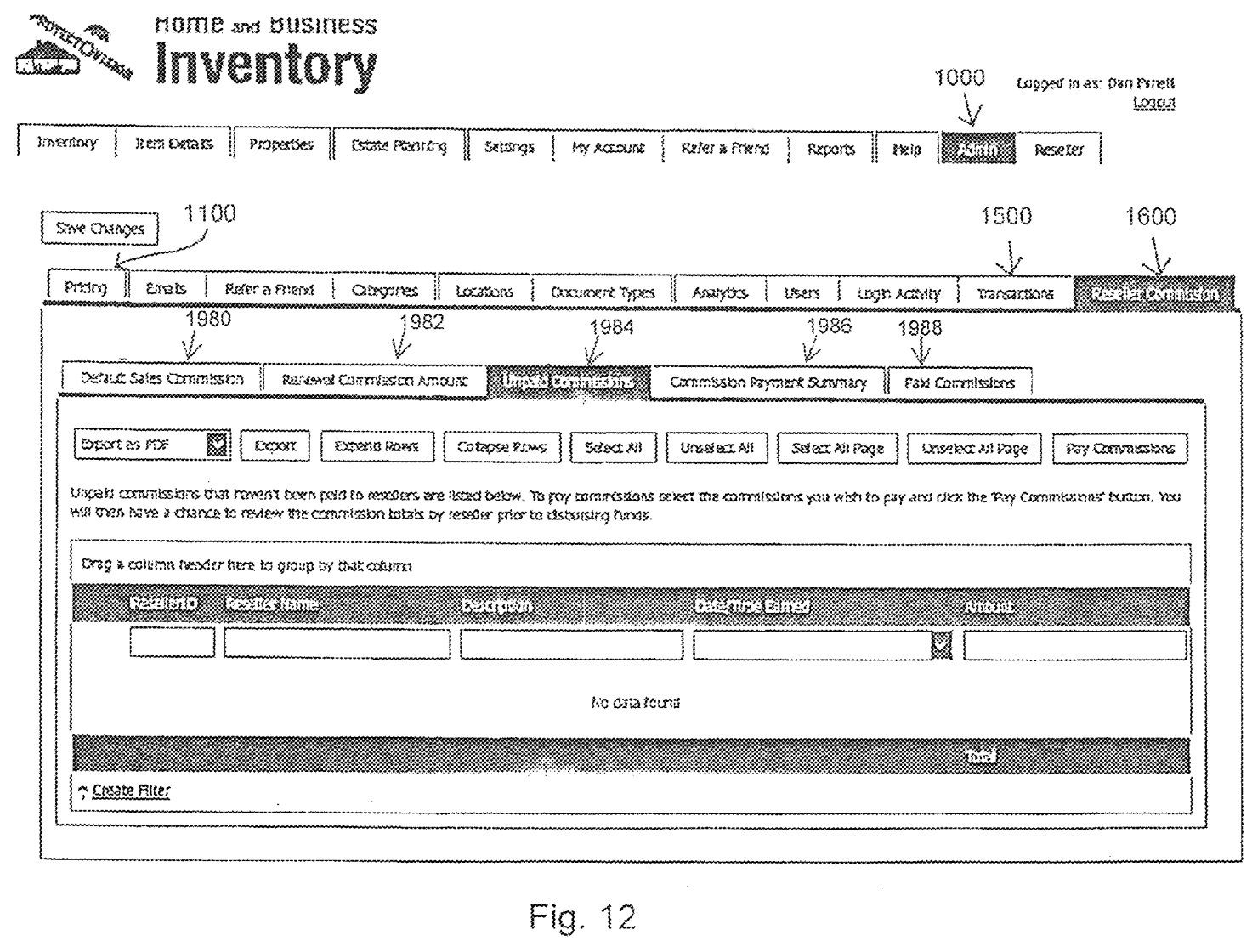
Figure 13:
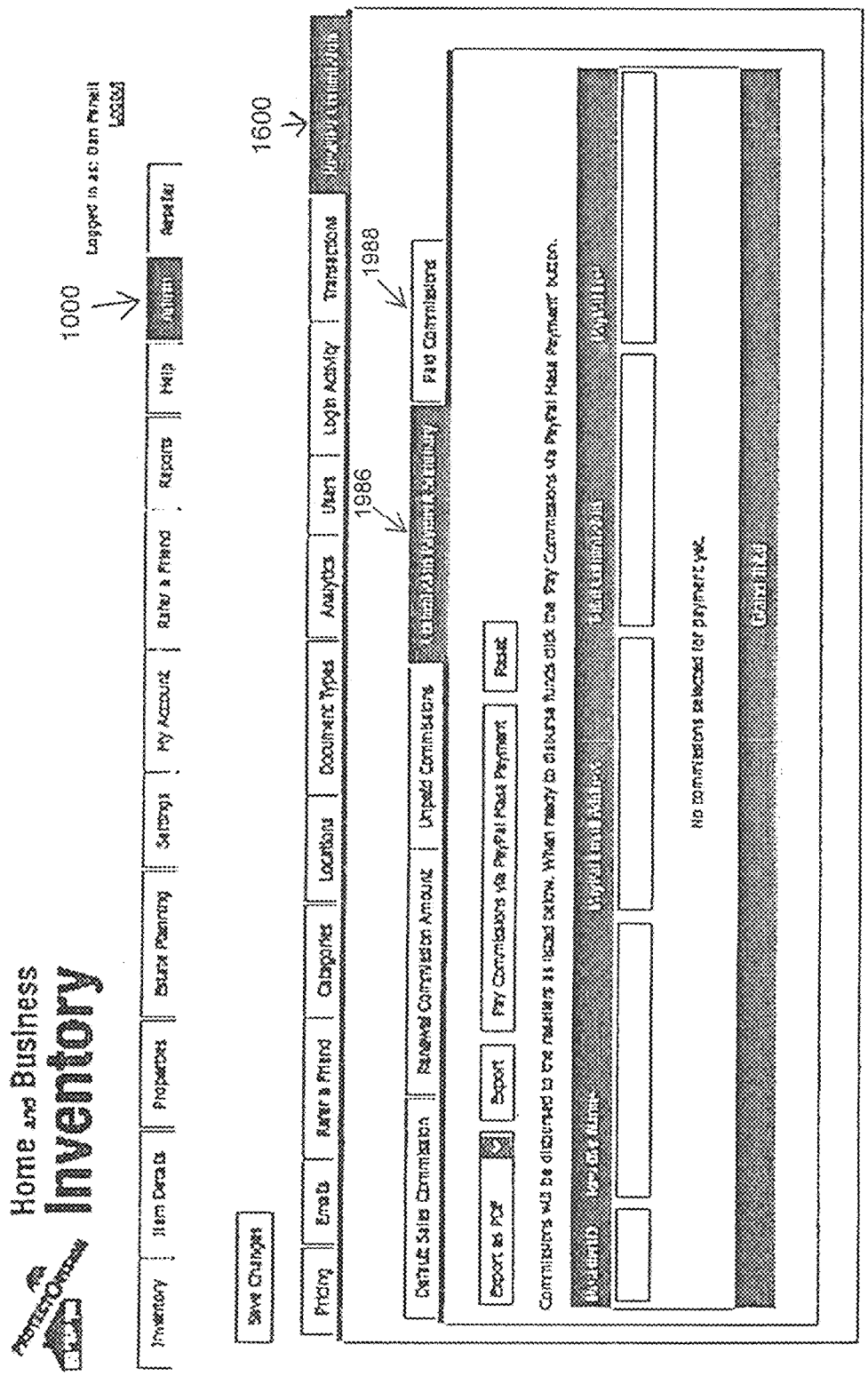
FIG. 13 shows an example of an administration screen for reseller commission, more specifically, a commission payment summary screen.
Figure 14:
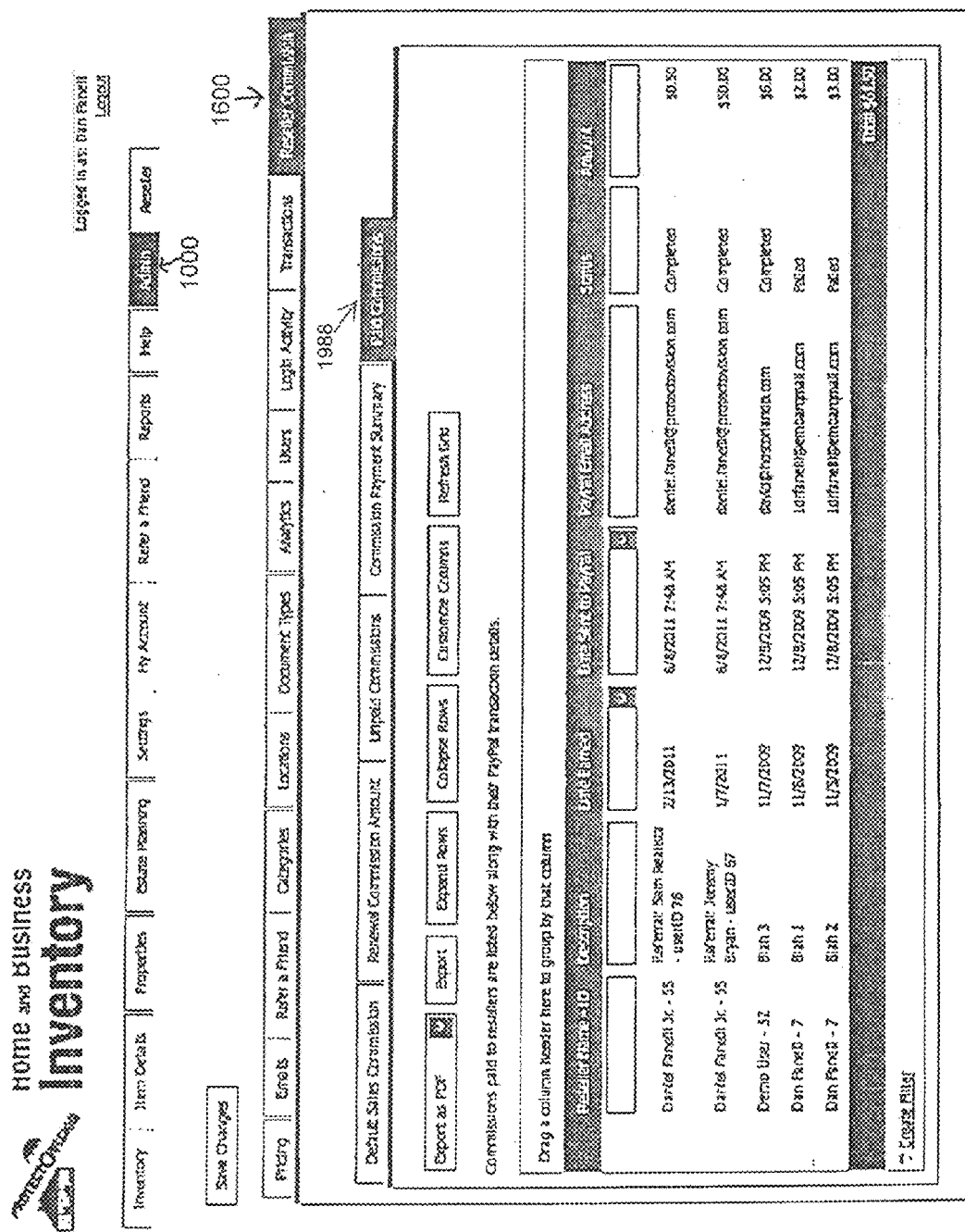

The methods and systems of the present invention tracks sales and renewals. FIG. 10a shows the Default Sales Commission 1980 below the Admin tab, Reseller sub-tab, which can be revised in the Default Commission Percentage set window 1981. FIG. 11a shows the Renewal Commission amount 1982. FIG. 12 shows an example of an administration screen for reseller Unpaid Commission 1984, and can show a list of earned commissions that have not been paid to the reseller or authorized inventory professional. As shown, the screen includes the reseller ID, reseller name, date the commission is earned and the amount of commission earned. FIG. 13 shows an example of an administration screen for Commission Payment Summary 1986 to show which commissions have been paid. The screen includes the reseller ID, reseller name, date the commission is earned, total commission earned and a fee for payment via PayPal and other payment systems. FIG. 14 shows an example of an administration screen for Reseller Commissions 1600, more specifically, paid commissions. As shown, the paid commissions screen displays commissions paid to the Reseller and Authorized Inventory Professional by name and includes a description, the date the commission was earned, the date paid and the status of each of the commissions.

Figure 15:
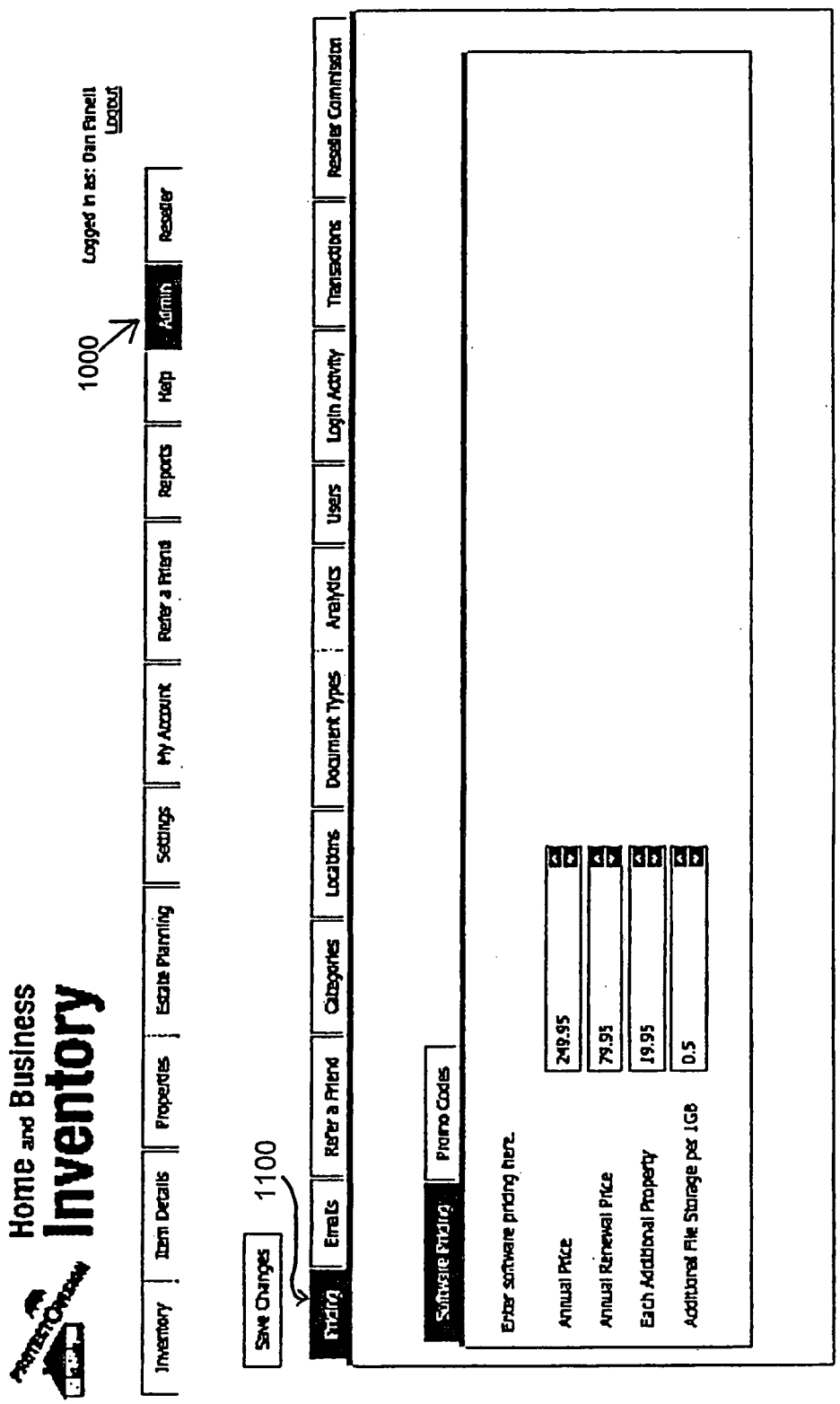
FIG. 15 shows an example of an administration screen for product pricing, and more specifically, software product pricing.
Figure 16:
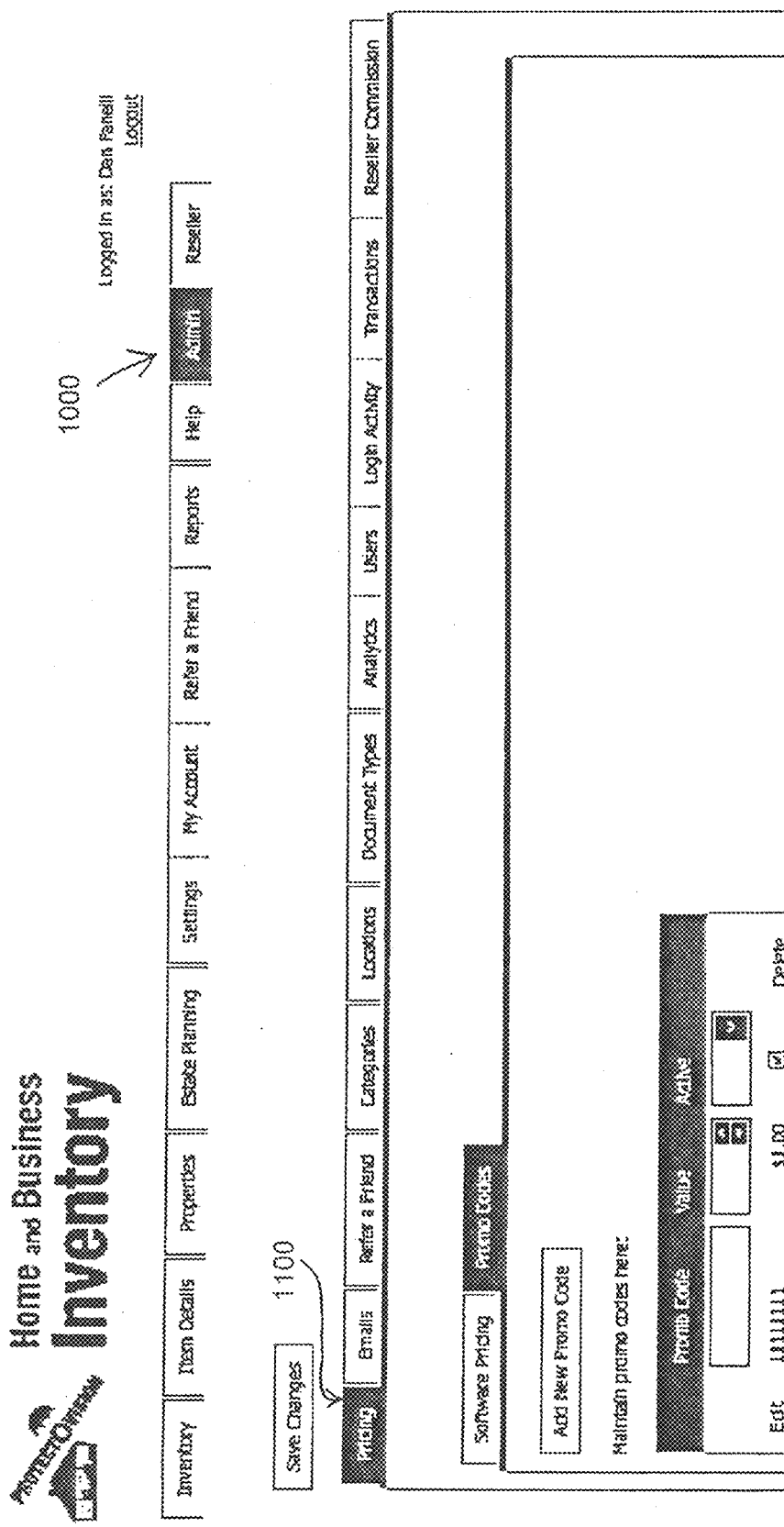
FIG. 16 shows an example of an administration screen for product pricing, and more specifically, promo codes.
Figure 17:
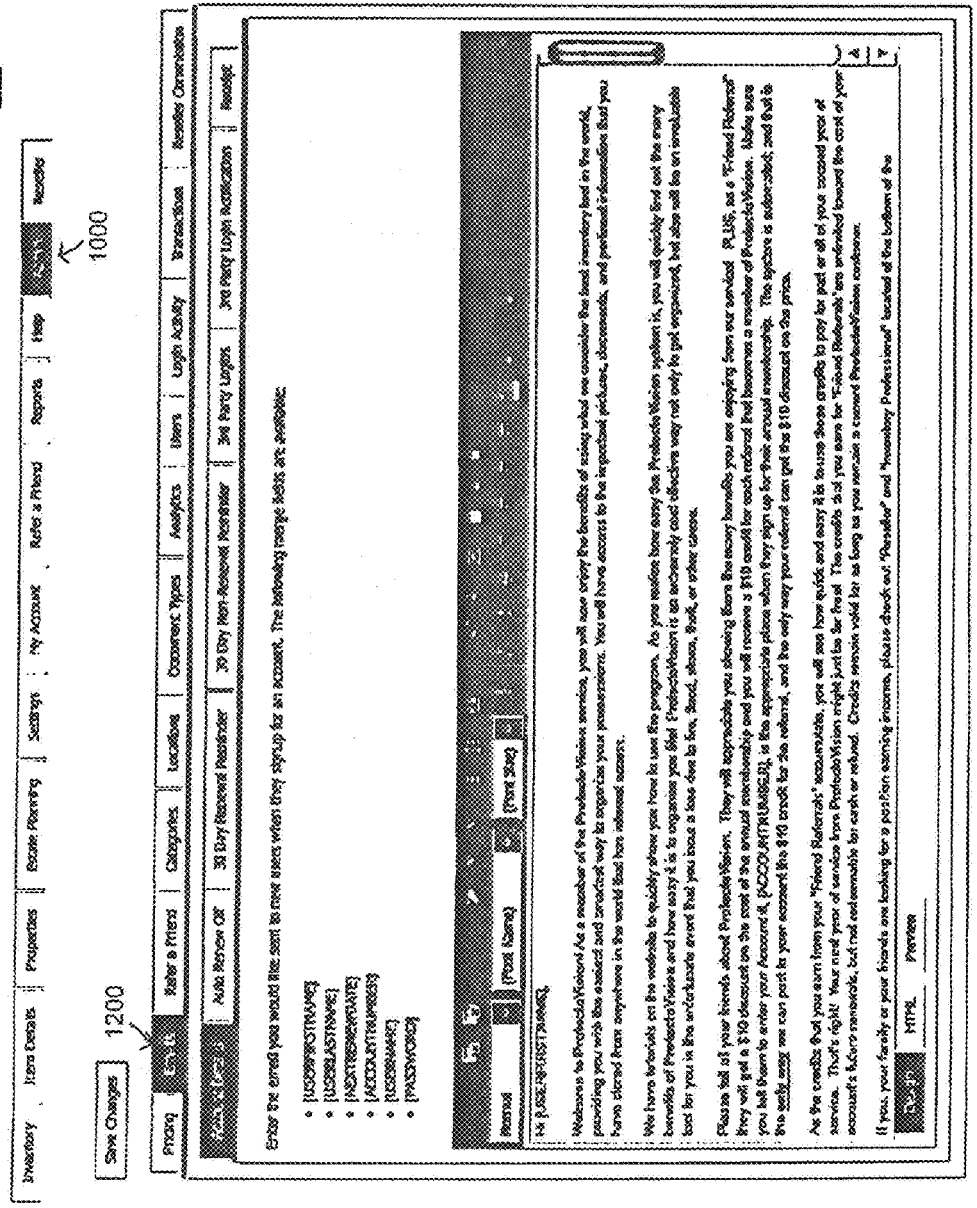
FIG. 17 shows an example of an administration screen for email correspondence with the reseller.
Figure 18:
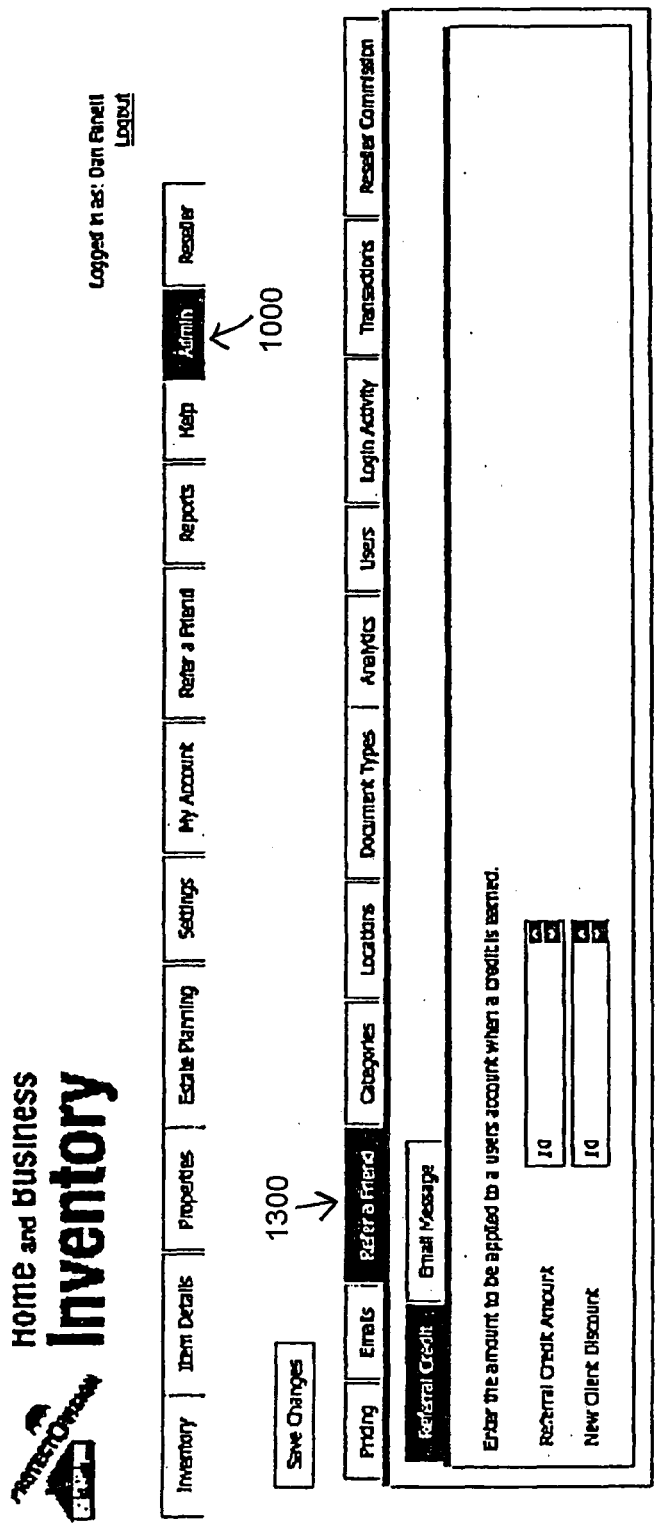
FIG. 18 shows an example of an administration screen for referring a friend and the reseller receiving credit for the referral.
Figure 19:
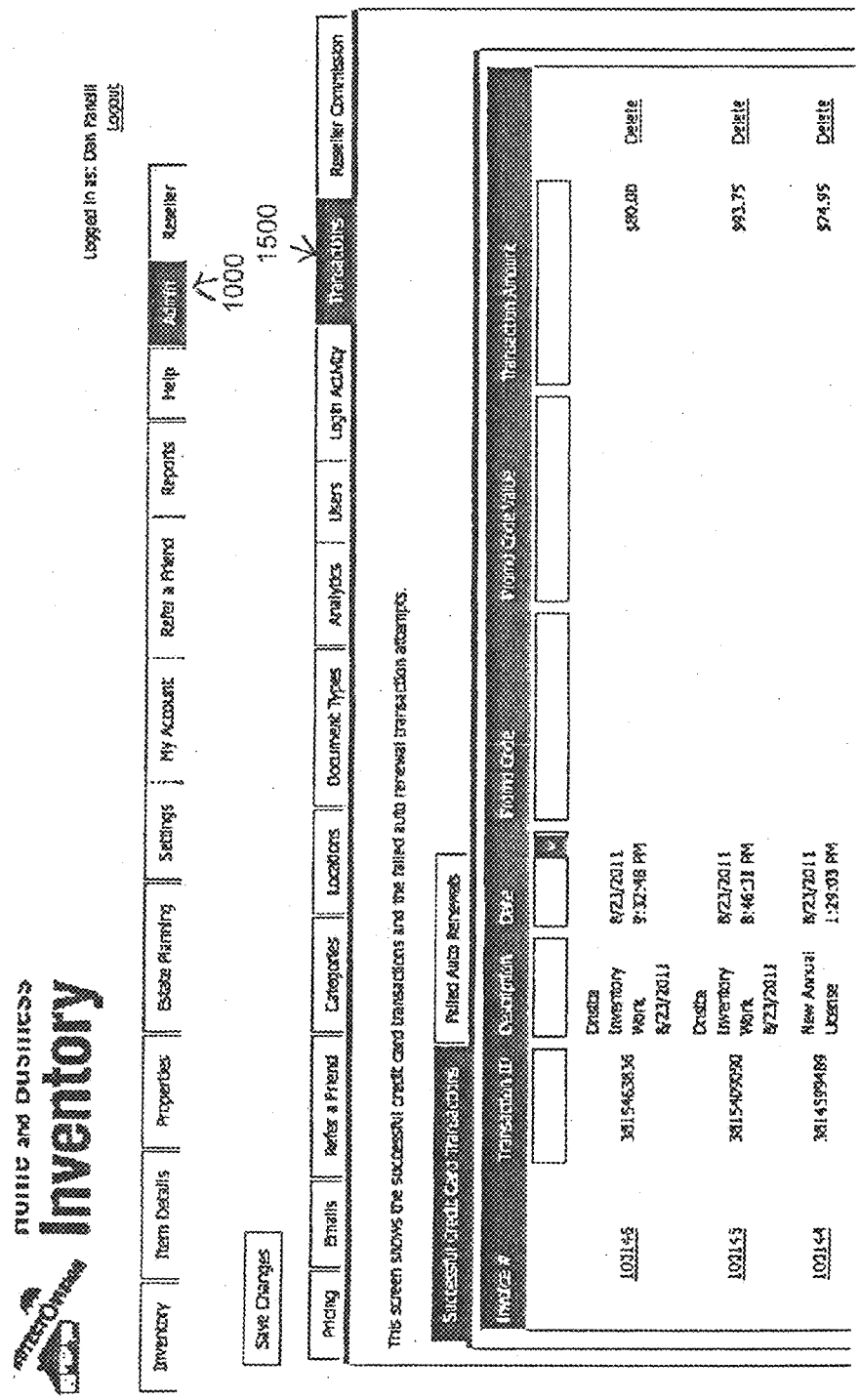
FIG. 19 shows an example of an administration screen for transactions including successful credit card transactions and failed automatic renewals.

Other administration screens include software pricing and promotions. FIGS. 15 and 16 show examples of administration screens for product pricing, and for promo codes, respectively. As shown in FIG. 15, pricing includes the initial cost of the inventory software, the annual renewal price, the cost for additional properties, and the cost for additional file storage space. Each of the different prices can be increased or decreased. The reseller can also use promo codes to discount the prices and add new promo codes for new promotions. Email messages can be sent to the reseller covering subjects such as account details, automatic renewals, 30 day reminder for renewals and non-renewals, third party logins and login notifications as well as receipts as shown in FIG. 17. The administration screens can also include tabs for referring a friend, sending them emails, and transactions. All clients and user also have a "Refer a Friend" tab to send friends emails and review their account balance. The referring a friend tab displays referral credits for each referral as shown in FIG. 18, where the referring person earns the designated credit and the new client gets the designated discount. FIG. 19 shows an example of the transaction tab that includes sub-tabs for successful credit card transactions and failed automatic renewals listed by invoice number and including the transaction identification number, description and date to name a few.

Figure 20A:
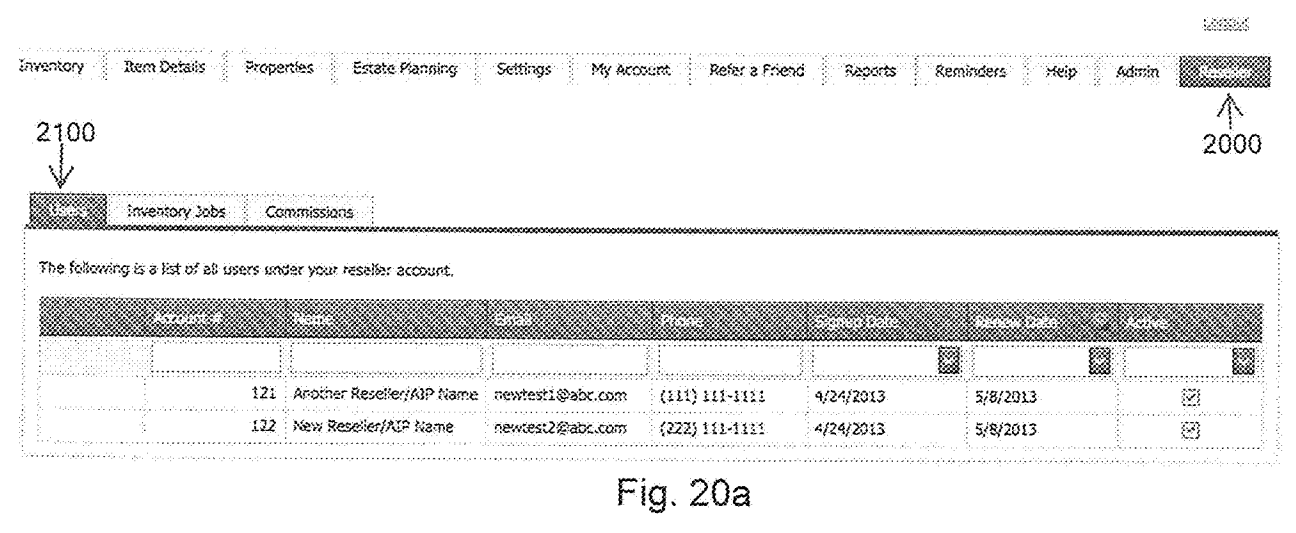

The methods and systems of the present invention include a reseller tab 2000 that includes sub tabs for users, inventory jobs and commissions. FIG. 20a shows an example of a screen shot of the Reseller tab, more specifically, the client list of an Authorized Inventory Professional, including an account number, name, email address, phone number, the date the user signed up and the renewal date. As discussed earlier, when the Authorized Inventory Professional is given permission by the client under the Settings tab 500, Permission sub-tab 580, the authorization keystrokes by the client activates the "Login as" button 2110 shown in FIG. 9d, and which could be shown in FIG. 20a, both depictions of the Reseller tab, Users sub-tab. The "Login as" text in this figure serves as the button the AIP uses to log into the client's account to perform the inventory.

Figure 20B:
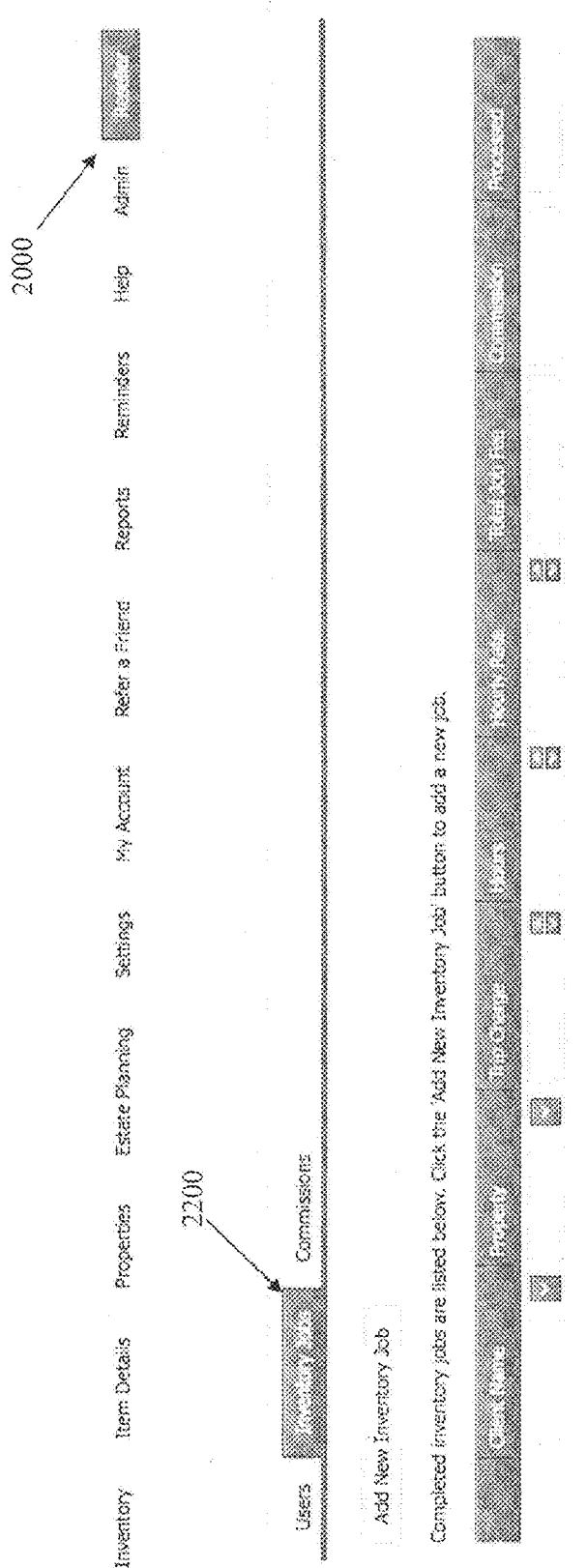
FIG. 20b shows a screen shot of the Inventory Jobs sub-tab below a Reseller tab for a person qualified as an Authorized Inventory Professional.
Figure 20C:
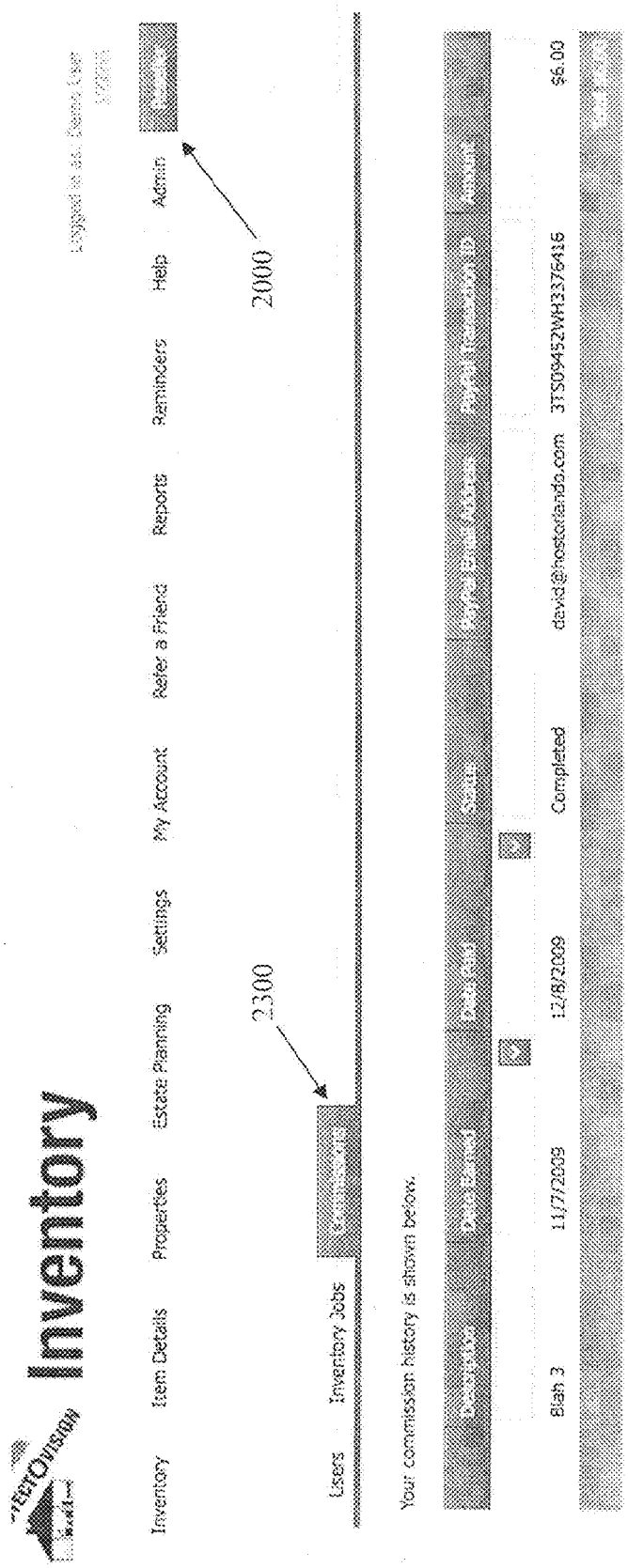
FIG. 20c is a screen shot of the Commissions sub-tab below a Reseller tab for a person qualified as an Authorized Inventory Professional.
Figure 20D:
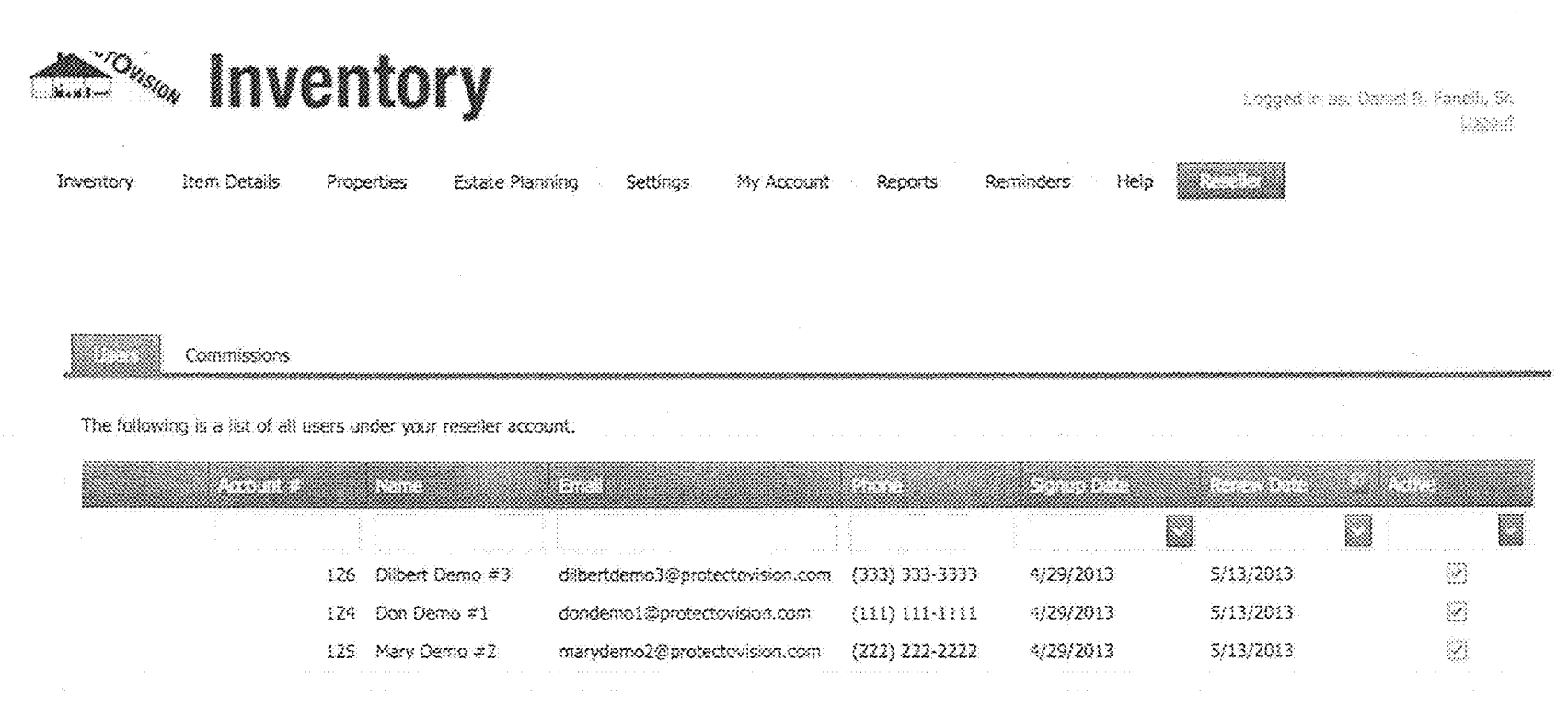
Figure 20E:
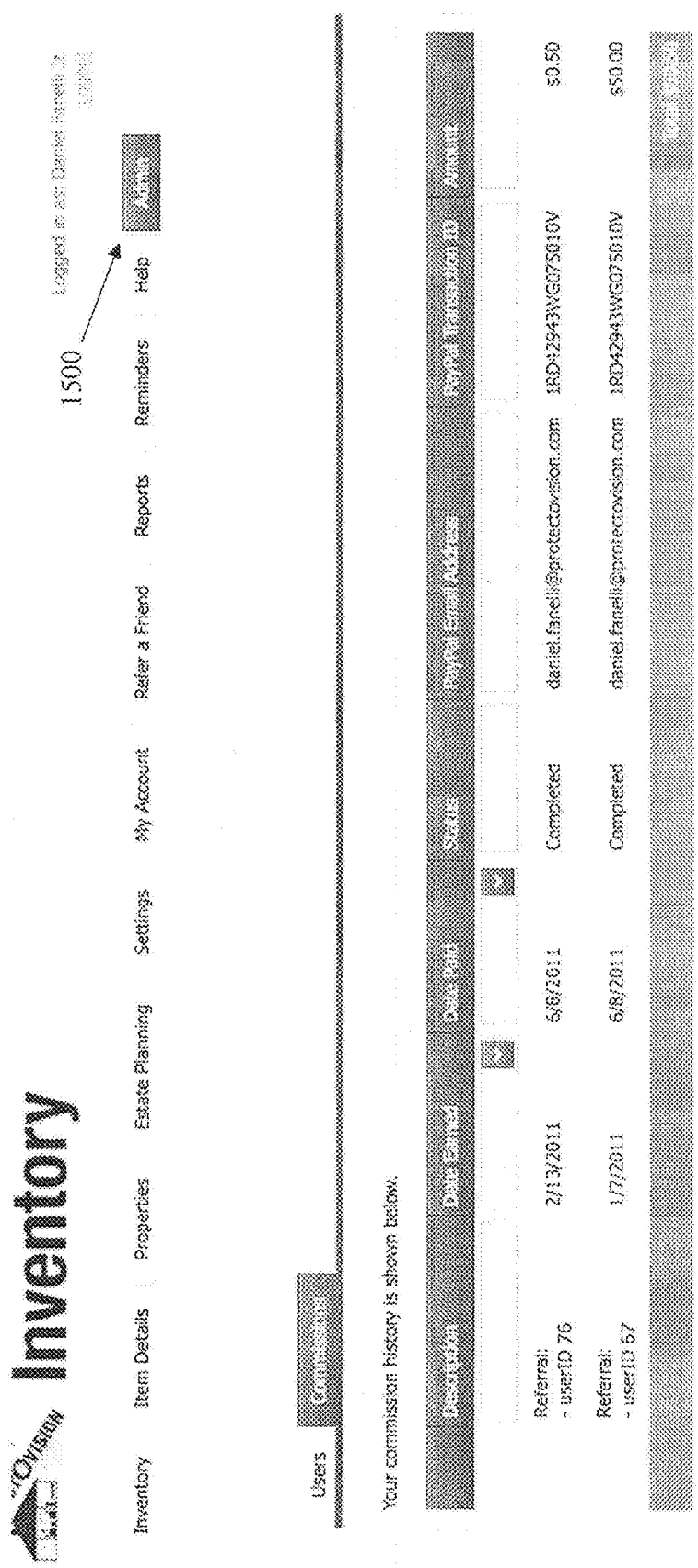
FIG. 20e is a screen shot of the Commissions sub-tab below a Reseller tab for a person qualified only as a Reseller, more specifically, showing for commissions paid and to be paid for completed sales of the program license.

FIG. 20b shows an example of a screen shot of the reseller tab, more specifically, an Authorized Inventory Professional's inventory jobs tab for 2200 that shows a list of the completed inventory jobs and allows the user to add new inventory jobs. The "Add New Inventory Job" button is used to generate the billing and accounting record from the inventory that the Authorized Inventory Professional has just performed, and generates the payment and transaction information. The Reseller tab also includes a sub-tab for AIP Commissions 2300 for the Authorized Inventory Professional, as shown in FIG. 20c. The commission tab 2300 displays a commission history for the Authorized Inventory Professional. FIG. 20c shows the recorded information from the transaction. FIG. 20d shows the Reseller tab and Users sub-tab of the Reseller's clients for those with only a Reseller qualification, and FIG. 20e show the Reseller tab and Commissions sub-tab for software and other potential sales. Note there is no Inventory Jobs sub-tab or the capability for a "Login as" button activation because the Reseller does not have the Authorized Inventory Professional qualification.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An inventory system comprising:
a program server for storing and executing a primary algorithm as a set of inventory instructions stored in memory connected with the program server to display inventory screens to a user and to save user entered data;
a data server interfaced with the program server for storing user data in a user database, the user database corresponding to a user;
a graphical interface at the program server to allow the user to generate a user inventory list storable in the user database at the data server, to allow a software reseller to sell access to the program server for generating the user inventory list and storing the user inventory list on the data server, and to allow an authorized inventory professional to access the program server to sell use of the primary algorithm and to access the primary algorithm to create the user inventory list for a fee;
a properties screen for the user to list and identify one or more properties each separately identifiable by a different postal address corresponding to one of a residential property postal address and a business property postal address, the one or more properties stored in the user database on the data server;
an inventory screen for adding plural items to the user inventory list, the inventory screen allowing the user to add an individual item to the user inventory list or to add multiple items selected from an all item list of pre-programmed items sorted by property room location, the primary algorithm stored on the program server recognizing the user inventory list entered by the user and storing the entered user inventory list in the user database on the data server;
an add multiple inventory item screen for the user to select one of the one or more properties and a room location within the selected property, the primary algorithm stored on the program server recognizing the selected property and room, and in response, generating a quick pick list of items at the program server corresponding to the room selected, and a certified field to allow the authorized inventory professional to check a certified box showing that a specified item in the user inventory list has been observed to exist, an add items to inventory button to add the selected items from the quick pick item list and the all items list to the inventory list, the added items identified with a text color that is different from the text color of unselected items, the primary algorithm stored on the program server recognizing the item selection entered by the user and storing the entered list in the user database on the data server;
an item detail screen for the user to enter details about each one of the plural items including the residential or business property postal address and the room location within the property where the inventory item is found, the item detail including one or more of an image, a video and an audio exported from a transmitting device including a camera, a scanner, and a smart phone, the primary algorithm stored on the program server recognizing the item detail entered by the user and storing the entered item details in the user database on the data server;
an administrative screen and sub-screen for an administrator to select the items that correspond to the items in the quick pick list for each room location, the primary algorithm stored on the program server recognizing the administrative selection entered by the user and storing the entered details in the user database on the data server;
a reminder screen to allow the user to set up a reminder of a user defined future event corresponding to a selected inventory item to automatically send an email reminder of the event to the user on user selected schedule, the schedule including repeat frequency, number of times repeated, and a priority level for the reminder, the primary algorithm stored on the program server recognizing the reminder selection entered by the user and generating a reminder list from the entered reminder details in the user database on the data server; and
a reminder list screen to allow the user to see all reminders that have been sent or are scheduled to be sent in the future, and to set up another reminder of a different user defined future event not corresponding to a selected inventory item to automatically transmit the email reminder of the different user defined future event from the program server on user selected schedule, the schedule including repeat frequency, number of times repeated, and a priority level for the reminder.

2. The system of claim 1 wherein the item detail screen comprises:
an item name field;
a property field to identify the one or more properties corresponding to the user;
a location field to identify a room or area location within the one or more properties where the item is found; and
one or more items detail fields selected from a list consisting of category, brand, model number, serial number, condition, purchase price, purchase date, and replacement cost.

3. The inventory system of claim 2 wherein the item detail screen further comprises:
a selectable list of categories generated at the program server, the items in the pre-programmed inventory item list stored at the data server linked with one or more of the categories in the selectable list of categories.

4. The inventory system of claim 3 wherein the item detail screen further comprises:
a remember field for the user to select one or more of the property, location and category fields to pre-populate for entering a next inventory item.

5. The inventory system of claim 2 further comprising:
a photo and video recognition analyzer at the program server to automatically recognize and enter the image and the video of one of the inventory items and populate the item detail field;
a document upload receiving interface at the program server to allow the user to upload one or more documents into the user inventory list linking the one or more uploaded documents with a selected item in the user inventory list; and
an image upload interface to allow the user to upload one or more images into the user inventory list and link the one or more uploaded image with a selected item in the user inventory list.

6. The inventory system of claim 1 wherein the reminder screen comprises:
  a reminder description field to identify the reminder; and
  a date field to enter a date for the automatic email reminder.

7. The inventory system of claim 6 wherein the reminder screen further comprises:
  a priority field for the user to assign a priority to the reminder; and
  a repeat times field to select a number of times for automatically sending the email reminder.

8. The inventory system of claim 6 wherein the reminder screen allows the user to link the reminder with an item in the user inventory list.

9. The inventory system of claim 1 further comprising:
  an administration access into the inventory system to modify the all item list and to link one or more items in the all item list with one or more categories to automatically display the quick pick list of items linked with a selected location and a selected category.

10. The inventory system of claim 1 wherein the program server further comprises:
  a barcode, a scan code and symbol recognition to identify inventory items for data entry.

11. The inventory system of claim 10, wherein the program server further comprises:
  a voice recognition option to allow the user to respond to inventory screens displayed by the server with voice commands.

* * * * *